US012767017B2

(12) United States Patent
Guo et al.

(10) Patent No.: US 12,767,017 B2
(45) Date of Patent: Oct. 20, 2026

(54) TETHER ASSEMBLY, AND CHILD SAFETY SEAT AND SUPPORT STRUCTURE THEREOF

(71) Applicant: WONDERLAND SWITZERLAND AG, Steinhausen (CH)

(72) Inventors: Zhengwen Guo, Dongguan (CN); Zongwang Cui, Dongguan (CN); Xiaolong Mo, Dongguan (CN); Ruyi Li, Dongguan (CN); Kun Zhang, Dongguan (CN); Zujian Liu, Dongguan (CN); Yingzhong Chen, Dongguan (CN)

(73) Assignee: Wonderland Switzerland AG, Steinhausen (CH)

( * ) Notice: Subject to any disclaimer, the term of this patent is extended or adjusted under 35 U.S.C. 154(b) by 37 days.

(21) Appl. No.: 18/958,809

(22) Filed: Nov. 25, 2024

(65) Prior Publication Data

US 2025/0083579 A1 Mar. 13, 2025

Related U.S. Application Data

(62) Division of application No. 17/777,585, filed as application No. PCT/CN2020/129670 on Nov. 18, 2020, now Pat. No. 12,179,645.

(30) Foreign Application Priority Data

| | | |
|---|---|---|
| Nov. 18, 2019 | (CN) | 201911138004.5 |
| Oct. 29, 2020 | (CN) | 202011187515.9 |
| Oct. 29, 2020 | (CN) | 202011187523.3 |

(51) Int. Cl.

*B60N 2/28* (2006.01)
*B60N 2/02* (2006.01)
(Continued)

(52) U.S. Cl.

CPC ......... *B60N 2/2893* (2013.01); *B60N 2/0228* (2013.01); *B60N 2/268* (2023.08);
(Continued)

(58) Field of Classification Search

CPC .... B60N 2/2893; B60N 2/2816; B60N 2/268; B60N 2/2208; B60N 2/2806; B60N 2/2809; B60N 2/2821; B60N 2/2887; B60Q 9/00
See application file for complete search history.

(56) References Cited

U.S. PATENT DOCUMENTS 6,454,304 B1 9/2002 Steffens, Jr.
6,796,192 B2 * 9/2004 Sullivan .................. B60R 22/48 73/862.391
(Continued)

FOREIGN PATENT DOCUMENTS

AU 2982401 A 10/2001
AU 2011200416 A1 8/2011
(Continued)

OTHER PUBLICATIONS

International Search Report mailed in corresponding International Patent Application No. PCT/CN2020/129670 on Feb. 19, 2021, consisting of 6 pp. (English Translation Provided).
(Continued)

*Primary Examiner* — Philip F Gabler
(74) *Attorney, Agent, or Firm* — Volpe Koenig

(57) ABSTRACT

The present disclosure discloses a child safety seat, which is for being installed on a vehicle seat. The child safety seat includes a base having an anchor part connected to the vehicle seat; a seat coupled to the base; a top rod fixed to the rear of the base; a tether assembly including a top tether and a tether fixing portion that are connected with each other, the top tether being connected with the top rod and the tether
(Continued)

fixing portion being connected with the vehicle seat; and an alarm device including a switch which can be triggered when the top tether is tightened. The present disclosure also discloses a tether assembly and a support structure. The child safety seat can conveniently prompt that it is not correctly fixed, and can be conveniently fixed and adjusted, thereby improving the safety and riding comfort of the child safety seat.

15 Claims, 63 Drawing Sheets

(51) Int. Cl.
*B60N 2/26* (2006.01)
*B60Q 9/00* (2006.01)

(52) U.S. Cl.
CPC ......... *B60N 2/2806* (2013.01); *B60N 2/2809* (2013.01); *B60N 2/2816* (2023.08); *B60N 2/2821* (2013.01); *B60N 2/2887* (2013.01); *B60Q 9/00* (2013.01)

(56) References Cited

U.S. PATENT DOCUMENTS

| | | | | |
|---|---|---|---|---|
| 6,868,745 | B2 | 3/2005 | Sullivan et al. | |
| 7,224,270 | B2 | 5/2007 | Patterson et al. | |
| 7,322,648 | B2 | 1/2008 | Nakagawa et al. | |
| 7,422,283 | B2 | 9/2008 | Patterson et al. | |
| 7,552,969 | B2 | 6/2009 | Maciejczyk | |
| 7,648,199 | B2 | 1/2010 | Amesar et al. | |
| 8,235,463 | B2 | 8/2012 | Stiyer et al. | |
| 9,061,611 | B2 | 6/2015 | Love | |
| 9,610,870 | B2 | 4/2017 | Pos | |
| 9,663,032 | B1 * | 5/2017 | Appukutty | B60K 35/22 |
| 9,688,195 | B1 | 6/2017 | Hammond | |
| 9,994,150 | B2 * | 6/2018 | Appukutty | B60K 35/22 |
| 10,115,282 | B1 | 10/2018 | Merrill | |
| 10,163,316 | B2 * | 12/2018 | Roisen | B60N 2/003 |
| 10,752,134 | B2 | 8/2020 | Hoover | |
| 10,829,013 | B2 | 11/2020 | Cohen et al. | |
| 2008/0164990 | A1 * | 7/2008 | Anderson | B60N 2/267 340/457 |
| 2011/0193394 | A1 | 8/2011 | Stiyer | |
| 2015/0336481 | A1 | 11/2015 | Horsfall | |
| 2016/0207497 | A1 | 7/2016 | Seal et al. | |
| 2018/0099588 | A1 | 4/2018 | Anderson et al. | |
| 2018/0208085 | A1 | 7/2018 | Renaudin et al. | |
| 2018/0222439 | A1 | 8/2018 | Eaton | |
| 2020/0163418 | A1 | 5/2020 | Morgan | |

FOREIGN PATENT DOCUMENTS

| | | | |
|---|---|---|---|
| AU | 2016256730 | A1 | 11/2016 |
| CN | 2331383 | Y | 8/1999 |
| CN | 2489816 | Y | 5/2002 |
| CN | 101195353 | A | 6/2008 |
| CN | 202624140 | U | 12/2012 |
| CN | 103099468 | A | 5/2013 |
| CN | 103538553 | A | 1/2014 |
| CN | 104540709 | A | 4/2015 |
| CN | 205311388 | U | 6/2016 |
| CN | 205573678 | U | 9/2016 |
| CN | 107031559 | A | 8/2017 |
| CN | 107223095 | A | 9/2017 |
| CN | 207141004 | U | 3/2018 |
| CN | 108025660 | A | 5/2018 |
| CN | 108778829 | A | 11/2018 |
| CN | 208248021 | U | 12/2018 |
| CN | 109177830 | A | 1/2019 |
| CN | 109515264 | A | 3/2019 |
| CN | 209079854 | U | 7/2019 |
| CN | 110103786 | A | 8/2019 |
| CN | 110370993 | A | 10/2019 |
| CN | 210502378 | U | 5/2020 |
| CN | 111483362 | A | 8/2020 |
| CN | 211223124 | U | 8/2020 |
| CN | 112078449 | A | 12/2020 |
| EP | 2687400 | A2 | 1/2014 |
| EP | 2928338 | A1 | 6/2014 |
| FR | 2548983 | A1 | 1/1985 |
| FR | 2861658 | A1 | 5/2005 |
| FR | 2946582 | A1 | 12/2010 |
| FR | 2988352 | A1 | 9/2013 |
| JP | 2009517274 | A | 4/2009 |
| JP | 2015217696 | A | 12/2015 |
| JP | 2017149391 | A | 8/2017 |
| JP | 2018514457 | A | 6/2018 |
| JP | 3218277 | U | 10/2018 |
| JP | 2023501822 | A | 1/2023 |
| TW | 573636 | U | 1/2004 |
| TW | M504627 | U | 7/2015 |
| TW | 201716265 | A | 5/2017 |
| WO | 2007134097 | A2 | 11/2007 |
| WO | 2016183156 | A1 | 11/2016 |
| WO | 2019046990 | A1 | 3/2019 |

OTHER PUBLICATIONS

Written Opinion mailed in corresponding International Patent Application No. PCT/CN2020/129670 on Feb. 19, 2021, consisting of 6 pp.
Office Action issued in corresponding Taiwanese Patent Application No. 109140224 on Nov. 19, 2021 consisting of 9 pp.
Office Action issued in counterpart Chinese Patent Application 201911138004.5 dated Jul. 14, 2022.
Office Action issued in Counterpart Chinese Patent Application No. 201911138004.5 dated Feb. 5, 2023.
Office Action issued in Counterpart German Patent Application No. 10 2021 212 199.3 dated Feb. 2, 2023.
Non-Final Office Action issued in U.S. Appl. No. 17/512,915 dated Apr. 12, 2023.
Office Action issued in corresponding Australian Application No. 2020388822 dated Aug. 21, 2023.
Office Action issued in corresponding Japanese Application No. 2022-528687 dated Jul. 31, 2023.
Partial Supplementary European Search Report issued in corresponding Application No. 20890602.4 dated Dec. 11, 2023.
Non-Final Office Action issued in corresponding U.S. Appl. No. 17/512,915 dated Dec. 19, 2023.
"Non-Final Office Action issued in corresponding U.S. Appl. No. 17/777,585", Mailed Date: Mar. 13, 2024, 13 pages.
China National Intellectual Property Administration. Office Action for corresponding application CN 202011187523.3, dated Feb. 26, 2026. 67 pages. English translation provided.
First Office Action for corresponding Chinese Application No. 2020111875233 dated Aug. 1, 2025, 47 pages.
"Notice of Reasons for Refusal Issued in Corresponding Japanese Patent Application No. 2024-001865", Mailed Date: Nov. 25, 2024, 10 pages.
Japan Patent Office. Office Action issued in corresponding Japanese Application No. 2025-098585, dated Aug. 25, 2026. 6 pages.

* cited by examiner

TETHER ASSEMBLY, AND CHILD SAFETY SEAT AND SUPPORT STRUCTURE THEREOF

CROSS REFERENCE TO RELATED APPLICATIONS

This application is a division of U.S. patent application Ser. No. 17/777,585, filed on May 17, 2022, which is a 371 national phase of International Application No. PCT/CN2020/129670, filed on Nov. 18, 2020, which claims the benefit of priority to Chinese Application No. 201911138004.5, filed on Nov. 18, 2019, Chinese Patent Application No. 202011187515.9, filed on Oct. 29, 2020, and Chinese Patent Application No. 202011187523.3, filed on Oct. 29, 2020, which are incorporated by reference as if fully set forth.

TECHNICAL FIELD

The present disclosure relates to a tether assembly, a child safety seat and a support structure thereof.

BACKGROUND

A child safety seat is a seat specially designed for children. By assembling the child safety seat in a car for a child to sit on the child safety seat, the child is restrained by the child safety seat so as to ensure the child safe.

An existing child safety seat usually comprises a base and a seat disposed on the base. An ISOFIX interface is directly disposed on a side of the base, and a top tether is directly fixed on a back of the seat. By respectively connecting the top tether and the ISOFIX interface of the child safety seat to corresponding installation places in the car, the child safety seat may be fixed. When the child safety seat is installed on a car seat forward, the seat is installed on the base forward, the top tether and ISOFIX interface are located on the same side close to the car seat, and the seat is spaced apart from (i.e., not close to) the car seat at a position of the seat where the top tether is provided. Thus, a distance between the top tether and the corresponding installation place on the upper part of the car seat is relatively large, and the top tether with a greater length is required, resulting in higher cost of materials. When the child safety seat is installed on the car rearward, the seat is installed on the base rearward, and an installation direction of the base is the same as that when the child safety seat is installed forward. As the top tether is provided on the back of the seat, the top tether is located on a side away from the car seat, and the base is located on a side close to the car seat. When the top tether is installed at the installation place on the upper part of the car seat, the top tether needs to bypass the seat from the back to the front so as to be installed in place on the upper part of the car seat. The bypass path of the top tether will interfere with a passenger in the child safety seat, affecting the riding experience and comfort of the passenger in the child safety seat, and thus causing a possible situation that the passenger in the child safety seat may cry. Similarly, the distance between the top tether and the corresponding installation place on the upper part of the car seat is larger, and the top tether with a greater length is required to be installed on the car seat.

The ISOFIX interface is fixed on both sides of the base, and the top tether interface is fixed on an upper part of the child safety seat. Through three-point fixation, the child safety seat can be firmly fixed on the car seat and will not turn over when subjected to an impact.

Since there are many interfaces to be fixed on the child safety seat, and the fixing operation is complicated, the interface(s) may not be fixed in place during the use of the child safety seat, which is not easy to be noticed by an installer of the child safety seat, and may cause the child safety seat to lose its protective function. Therefore, it is necessary to provide a child safety seat that can prompt whether all of the interfaces are fixed in place.

When the child safety seat is installed on a car seat forward, the seat is installed on the base forward, the top tether and ISOFIX interface are located on the same side close to the car seat, and the seat is spaced apart from (i.e., not close to) the car seat at a position of the seat where the top tether is provided. Thus, a distance between the top tether and the corresponding installation place on the upper part of the car seat is relatively large, and the top tether with a greater length is required, resulting in higher cost of materials. When the child safety seat is installed on the car rearward, the seat is installed on the base rearward, and an installation direction of the base is the same as that when the child safety seat is installed forward. As the top tether is provided on the back of the seat, the top tether is located on a side away from the car seat, and the base is located on a side close to the car seat. When the top tether is installed at the installation place on the upper part of the car seat, the top tether needs to bypass the seat from the back to the front so as to be installed in place on the upper part of the car seat. The bypass path of the top tether will interfere with a passenger in the child safety seat, affecting the riding experience and comfort of the passenger in the child safety seat. Therefore, it is necessary to provide a child safety seat that facilitates to connect the top tether without interfering with a child siting in the seat.

The top tether needs to be tightened after it is fixed in place, so as to firmly connecting it to other parts of the child safety seat. However, in the traditional way, the length of the top tether can only be adjusted in one direction, moreover, in different types of cars, it may be difficult to apply sufficient tension due to limited space. Therefore, there is a need for a tether assembly which can easily tighten the top tether in a variety of ways and a child safety seat with such tether assembly.

When the child safety seat is subjected to impact, the base and the seat will bear a huge separation impact force. Therefore, it is necessary to provide a child safety seat that can provide sufficient bonding strength between the base and the seat.

SUMMARY

The present disclosure aims to provide a tether assembly, a child safety seat and a support structure thereof, which can alleviate or eliminate at least one of the above-mentioned defects.

An objective of the present disclosure is to provide a support structure of a child safety seat which can reduce a service length of a top tether and prevent an installation path of the top tether from interfering with a passenger.

Another objective of the present disclosure is to provide a child safety seat with a support structure, which can reduce a service length of a top tether and prevent an installation path of the top tether from interfering with a passenger.

In order to achieve the above objectives, in one aspect of the present disclosure, a child safety seat that is suitable to be installed on a vehicle seat is provided. The child safety seat includes: a base having an anchor part connected to a lower part of the vehicle seat; a seat coupled to the base; a top rod fixed to a rear part of the base; a tether assembly including a top tether and a tether fixing portion that are connected with each other, the top tether being connected with the top rod, and the tether fixing portion being connected with the vehicle seat; and an alarm device including a switch that may be triggered when the top tether is tightened.

In an embodiment, the alarm device is configured to give an alarm when the top tether is tightened and the anchor part is not fixed in place, or when the top tether is not tightened and the anchor part is fixed in place; and give no alarm (i.e., silent) when the top tether is tightened and the anchor part is fixed in place, or when the top tether is not tightened and the anchor part is not fixed in place.

In an embodiment, the child safety seat has a safe working state, a non-working state and a defective working state. In the safe working state, the top tether is tightened and the anchor part is fixed in place; in the non-working state, the top tether is not tightened and the anchor part is not fixed in place; and the defective working state is in a situation that the child safety seat is not in any one of the non-working state and the safe working state. The alarm device is configured to give an alarm when the child safety seat is in the defective working state, and give no alarm when the child safety seat is in the safe working state or in the non-working state.

In an embodiment, the alarm device includes a body part; a plurality of switches electrically connected with the body part to provide a signal to the body part, the body part being capable of determining whether to give an alarm based on the signal; and an alarm part for giving the alarm when the body part determines to give the alarm.

In an embodiment, the body part is disposed in the base; the alarm part gives the alarm with at least one of sound and light.

In an embodiment, the tether fixing portion is a hook. The tether assembly is a top-tether-type connector. The anchor part is an ISOFIX-type connector. The seat may rotate around an axis with respect to the base by an angle range. The axis is substantially perpendicular to an upper surface of the base. The base is disposed on the vehicle seat, and has a bottom surface and the upper surface inclined with respect to the bottom surface. The seat is provided for a child to sit. The switch may provide a signal whether the top tether is tightened or whether the anchor part is fixed in place to the body part.

In an embodiment, the child safety seat further includes a driver including at least one trigger part and at least one connecting part connected with the top tether, wherein the connecting part is connected with the trigger part, and the trigger part may trigger at least one switch.

In an embodiment, the child safety seat further includes a driver including a plurality of trigger parts and one or more connecting parts connected with the top tether, wherein each of the one or more connecting parts is connected with one of the trigger parts, and the trigger parts respectively trigger the switches, such that the switches provide signals to the body part.

In an embodiment, the connecting part is disposed inside the top rod, and is limited to move within a certain distance, and the plurality of trigger parts are respectively disposed on the base.

In an embodiment, an upper part of the top rod is provided with an opening, and the top tether passes through the opening and is partially disposed inside the top rod. The top rod includes two vertical rods symmetrically erected at the rear of the base; a transverse rod coupled to an upper part of each of the two vertical rods, a top end of each of the two vertical rods is provided with the opening, and two top tethers are partially disposed inside the top rod through the respective openings of the two vertical rods. The driver includes two connecting parts, and the two top tethers are connected to the two connecting parts, respectively.

In an embodiment, the connecting part is connected with the trigger part via a wire; Each of the trigger parts is limited to be movable in a certain distance range, and includes an elastic restoring member which is disposed to exert a force tending to restore each of the trigger parts to a state that the corresponding switch is not triggered. The plurality of trigger parts respond to tightening of the top tether or fixing of the anchor part in place, and each of the trigger parts triggers the corresponding switch by physical contact with the corresponding switch.

In an embodiment, the anchor part includes two anchor arms, and the alarm device is configured to give an alarm when one of the two top tethers is tightened and any one of the anchor arms is not fixed in place or the other of the two top tethers is not tightened, and give no alarm when both of the two top tethers are tightened and both of the anchor arms are fixed in place; or alternatively, give an alarm when one of the two anchor arms is fixed in place and any one of the two top tethers is not tightened or the other of the two anchor arms is not fixed in place, and give no alarm when both of the two top tethers are tightened and both of the anchor arms are fixed in place; or alternatively, give no alarm when the two top tethers are not tightened and the two anchor arms are not fixed in place.

In an embodiment, the top rod includes two vertical rods symmetrically erected at the rear of the base; a transverse rod coupled to a top end of each of the two vertical rods, an upper surface of the transverse rod is centrally provided with the opening, a lower surface of the transverse rod is centrally provided with an accommodating portion, one of the switches is disposed in the accommodating portion, and an end of the top tether is fixed in the accommodating portion. When the top tether is tightened, a pressure is applied to said one of the switches to trigger the switch, such that said one of the switches provides a signal to the body part.

In an embodiment, the child safety seat further includes two trigger parts, the anchor part includes two anchor arms, and the two trigger parts trigger corresponding switches in response to fixing in place of the two anchor arms, respectively.

In an embodiment, the child safety seat further includes a plurality of trigger parts, which may respectively trigger their corresponding switches, such that the corresponding switches provide signals to the body part, wherein an end of the top tether is connected to one of the trigger parts, and the top rod includes a vertical rod centrally erected at the rear of the base; an accommodating portion transversely disposed at a top end of the vertical rod, an upper surface of the accommodating portion is centrally provided with the opening, and the end of the top tether is located in the accommodating portion.

In an embodiment, said one of the trigger parts is disposed in the base and is limited to move within a certain distance. When the top tether is tightened, said one of the trigger parts triggers a corresponding switch via physical contact, such that the corresponding switch provides a signal to the body part.

In an embodiment, a length of the accommodating portion in a transverse direction is greater than a length of the vertical rod in the transverse direction; the end of the top tether is provided with a blocking portion which cannot pass through the opening; an inner space of the accommodating portion is provided to allow the end of the top tether to move a certain distance in a vertical direction; said one of the trigger parts is formed as a sheet, connected to the end of the top tether via a wire, and formed with an elongated through hole.

In an embodiment, the anchor part includes two anchor arms, and the alarm device is configured to give an alarm when the top tether is tightened and any one of the two anchor arms is not fixed in place, and give no alarm when the top tether is tightened and both of the anchor arms are fixed in place; or alternatively, give an alarm when the top tether is not tightened and any one of the two anchor arms is fixed in place, and give no alarm when the top tether is tightened and both of the anchor arms are fixed in place.

In an embodiment, the tether assembly further includes two adjusters, and any one of the two adjusters may adjust a length of the tether assembly.

In an embodiment, the two adjusters are disposed in opposite directions, and the top tether includes two adjusting belts and a connecting belt. The connecting belt is connected between the two adjusters, and the two adjusting belts respectively pass through the two adjusters to form two free ends toward opposite directions, such that the length of the tether assembly may be adjusted in opposite directions by pulling the two free ends.

In an embodiment, the tether fixing portion is fixed at a tailing end of one of the two adjusting belts.

In an embodiment, the tether fixing portion may be slidably connected to one of the two adjusting belts.

In an embodiment, the tether assembly further includes a two-way adjuster which can adjust a length of the tether assembly in two opposite directions.

In an embodiment, the base and the seat include annular parts corresponding to each other, and the base and the seat are coupled via the annular parts such that the seat is rotatable with respect to the base, and the annular parts of the base and the seat are respectively provided with reinforcements that may be coupled to each other so as to strengthen a coupling force between the seat and the base.

In an embodiment, the annular part of the base and the annular part of the seat are respectively provided with four reinforcements, the four reinforcements of the base are circumferentially disposed at a circumference of the annular part of the base at a constant interval, and the four reinforcements of the seat are respectively disposed at positions corresponding to the four reinforcements of the base, and one of the reinforcements of each of the base and the seat is disposed at a side of the respective annular part close to the top rod, and has a greater length extending on the circumference of the respective annular part than that of the remaining three reinforcements.

According to another aspect of the present disclosure, a child safety seat is provided. The child safety seat includes a base provided with an anchor part protruding backwardly; a seat coupled to the base; a top rod including a rod and an accommodating portion, the rod being disposed at the rear of the base, and the accommodating portion covering an upper part of the rod; a tether assembly including a top tether and a tether fixing portion, the top tether being sleeved on the top of the rod; an alarm device configured to give an alarm based on whether the top tether is tightened and whether the anchor part is fixed in place. The alarm device includes a body part configured to determine whether to give an alarm; a plurality of switches electrically connected with the body part so as to provide signals to the body part; an alarm part configured to give the alarm when the body part determines to give the alarm.

In an embodiment, the top tether is sleeved on the top of the rod, and the accommodating portion limits a moving range of the top tether on the rod, wherein an end of the top tether is disposed in an inner space of the accommodating portion and provided with a trigger part, and the inner space of the accommodating portion is further provided with one of the switches, and when the top tether is tightened, the trigger part triggers said one of the switches, such that said one of the switches provides a signal to the body part.

In an embodiment, a through hole is formed at the top of the rod, wherein an end of the top tether passes through the through hole and is disposed in the inner space of the accommodating portion and provided with a trigger part, the inner space of the accommodating portion is further provided with one of the switches, and tightening of the top tether will drive the trigger part to trigger said one of the switches, such that said one of the switches provides a signal to the body part.

In an embodiment, the accommodating portion is provided with a flexible member, and the flexible member is disposed at an inner side of the through hole to prevent the top tether from directly contacting the inner side of the through hole.

In an embodiment, the accommodating portion is provided with an elastic member, and the elastic member is disposed between the accommodating portion and the trigger part, so as to exert a force on the trigger part which tends to make the trigger part not trigger said one of the switches.

According to another aspect of the present disclosure, a child safety seat is provided. The child safety seat includes an alarm device for providing an alarm mechanism for whether the child safety seat has been disposed safely, the alarm device including a plurality of switches capable of being opened and closed; a body part capable of determining whether to give an alarm based on opening and closing of the plurality of switches; an alarm part for giving the alarm when the body part determines to give the alarm.

In an embodiment, the child safety seat further includes a base provided with an anchor part protruding backwardly, the anchor part including two anchor arms; a top rod fixed to the rear of the base; and a tether assembly partially disposed inside the top rod. The plurality of switches include two switches that are closed if the two anchor arms are fixed in place; and a switch that is closed if the tether assembly are tightened.

In an embodiment, the child safety seat further includes a base provided with an anchor part protruding backwardly, the anchor part including two anchor arms; a top rod fixed to the rear of the base; a tether assembly including two top tethers, the two top tethers being partially disposed inside the top rod respectively. The plurality of switches include two switches that are closed respectively if the two anchor arms are fixed in place; and two switches that are closed respectively if the two top tethers are tightened.

In an embodiment, when at least one of the switches is closed, but the switches are not all closed, the body part determines to give the alarm; when all the switches are opened or closed, the body part determines not to give an alarm.

In an embodiment, the alarm part includes at least one of an optical warning device, which may prompt opening and closing of each of the plurality of switches, and an acoustic warning device, which sounds when the body part determines to give the alarm.

In an embodiment, the optical warning device is disposed on an upper surface of a front part of the base to give a prompt through light emission of a plurality of LEDs.

According to another aspect of the present disclosure, a child safety seat is provided. The child safety seat includes a base provided with two anchor arms protruding backwardly; a seat coupled to the base; a top rod including a rod disposed at the rear of the base; a tether assembly including a top tether, an end of which is fixed to a rear side of the top of the rod, and extends through a lower side, a front side and an upper side of the rod, and further extends away from the top; an alarm device provided with three switches, the alarm device giving an alarm when any one of the three switches is not triggered; three trigger parts for triggering the three switches respectively, wherein one of the three trigger parts is disposed to protrude downward from a lower side of the top of the rod to contact the top tether; when the top tether is tightened, the top tether pushes said one of the trigger parts upward to trigger one of the three switches, and when the two anchor arms are fixed in place, the other two of the trigger parts trigger the other two of the switches respectively.

In an embodiment, the top rod further includes a cover plate, which is sleeved on the top of the rod and has an opening for the top tether to extend out.

According to another aspect of the present disclosure, a two-way adjuster is provided. The two-way adjuster includes an adjuster housing having two first openings toward opposite directions; two buttons respectively disposed at the two first openings and capable of translating in a direction of entering and leaving from the adjuster housing; a fixed sheet fixed at the bottom of the adjuster housing and formed with two second openings; two locking members disposed inside the adjuster housing and respectively translate along with the two buttons to form a locked position and a released position, wherein two belts are able to enter the adjuster housing via the two second openings, pass through a gap between the two locking members and the fixed sheet, and extend out of the adjuster housing to form free ends extending in two opposite directions, and wherein in the locked position, the two locking members and the fixed sheet respectively clamp the two belts, and in the released position, the two locking members and the fixed sheet allow the two belts to move.

In an embodiment, an elastic restoring member is disposed between the two buttons to respectively provide the two buttons with a force to translate to the outside of the adjuster housing; an upper surface of the adjuster housing is formed with two tightening indicating windows to respectively indicate whether the two belts are tightened.

According to another aspect of the present disclosure, a child safety seat is provided. The child safety seat includes a base; a seat coupled to the base and including a backrest, a reinforcing tube being formed at a top end of the backrest, and two sides of the reinforcing tube respectively forming with a limit ring; a tether assembly including a top tether and a tether fixing portion, the top tether being connected to both sides of a lower end of the backrest and extends upward along the backrest through the limit ring.

In an embodiment, the top tether is connected to a flexible member of the backrest.

In an embodiment, the connecting part includes a fixing member and a moving member, a through hole is formed on the moving member, and the fixing member passes through the through hole and both ends of the fixing member are fixed to the top rod, and the through hole allows the moving member to move within a certain distance with respect to the fixing member.

In an embodiment, an upper part of the top rod is provided with an opening, and the top tether passes through the opening and is partially disposed inside the top rod, and the top rod includes two vertical rods symmetrically erected at the rear of the base; a transverse rod coupled to an upper part of each of the two vertical rods, a top end of each of the two vertical rods is provided with the opening, and two top tethers are partially disposed inside the top rod through the respective openings of the two vertical rods; the driver includes two connecting parts, and the two top tethers are connected to the two connecting parts respectively.

In an embodiment, the connecting part is connected to the trigger part via a linkage; the trigger part is limited to be movable in a certain distance range, and includes an elastic restoring member which is disposed to exert a force tending to restore each of the trigger parts to a state that the corresponding switch is not triggered; the plurality of trigger parts respond to tightening of the top tether, and the trigger parts are triggered by contacting with corresponding switches.

In an embodiment, the top rod includes a vertical rod erected at the rear of the base; and a transverse rod coupled to a top end of the vertical rod. An upper surface of the transverse rod is provided with an opening, a lower surface of the transverse rod is provided with an accommodating portion, the switch is disposed in the accommodating portion, an end of the top tether is fixed in the accommodating portion, and when the top tether is tightened, a pressure is applied to the switch to be triggered, such that the switch provides a signal to the body part.

In an embodiment, the top tether surrounds the top rod and the trigger part, and when the top tether is tightened, a pressure is applied to the trigger part to move towards inside of the top rod so as to trigger the switch.

In an embodiment, the child safety seat further includes a plurality of trigger parts, which may respectively trigger their corresponding switches, such that the corresponding switches provide signals to the body part, wherein an end of the top tether is connected to one of the trigger parts, and the top rod includes a vertical rod centrally erected at the rear of the base; an accommodating portion transversely disposed at a top end of the vertical rod, an upper surface of the accommodating portion is centrally provided with the opening, and the end of the top tether is located in the accommodating portion.

In an embodiment, said one of the trigger parts is disposed in the base and is limited to move within a certain distance. When the top tether is tightened, said one of the trigger parts triggers a corresponding switch via contact.

In an embodiment, a length of the accommodating portion in a transverse direction is greater than a length of the vertical rod in the transverse direction; the end of the top tether is provided with a blocking portion which cannot pass through the opening; an inner space of the accommodating portion is provided to allow the end of the top tether to move a certain distance in a vertical direction; said one of the trigger parts is formed as a sheet, connected to the end of the top tether via a linkage, and formed with an elongated through hole.

In an embodiment, the trigger part is connected with an elastic restoring member, and the elastic restoring member exerts a force to the trigger part which tends to make the trigger part not trigger the switch, and a stopper passing through the elongated through hole is formed inside the base, and the stopper limits a moving range of the trigger part.

In another aspect, a child safety seat is provided. The child safety seat includes a base provided with an anchor part; a seat coupled to the base; a top rod including a rod and an accommodating portion, the rod being disposed at the rear of the base, and the accommodating portion being disposed on the rod; and a tether assembly including a top tether and a tether fixing portion, the top tether being disposed at the top of the rod.

In an embodiment, the top tether is sleeved on the top of the rod, and the accommodating portion limits a moving range of the top tether on the rod, wherein an end of the top tether is disposed in an inner space of the accommodating portion and provided with a trigger part, and the inner space of the accommodating portion is further provided with at least one switch, the trigger part triggers the at least one switch when the top tether is tightened.

In an embodiment, a through hole is formed at the top of the rod, wherein an end of the top tether passes through the through hole, and is disposed in the inner space of the accommodating portion and provided with a trigger part, and the inner space of the accommodating portion is further provided with a switch, and tightening of the top tether will drive the trigger part to trigger the switch.

In an embodiment, the accommodating portion is provided with a flexible member which is disposed at an inner side of the through hole to prevent the top tether from directly contacting the inner side of the through hole.

In an embodiment, an elastic restoring member is disposed in the accommodating portion, and the elastic restoring member is disposed between the accommodating portion and the trigger part, so as to exert a force on the trigger part which tends to make the trigger part not trigger the switch.

In an embodiment, the restoring elastic member connects the accommodating portion and the trigger part to exert a tensile force, and the accommodating portion is formed with a groove for the trigger part to move, and the trigger part is capable of triggering the switch when moving in the groove.

In another aspect, a child safety seat is provided. The child safety seat includes an alarm device for providing an alarm mechanism for whether the child safety seat has been disposed safely, and the alarm device includes a plurality of switches capable of being opened and closed; a body capable of determining whether to give an alarm based on opening and closing of the plurality of switches; an alarm part for giving the alarm when the body part determines to give the alarm.

In an embodiment, the child safety seat further includes a base provided with an anchor part protruding backwardly, the anchor part including two anchor arms; a top rod fixed to the rear of the base; and a tether assembly partially disposed inside the top rod. The plurality of switches include two switches that are closed respectively if the two anchor arms are fixed in place; and a switch that is closed if the tether assembly are tightened.

In an embodiment, the child safety seat further includes a base provided with an anchor part protruding backwardly, the anchor part including two anchor arms; a top rod fixed to the rear of the base; and a tether assembly including one or two top tethers, the two top tethers being partially disposed inside the top rod respectively. The plurality of switches include two switches that are closed respectively if the two anchor arms are fixed in place; and two switches that are closed respectively if the one or two top tethers are tightened.

In an embodiment, the child safety seat includes a trigger part disposed from a lower side of the top of the top rod, wherein the top tether wraps around the trigger part, such that when the top tether is tightened, the top tether exerts a pressure on the trigger part, and the trigger part moves upward to trigger the switch.

In an embodiment, the top rod further includes a cover plate, and the cover plate is sleeved on the top of the top rod and has an opening for the top tether to extend out. A groove for the trigger part to move is formed in the cover plate, and an elastic restoring member is connected between the cover plate and the trigger part to exert a tensile force. The switch is at least partially disposed in the groove. When the trigger part moves in the groove, the switch is triggered.

In another aspect, a child safety seat is provided. The child safety seat is suitable to be installed on a vehicle seat, and includes: a base having an anchor part connected to a lower part of the vehicle seat; a seat coupled to the base; a top rod fixed to the rear of the base; a tether assembly including a top tether and a tether fixing portion that are connected with each other, the top tether being connected with the top rod, and the tether fixing portion being connected to an upper part of the vehicle seat; and an alarm device sending an alarm signal when a situation that a preset condition is satisfied is detected, and sending no alarm when a situation that the preset condition is not satisfied is detected, the preset condition refers to an alarming state based on whether the top tether is tightened and/or whether the anchor part is fixed in place.

In another aspect, a child safety seat is provided. The child safety seat includes a base; a seat rotatably coupled to the base and including a backrest, a reinforcing tube being formed at a top end of the backrest; and a tether assembly including a top tether and a tether fixing portion connected with each other, the top tether being connected to a lower end of the backrest, and the seat having a reinforcing structure engaged with the base.

In an embodiment, the base and the seat include annular parts corresponding to each other, and the base and the seat are coupled such that the seat is rotatable with respect to the base, and the annular parts of the base and the seat are respectively provided with a base reinforcement and a seat reinforcement that are coupled with each other to strengthen a coupling force between the seat and the base.

In an embodiment, the base has a plurality of base reinforcements and the seat has a plurality of seat reinforcements, the base reinforcements are circumferentially and uniformly disposed at a circumference of the annular part of the base, the seat reinforcements are respectively disposed at positions corresponding to the base reinforcements, and the base reinforcements have different lengths.

In an embodiment, the base has an annular part, the seat is provided with a seat reinforcement, and the seat reinforcement is engaged with the annular part of the base to strengthen a coupling force between the seat and the base.

In an embodiment, the seat includes two seat reinforcements, and positions of the two seat reinforcements correspond to opposite sides of the annular part of the base.

In an embodiment, the top tether is connected to a flexible member of the backrest, and the top tether is disposed at the inner side of the backrest and extends away from the backrest via the limit ring.

In an embodiment, a limit ring is formed at two sides of the reinforcing tube respectively, and the top tether extends upward along the backrest through the limit ring.

In an embodiment, the base has a base reinforcement, and the seat reinforcement may be engaged with the base reinforcement.

In an embodiment, the base has an annular part, and the seat reinforcement may be engaged with the annular part.

In an aspect, the disclosure provides a tether assembly for fixing a child safety seat to a vehicle, wherein the tether assembly comprises: an adjuster for adjusting a length of the tether assembly; a tether fixing portion being fixable to a corresponding fixing portion of the vehicle; a top tether including at least two belts, the top tether connects the child safety seat to the tether fixing portion via the adjuster, and at least one belt of the top tether passing through the adjuster to form at least two free ends.

In an embodiment, the child safety seat includes a base, a seat disposed above the base, and a top rod erected at a rear of the base.

In an embodiment, the adjuster is a one-way adjuster, the top tether includes three belts, one ends of a first belt and a second belt of the three belts are respectively fixed to both sides of the child safety seat, the other ends of the first belt and the second belt of the three belts are respectively connected to both ends of a third belt of the three belts via two one-way adjusters, the tether fixing portion is fixedly or slidably connected to any one of the three belts, and the top tether passes through the two one-way adjusters to form two free ends.

In an embodiment, the two one-way adjusters are oriented in a same direction, such that the two free ends extend in the same direction.

In an embodiment, the two one-way adjusters are oriented in opposite directions, such that the two free ends extend in the opposite directions.

In an embodiment, the tether fixing portion is fixedly or slidably connected to the first belt or the second belt.

In an embodiment, the tether fixing portion is fixedly or slidably connected to the third belt.

In an embodiment, the adjuster is a two-way adjuster or a one-way adjuster, and the at least two free ends are formed by the top tether passing through the two-way adjuster or the one-way adjuster.

In an embodiment, the top tether includes three belts, one ends of a first belt and a second belt of the three belts are respectively fixed to both sides of the child safety seat, the other ends of the first belt and the second belt of the three belts are connected to one end of a third belt of the three belts via a connecting member.

In an embodiment, the top tether further includes a fourth belt, the third belt is connected to the fourth belt via two one-way adjusters or one two-way adjuster, and the tether fixing portion is fixedly or slidably connected to the fourth belt.

In an embodiment, the top tether includes three belts, both ends of a first belt of the three belts are respectively fixed to both sides of the child safety seat, one end of a second belt of the three belts is fixedly or slidably connected to the first belt, one end of a third belt of the three belts is connected to the other end of the second belt via two one-way adjusters or one two-way adjuster, and the tether fixing portion is fixedly or slidably connected to the other end of the third belt.

In an embodiment, the top tether includes two belts, one ends of the two belts are respectively fixed to both sides of the child safety seat, the other ends of the two belts are respectively connected to the adjuster, the tether fixing portion is fixedly or slidably connected to one of the two belts, the adjuster is a two-way adjuster, and the two-way adjuster can adjust a length of the tether assembly in two opposite directions.

In an embodiment, the top tether includes two belts, one end of a first belt of the two belts is fixed to the child safety seat, the other end of the first belt is connected to one end of a second belt of the two belts via two one-way adjusters or one two-way adjuster, and the tether fixing portion is fixedly or slidably connected to the other end of the second belt.

In an embodiment, the two one-way adjusters are oriented in opposite directions, and the two one-way adjusters are connected to each other by a connecting belt.

In an embodiment, the adjuster has a locked position and a released position, in the locked position, the top tether passing through the adjuster is clamped by the adjuster, and in the released position, the adjuster allows the top tether passing through the adjuster to move relative to the adjuster.

According to another aspect of the disclosure, a child safety seat is provided. The child safety seat comprises: a base provided with an anchor part protruding backwardly; a seat coupled to the base; a top rod fixed to a rear of the base; and the tether assembly mentioned above, the top tether of the tether assembly is fixed to the top rod.

In an embodiment, the top rod includes two vertical rods and a fixing portion, and each of tops of the two vertical rods is provided with an opening.

In an embodiment, the top rod includes two vertical rods and a fixing portion, and an upper surface of the fixing portion is centrally provided with an opening.

In an embodiment, the top rod includes one vertical rod and one accommodating portion, and an upper surface of the accommodating portion is centrally provided with an opening.

According to another aspect of the disclosure, a tether assembly for fixing a child safety seat to a vehicle is provided, wherein the tether assembly comprises: a two-way adjuster being able to adjust a length of the tether assembly in two opposite directions; a tether fixing portion being fixable to a corresponding fixing portion of the vehicle; a top tether including more than a plurality of belts separated from each other, wherein the top tether connects the two-way adjuster to the child safety seat, and connects the two-way adjuster to the tether fixing portion.

In an embodiment, the two-way adjuster includes: an adjuster housing having two first openings facing opposite directions; two button respectively disposed at the two first openings and movable in directions of entering and leaving the adjuster housing; a fixed sheet fixed on a bottom of the adjuster housing and formed with two second openings; two locking members disposed inside the adjuster housing and being movable along with the two buttons to form a locked position and a released position.

In an embodiment, the plurality of belts include two belts, the two belts being able to enter the adjuster housing via the two second openings, pass through a gap between the two locking members and the fixed sheet, and extend out of the adjuster housing to form free ends extending in two opposite directions, and wherein in the locked position, the two locking members and the fixed sheet respectively clamp the two belts, and in the released position, the two locking members and the fixed sheet allow the two belts to move.

In an embodiment, in the released position, when the free ends are pulled, the tether assembly is shortened, and when portions of the two belts other than the free ends are pulled, the tether assembly extends longer.

In an embodiment, a spring is disposed between the two buttons for respectively applying force to the two buttons for moving out of the adjuster housing.

In an embodiment, two tightening indicating windows are formed on an upper surface of the adjuster housing to respectively indicate whether the two belts are tightened.

The present disclosure provides a support structure of a child safety seat. The support structure includes a base, a top rod and a top tether. The base is provided with an installation position for installing the seat, the top rod is fixed on the base and located at a side of the installation position, and an end of the top tether is fixed on the top rod.

Compared with the prior art, in the support structure of the child safety seat of the present disclosure, a top rod is fixed on the base and disposed at a side of an installation position for installing the seat, and an end of the top tether is fixed on the top rod. When the seat is installed in the installation position forward, the top rod is located behind the seat; and after the child safety seat is installed in the car seat, a distance between the top rod and the car seat is shorter than a distance between the seat and the car seat. Therefore, a length required for the top tether fixed on the top rod to be connected to the corresponding position of the car seat is smaller than a length required by the existing top tether fixed on the seat, thereby reducing the service length of the top tether and further saving the material cost of the top tether. When the seat is reversely installed in the installation position, the installation position of the base remains unchanged, and only the seat is reversely installed. At this time, the top rod and the top tether are located in front of the seat, and an installation path of the top tether connected to the corresponding position of the car seat is the same as an installation path thereof when the seat is installed forward in the installation position. Compared with the existing top tether fixed on the seat, the installation path of the top tether of the present disclosure connected to the corresponding position of the car seat will not interfere with the passenger in the seat, thus improving the riding comfort of the passenger in the seat and thus avoiding the passenger in the seat from crying.

Preferably, the top rod includes a supporting pipe and a transverse rod part, the supporting pipe is fixed on the base, and the transverse rod part is installed on the supporting pipe.

Preferably, the supporting pipe has a hollow structure, the transverse rod part is provided with a perforation, the perforation is communicated with inside of the supporting pipe, and an end of the top tether passes through the perforation and is fixed to an inner wall of the supporting pipe.

Preferably, a first connecting member is also included, the first connecting member penetrates inside the supporting pipe, an end of the top tether is provided with a woven loop, and the woven loop is sleeved on the first connecting member.

Preferably, a second connecting member is also included, the transverse rod part is provided with a first connecting hole, the supporting pipe is provided with a second connecting hole, and the second connecting member passes through the first connecting hole and the second connecting hole to fix the transverse rod part on the supporting pipe.

Preferably, two supporting pipes are provided and fixed on the base at intervals, the transverse rod part is fixed on the two supporting pipes, and the transverse rod part is provided with two perforations communicated with insides of the two supporting pipes respectively.

Preferably, the top tether includes two fixing portions and an installing portion formed by intersection of two fixing portions, wherein the two fixing portions respectively pass through the two perforations and are respectively fixed in the two supporting pipes, and the installing portion is configured to connect with a car seat.

Preferably, the other end of the top tether is provided with a first fixing member, the base is provided with a storage position for storing the top tether, and the first fixing member is detachably connected to the storage position.

Preferably, the base is provided with a second fixing member at the storage position, and the first fixing member is detachably connected with the second fixing member.

Preferably, one of the first fixing member and the second fixing member has a male buckle structure, and the other of the first fixing member and the second fixing member has a female buckle structure.

Preferably, the storage position is in a concave structure.

Preferably, a reinforcing sheet for improving strength of the top rod is also included, and the reinforcing sheet is fixedly connected with the base and the top rod respectively.

Preferably, a bottom of the reinforcing sheet is fixed on the base, and a side wall of the reinforcing sheet is fixedly connected with the top rod.

Preferably, a lower part of the top rod is thicker than an upper part of the top rod.

Preferably, the base includes a casing and a bracket, the bracket is disposed inside the casing, and the top rod passes through the casing and is fixedly connected with the bracket.

In order to achieve the second objective, the present disclosure provides a child safety seat, which includes a seat and the support structure of the child safety seat, the seat being installed at an installation position.

Compared with the prior art, the child safety seat of the present disclosure has a support structure, a top rod is fixed on the base and disposed at a side of an installation position for installing the seat, and an end of the top tether is fixed on the top rod. When the seat is installed in the installation position forward, the top rod is located behind the seat; and after the child safety seat is installed in the car seat, a distance between the top rod and the car seat is shorter than a distance between the seat and the car seat. Therefore, a length required for the top tether fixed on the top rod to be connected to the corresponding position of the car seat is smaller than a length required by the existing top tether fixed on the seat, thereby reducing the service length of the top tether and further saving the material cost of the top tether. When the seat is reversely installed in the installation position, the installation position of the base remains unchanged, and only the seat is reversely installed. At this time, the top rod and the top tether are located in front of the seat, and an installation path of the top tether connected to the corresponding position of the car seat is the same as an installation path thereof when the seat is installed forward in the installation position. Compared with the existing top tether fixed on the seat, the installation path of the top tether of the present disclosure connected to the corresponding position of the car seat will not interfere with the passenger in the seat, thus improving the riding comfort of the passenger in the seat and thus avoiding the passenger in the seat from crying.

Preferably, when the seat is installed in the installation position forward, the top rod is located at the rear of the seat; and when the seat is reversely installed in the installation position, the top rod is located in front of the seat.

The disclosure has at least one of the following beneficial effects:

The child safety seat of the present disclosure can conveniently prompt whether it is correctly fixed, thereby improving the safety of the child safety seat. Furthermore, the child safety seat of the present disclosure can accurately prompt the specific connector that is not fixed in place. Since a top rod is provided, the seat can be provided in different directions more freely, and riding of a child will not be interfered by the tether assembly. The tether assembly can be tightened in at least two directions, such that the installation of the child safety seat is more convenient; meanwhile, as the tightening force is more conveniently applied, it can be ensured that the tether assembly is tightened, improving the safety of the child safety seat. The reinforcement between the base and the seat improves the impact resistance of the child safety seat.

The tether assembly of the disclosure can be tightened in at least two directions, such that the mounting of the tether assembly is more convenient. Meanwhile, because the tightening force may be applied more easily, may also be assuredly tightened, and the safety of the tether assembly may be improved. The tether assembly of the disclosure can be adjusted in length by a more extent. The tether assembly of the disclosure can be tightened on different sides of the child safety seat, such that no matter the child safety seat is placed on which side of the vehicle seat, tightening operation can be conveniently performed.

BRIEF DESCRIPTION OF THE DRAWINGS

By considering the following detailed description of the preferred embodiments of the disclosure in conjunction with the accompanying drawings, various objectives, features and advantages of the disclosure will become more apparent. The drawings are merely exemplary illustrations of the disclosure and are not necessarily drawn to scale. In the drawings, the same reference numerals always refer to the same or similar parts, in which.

DETAILED DESCRIPTION

In order to further explain the principle and structure of the disclosure, the preferred embodiments of the disclosure will be described in detail with reference to the accompanying drawings. However, these embodiments are only for illustrative and explanatory purposes, and cannot be used to limit the patent protection scope of the disclosure.

The terms used in the disclosure are only for the purpose of describing specific embodiments, and are not intended to limit the disclosure. The singular forms of “a”, “said” and “the” used in the disclosure and the appended claims are also intended to include plural forms, unless the context clearly indicates other meanings. It should also be understood, the terms “and/or” as used herein refers to and includes any or all possible combinations of one or more associated listed items.

The following is a more detailed description of the various concepts and implementations of the tether assembly and the child safety seat. The seat of the child safety seat may be rotated between a rearward position, a lateral position and a forward position for facilitating use. It should be understood, the various concepts introduced above and discussed in more detail below can be implemented in a variety of ways. Furthermore, examples of specific implementations and applications are mainly for illustrative purposes, such that those skilled in the art can implement implementations and alternatives that are obvious to those skilled in the art.

Figure 1:
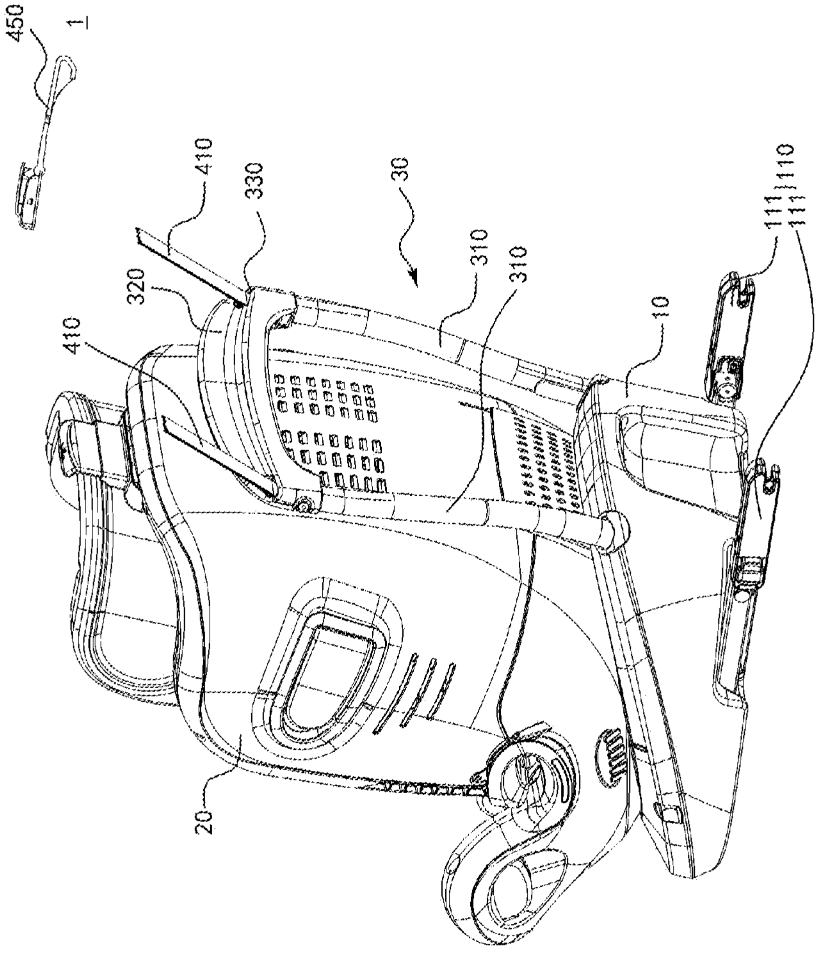
FIG. 1 is a perspective view of a child safety seat according to a first embodiment of the present disclosure.
Figure 2:
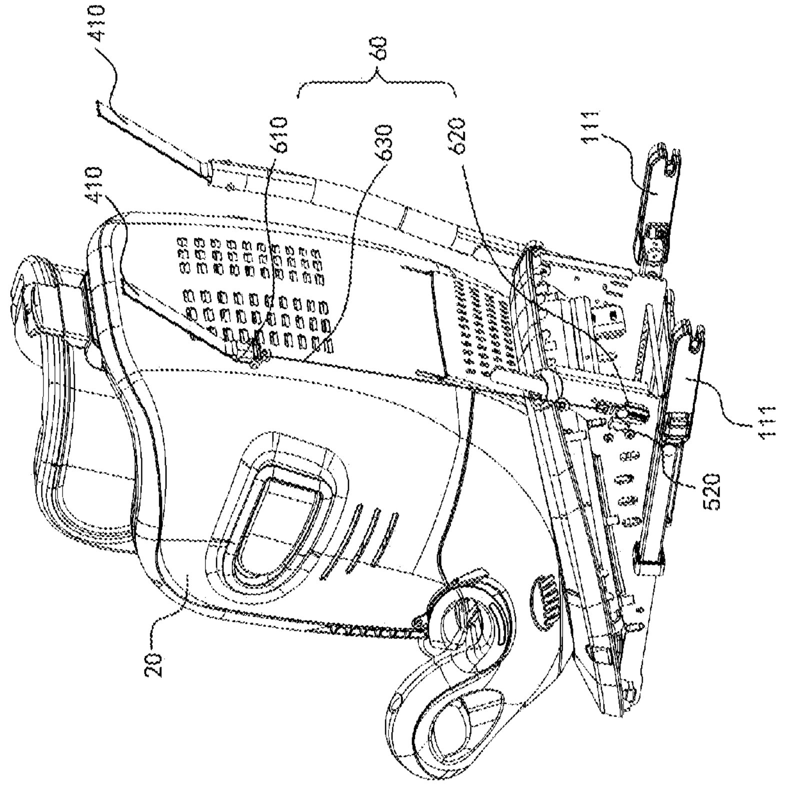
FIG. 2 is a perspective view of a child safety seat according to the first embodiment of the present disclosure, in which the child safety seat is partially removed to show its internal structure.

FIG. 1 is a perspective view of a child safety seat according to a first embodiment of the present disclosure, and FIG. 2 is a perspective view of the child safety seat according to the first embodiment of the present disclosure, in which the child safety seat is partially removed to show its internal structure.

The child safety seat 1 may include a base 10 provided with an anchor part 110 protruding backwardly; a seat 20 coupled to the base 10; a top rod 30 fixed to the rear of the base 10; a tether assembly 40 including a top tether 410 and a tether fixing portion 450, the top tether 410 being connected with the top rod; and an alarm device 50 giving an alarm based on whether the top tether 410 and the anchor part 110 are fixed in place. The alarm device of this embodiment may be in any way that can remind or inform an installer of the child safety seat 1. For example, the alarm device 50 may perform an alarm by at least one of sound and light. It can be understood that the alarm device 50 may also perform the alarm in any other ways.

Generally, when the tightening of the top tether 410 is detected, it can be determined that the top tether 410 has been fixed in place. Optionally, the alarm device 50 may give an alarm directly based on whether the top tether 410 is fixed to a corresponding interface on the vehicle.

In an embodiment, an upper part of the top rod 30 may be provided with an opening 330. The top tether 410 may pass through the opening 330 and be partially disposed inside the top rod 30.

The anchor part 110 may be an ISOFIX-type connector (a connector that can be fixed with ISOFIX interface), and includes two anchor arms 111. The tether assembly 40 may be a top-tether-type connector (a connector that can be fixed with an interface of the top tether).

The tether fixing portion 450 may be a hook (which can also be called as “hook anchor”), that is fixedly or slidably disposed at a distal end of the top tether 410.

An end of the tether fixing portion 450 may be connected with the top tether 410, and the other end of the tether fixing portion 450 may be connected with a corresponding interface on a vehicle.

The seat 20 is rotatably disposed on the base 10, and may rotate in an angle range with respect to the base 10 along an axis substantially perpendicular to an upper surface of the base 10, for example, 0 to 180 degrees, 90 to 270 degrees, 0 to 360 degrees, or the like. The angle range may be in other situations. The reference of the above rotation is that a position shown in FIG. 1 is regarded as 0 degree.

A lower surface and the upper surface of the base 10 may form an angle such that the seat 20 tilts forward.

The top rod 30 may include: vertical rods 310 symmetrically erected (basically vertically disposed) at the rear of the base 10; a transverse rod 320*a* coupled to an upper part of each of the vertical rods 310. A top end of each of the vertical rods 310 is provided with an opening 330, and the top tether (or both ends of a top tether) is partially disposed inside the top rod 30 through the opening of the vertical rod 310. The vertical rod 310 and the transverse rod 320*a* may be made of different materials. For example, the vertical rod 310 is made of metal, while the transverse rod 320*a* is made of plastic.

The opening 330 may be disposed at the highest position of the vertical rod 310, or disposed on the transverse rod 320*a*, or the upper part (but not the highest position) of the vertical rod 310. This may be selected according to the position requirements of the top tether 410.

Referring to FIG. 2, the child safety seat 1 may further include a driver 60. The driver 60 may include a trigger part 620 and a connecting part 610. Optionally, the driver 60 includes a linkage 630 that connects the trigger part 620 and the connecting part 610. The linkage 630 is, for example, a steel wire, but it is not limited thereto. The trigger part 620 may be disposed at a side of the base 10, such as a position where the vertical rod 310 extends downward. For example, a trigger part 620 may be respectively provided on both sides of the base 10. The connecting part 610 is connected to a tailing end of the top tether 410 extending into the vertical rod 310 in the vertical rod 310. The above-mentioned connecting part 610 may be limited to vertically move only a limited distance in the vertical rod 310. The connecting part 610 is movably disposed in the vertical rod 310. In an embodiment, the connecting part 610 may have a fixing member (e.g., a rod) and a moving member. The moving member is fixed to the tailing end of the top tether 410, and may be formed with an elongated through hole. The fixing member may pass through the elongated through hole and be fixed to the vertical rod 310 substantially horizontally. Since a vertical length of the elongated through hole is larger than that of the fixing member, the moving member may vertically move a certain distance with respect to the fixing member. It should be understood that other ways can be used to limit the connecting part 610.

Figure 3:
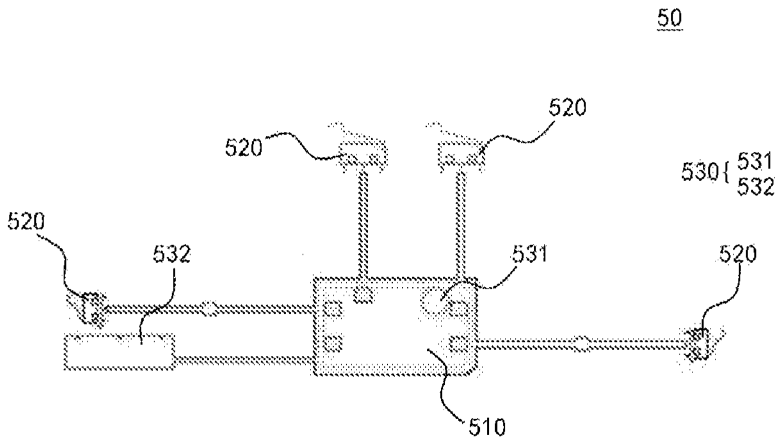
FIG. 3 is a schematic view of an alarm device of the child safety seat of the present disclosure.
Figure 4:
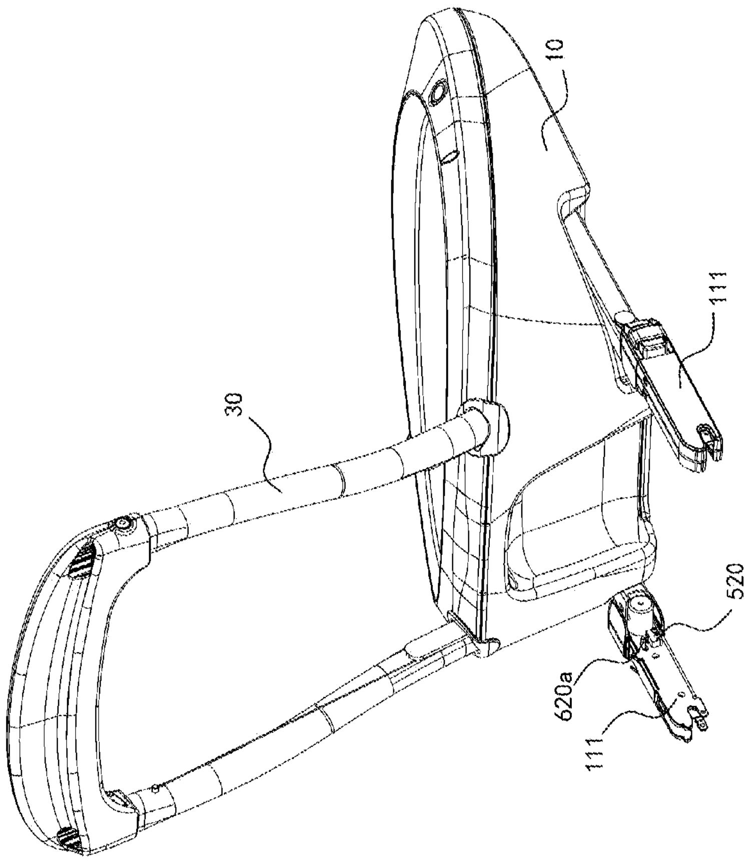
FIG. 4 is a perspective view of some parts of the child safety seat of the present disclosure.

In addition, a trigger part 620*a* may be provided at the anchor arm 111 (as shown in FIG. 4) to be actuated when the anchor arm 111 is fixed to an interface (such as an ISOFIX interface) on a vehicle seat. In an embodiment, both anchor arms 111 are provided with a trigger 620*a*. Optionally, only one of the two anchor arms 111 is provided with a trigger 620*a*. Optionally, only one trigger part 620*a* is provided on one of two sides of the base 10 to connect a tailing end of the top tether 410. Referring to FIGS. 2 and 3, the alarm device 530 may include a body part 510; a plurality of switches 520 electrically connected to the body part 510 so as to provide signals to the body part 510, and the body part 510 is capable of determining whether to give an alarm based on the signals; an alarm part 530 performing the alarm when the body part 510 determines to give the alarm. The body 510 may be provided in the base 10.

The anchor arm 111 may be connected to an end of the trigger part 620*a*, and the trigger part 620*a* is slidably disposed with respect to the base 20. When the anchor arm 111 is engaged with the corresponding interface on the vehicle, it drives the trigger part 620*a* to move to trigger the corresponding switch 520. That is, when the anchor arm 111 (an ISOFIX connector) is operated to drive the trigger part 620*a* to move when it is clamped with the corresponding interface (an ISOFIX anchor) on the vehicle, and the trigger part 620*a* will push the corresponding switch 520 to be closed. Further, the base 20 is provided with a long slot for the trigger part 620*a* to slide, and the other end of the trigger part 620*a* extends out of the long slot to act on the switch 520. Under the action of the long slot, the trigger part 620*a* slides along a sliding direction when an external force is applied. Further, the switch 520 includes a body and an elastic sheet, and the trigger part 620*a* drives the elastic sheet to close with the body during movement so as to trigger, wherein the switch 520 is electrically connected with the alarm device 50.

The trigger parts 620, 620*a* may be limited to move within a certain distance (for example, 1 cm, 2 cm, 3 cm, 4 cm, 5 cm, 8 cm, 10 cm), which movement may trigger the switch 520. The trigger part 620 may include an elastic restoring member configured to apply a force tending to restore the trigger part 620 to a state that the corresponding switch 520 is not triggered. That is, when a tension force is not applied to the top tether 410, the elastic restoring member of the corresponding trigger part 620 tends to restore the trigger part 620 to an initial state.

The trigger part 620, 620*a* may trigger the corresponding switch 520 by physically contacting with the corresponding switch 520 in response to the fixing of the top tether 410 or the anchor part 110 (specifically, the anchor arm 111) in place. The body part 510 may have a power supply device such as a battery, and has a calculation ability or a logic judgment ability. When different switches 520 provide signals to the body part 510, the body part 510 will process these signals, and finally output an alarm instruction to the alarm part 530. The alarm part 530 may include an acoustic alarm device 531 and an LED alarm device 532. The acoustic alarm device 531 may sound a prompt tone according to an instruction of the body part 510. The LED warning device 532 may have LED lights corresponding to the number of switches 520, and for example, it may indicate which switch 520 is not triggered by lighting (which in turn indicates which one of the top tether 410 and the anchor arm 111 is not tightened or fixed in place). The LED warning device 532 may be disposed in front of the base 10 (see FIG. 26). Optionally, the LED warning device 532 has three LEDs disposed side by side, wherein one LED is associated with the switch 520 of the top tether 410, and other two LEDs are respectively associated with the switches 520 at two anchor arms 111 of the anchor part 110. Optionally, LEDs and the like can be replaced with other light emitting devices. The number of LEDs can be changed as needed, for example, there may be four or more LEDs. The main purpose of the LED is to warn whether the tether assembly 40 or the anchor part 110 is not installed properly. It should be understood that the LED warning device 532 can be applied in various embodiments of the present disclosure.

The alarm device may be configured to give an alarm when the top tether 410 is tightened and the anchor part 110 is not fixed in place, or when the top tether 410 is not tightened and the anchor part 110 is fixed in place; and give no alarm when the top tether 410 is tightened and the anchor part 110 is fixed in place, or when the top tether 410 is not tightened and the anchor part 110 is not fixed in place.

In an embodiment, four switches are respectively associated with two tailing ends of the top tether 410 and two anchor arms 111 of the anchor part 110. At this time, as long as any one of the four switches is triggered, the alarm device 50 may start alarming, and when all the switches are triggered, the alarm device 50 does not give the alarm.

In other words, the alarm device 50 may be configured to give no alarm when the two top tethers 410 and the two anchor arms 111 are not fixed (or tightened); give an alarm when at least one of the two top tethers 410 and the two anchor arms 111 is not fixed (or tightened) (but not all of them are not fixed or tightened); and give no alarm when the two top tethers 410 and the two anchor arms 111 are fixed (or tightened).

At this time, giving an alarm may be that the alarm device 50 emits sound and/or the LED warning device emits light, while giving no alarm may be that the alarm device 50 does not emit sound and/or the LED optical warning device does not emit light.

In another embodiment, the alarm device 50 may only have three switches, which are respectively associated with two tailing ends of the top tether 410 and one of the two anchor arms 111 of the anchor part 110, or one of the two tailing ends of the top tether 410 and two anchor arms 111 of the anchor part 110.

In another embodiment, the alarm device 50 may only have two switches, which are respectively associated with one of the two tailing ends of the top tether 410 and one of the two anchor arms 111 of the anchor part 110.

Optionally, the child safety seat 1 may have a safe working state, a non-working state and a defective working state. In the safe working state, the top tether 410 is tightened and the anchor part 110 is fixed in place; in the non-working state, the top tether 410 is not tightened and the anchor part 110 is not fixed in place; and the defective working state is in a state that the child safety seat is not in any one of the non-working state and the safe working state. At this time, the alarm device 50 may be configured to give an alarm when the child safety seat 1 is in the defective working state, and give no alarm when the child safety seat 1 is in the safe working state or in the non-working state.

Figure 5:
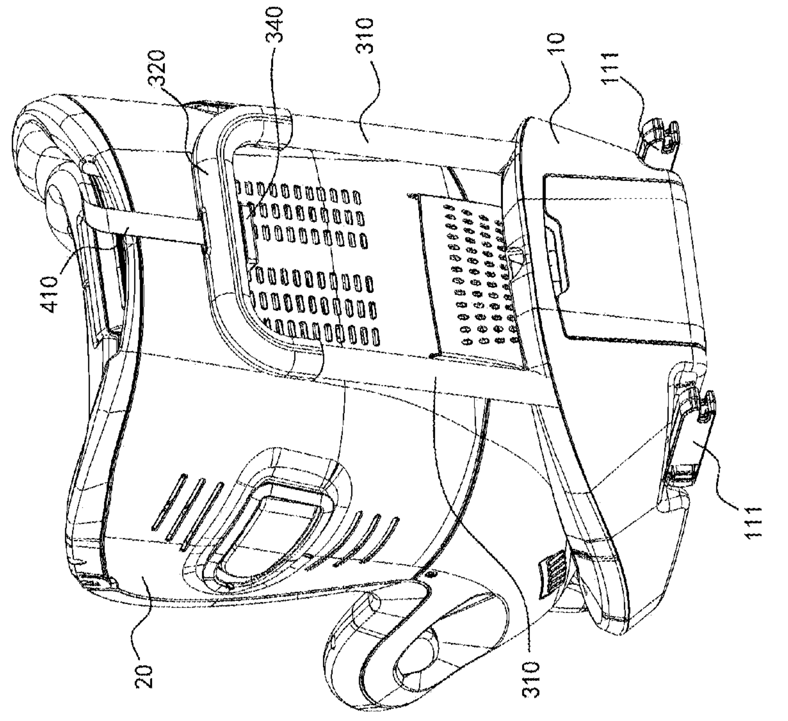
FIG. 5 is a perspective view of a child safety seat according to a second embodiment of the present disclosure.
Figure 6:
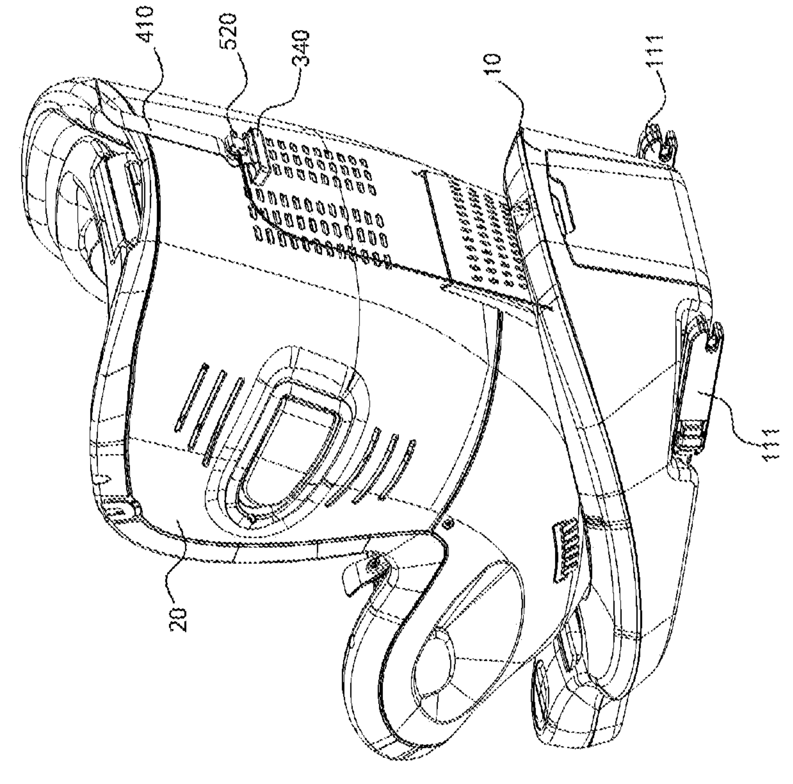
FIG. 6 is a perspective view of a child safety seat according to the second embodiment of the present disclosure, in which the child safety seat is partially removed to show its internal structure.

FIG. 5 is a perspective view of a child safety seat according to a second embodiment of the present disclosure, and FIG. 6 is a perspective view of a child safety seat according to the second embodiment of the present disclosure, in which the child safety seat is partially removed to show its internal structure.

The difference between the second embodiment and the first embodiment will be mainly described below. In this embodiment, the top rod 30 includes two vertical rods 310 symmetrically erected at the rear of the base 10; and a transverse rod 320*a* coupling to top ends of the two vertical rods 310. An upper surface of the transverse rod 320*a* is centrally provided with an opening 330, and a lower surface of the transverse rod 320*a* is centrally provided with an accommodating portion 340.

The alarm device 50 may have two or three switches 520, wherein one switch 520 is disposed in the accommodation part 340, and an end (a tailing end) of the top tether 410 is fixed in the accommodation part 340.

As shown in FIG. 6, a switch 520 is provided at a side of the top tether 410, such that the top tether 410 extends around the switch 520. When the top tether 410 is tightened (for example, in order to fix the tether fixing portion 450 of the tether assembly 40 to a corresponding structure), a pressure is applied to the switch 520 to trigger the switch 520, such that the switch provides a signal to the body part 510 to prompt that the top tether 410 is tightened at this time. The switch 520 and the body part 510 of the alarm device 50 may be connected by a signal line, and the signal line may pass through an inner space of the top rod 30. Optionally, the switch 520 may be wirelessly coupled with the body part 510 of the alarm device 50 to transmit a signal.

The child safety seat 1 may further include two trigger parts 620. The anchor part 110 includes two anchor arms 111, and the two trigger parts 620 respectively trigger the corresponding switches 520 in response to fixing of the two anchor arms 111 in place (i.e., the switches associated with the two anchor arms 111 respectively). This embodiment is basically the same as the first embodiment in the anchor part 110 and its related switch 520 and trigger part 111.

The alarm device 50 is configured to give no alarm when the top tether 410 is not tightened and both anchor arms 111 are not fixed in place, give an alarm when the top tether 410 is tightened and any one of the two anchor arms 111 is not fixed in place, and give no alarm when the top tether 410 is tightened and both anchor arms 111 are fixed in place; or alternatively, configured to give an alarm when the top tether 410 is not tightened and any one of the two anchor arms 111 is fixed in place, and give no alarm when the top tether 410 is tightened and both anchor arms 111 are fixed in place.

Figure 7:
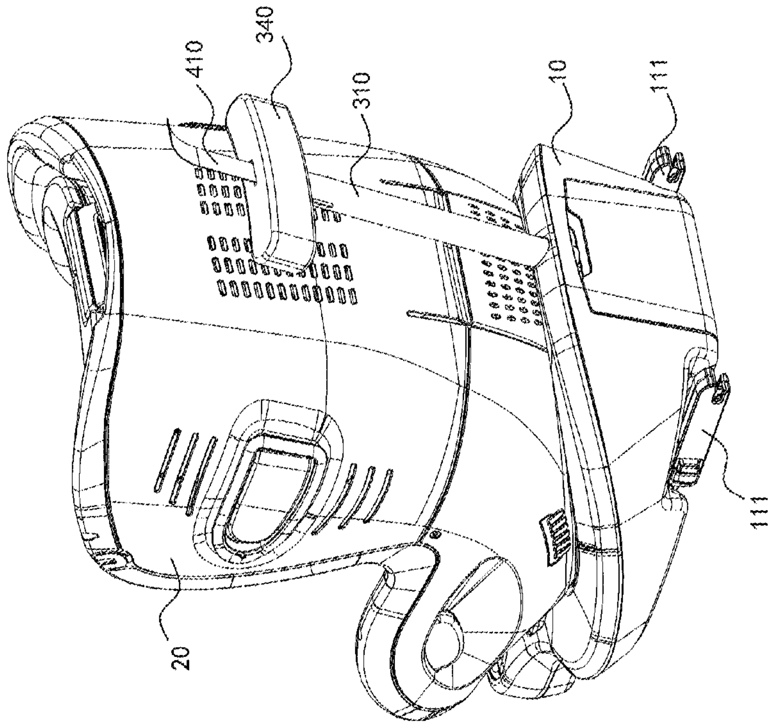
FIG. 7 is a perspective view of a child safety seat according to a third embodiment of the present disclosure.
Figure 8:
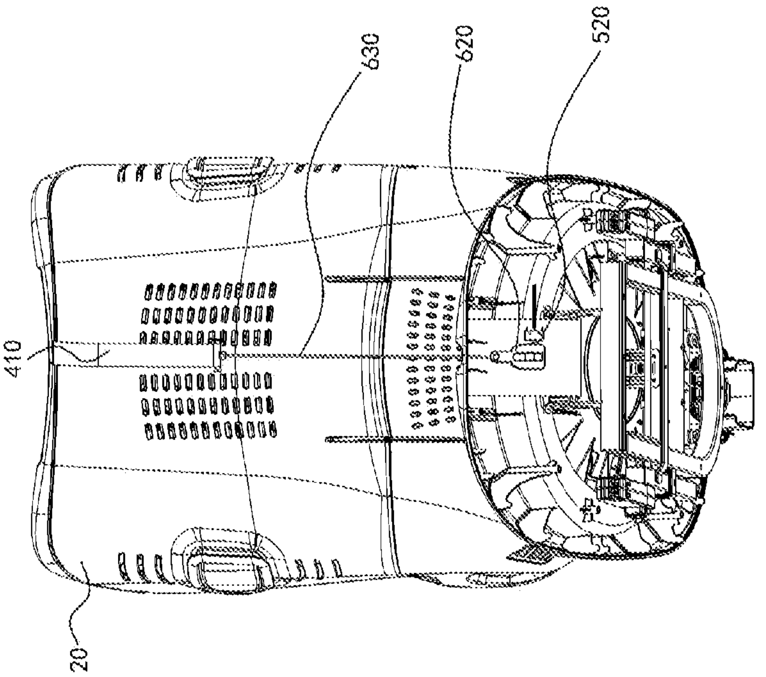
FIG. 8 is a perspective view of a child safety seat according to the third embodiment of the present disclosure, in which the child safety seat is partially removed to show its internal structure.

FIG. 7 is a perspective view of a child safety seat according to a third embodiment of the present disclosure, and FIG. 8 is a perspective view of the child safety seat according to the third embodiment of the present disclosure, in which the child safety seat is partially removed to show its internal structure.

The third embodiment differs from the first embodiment mainly in the number and position of the top tether 410. In the third embodiment, the child safety seat 1 may have three trigger parts 620, which may respectively trigger three corresponding switches 520, such that the corresponding switches 520 provide signals to the body part 510. Specifically, an end of the top tether 410 is connected to one trigger part 620, and two anchor arms 111 are connected to two trigger parts 620, respectively.

The top rod 30 may include: a vertical rod 310 centrally erected at the rear of the base 10; and an accommodating portion 340 transversely disposed at the top end of the vertical rod 310. The upper surface of the accommodating portion 340 is centrally provided with an opening 330. The above-mentioned end of the top tether 410 may be located in the accommodating portion 340.

As shown in FIG. 8, a trigger part 620 is disposed in the base 10, and is limited to move within a certain distance. Specifically, a limit part (for example, a through hole) is provided on the trigger part 620, and a stopper (for example, a pin or a protrusion) fixed in the base 10 passes through the limit part. A vertical length of the limit part is larger than that of the stopper, such that the trigger part 620 with the limit part can move a certain distance in the vertical direction, finally realizing the limiting function since the stopper stops an edge of the limit part. When the top tether 410 is tightened, the trigger part 620 triggers a switch 520 through physical contact, such that the switch 520 provides a signal to the body part 510.

A length of the accommodating portion 340 in the transverse direction is larger than that of the vertical rod 310 in the transverse direction. Optionally, the length of the accommodating portion 340 in the transverse direction is 3 times, 4 times or 5 times greater than the length of the vertical rod 310 in the transverse direction. In this way, the accommodating portion 340 can effectively abut against the backrest of the vehicle seat, thus making the child safety seat 1 more stable. The accommodating portion 340 may have a certain arc in the transverse direction (the left-right direction shown in FIG. 8).

A blocking portion is provided on an end of the top tether 410 disposed in the accommodating portion 340. A size of the blocking portion is provided such that it cannot pass through the opening 330.

The inner space of the accommodating portion 340 is disposed to allow an end of the top tether 410 to move a certain distance in the vertical direction. That is, the accommodating portion 340 has a certain height in the vertical direction. In this way, when the top tether 410 is tightened, an end of the top tether 410 can move in the vertical direction, thereby driving the trigger part 620 via the linkage 630 (for example, a steel wire or a cable), such that the trigger part 620 triggers the corresponding switch 520. The trigger part 620 connected with the top tether 410 may be formed as a sheet.

The alarm device 50 is configured to give no alarm when the top tether 410 is not tightened and both anchor arms 111 are not fixed in place; give an alarm when the top tether 410 is tightened and any one of the two anchor arms 111 is not fixed in place, and give no alarm when the top tether 410 is tightened and both anchor arms 111 are fixed in place; or alternatively, configured to give an alarm when the top tether 410 is not tightened and any one of the two anchor arms 111 is fixed in place, and give no alarm when the top tether 410 is tightened and both anchor arms 111 are fixed in place.

Figure 9:
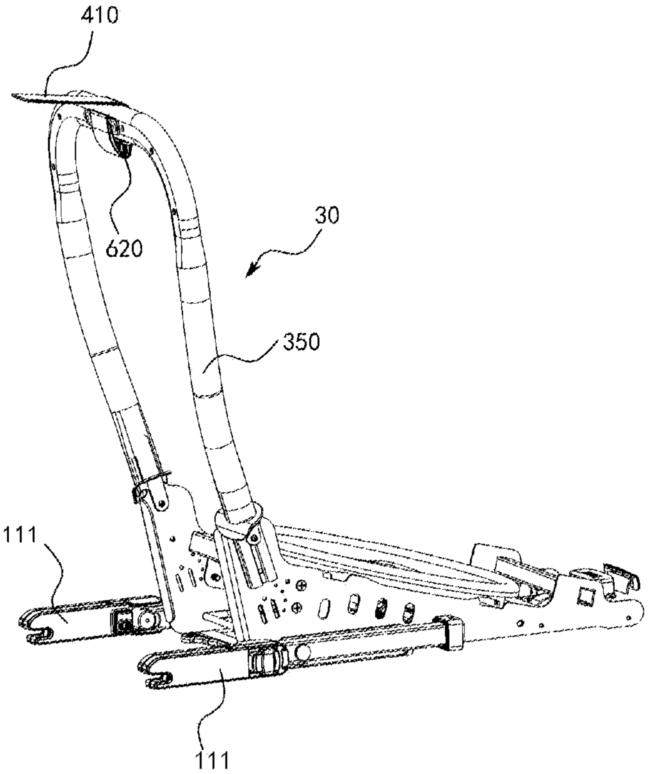
FIG. 9 is a perspective view of some parts of a child safety seat according to a fourth embodiment of the present disclosure.
Figure 10:
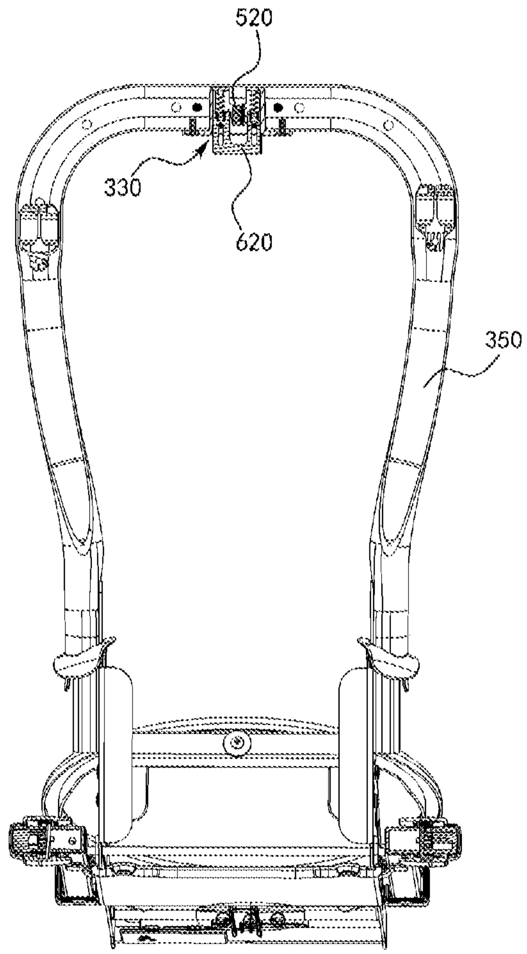
FIG. 10 is a partial sectional view of some parts of the child safety seat according to the fourth embodiment of the present disclosure, in which the trigger part is not triggered.
Figure 11:
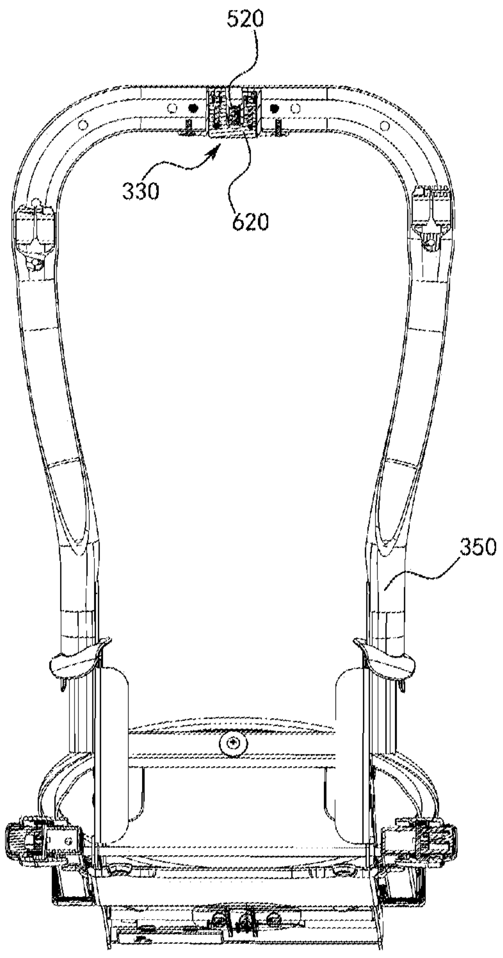
FIG. 11 is a partial sectional view of some parts of the child safety seat according to the fourth embodiment of the present disclosure, in which the trigger part is triggered.
Figure 12:
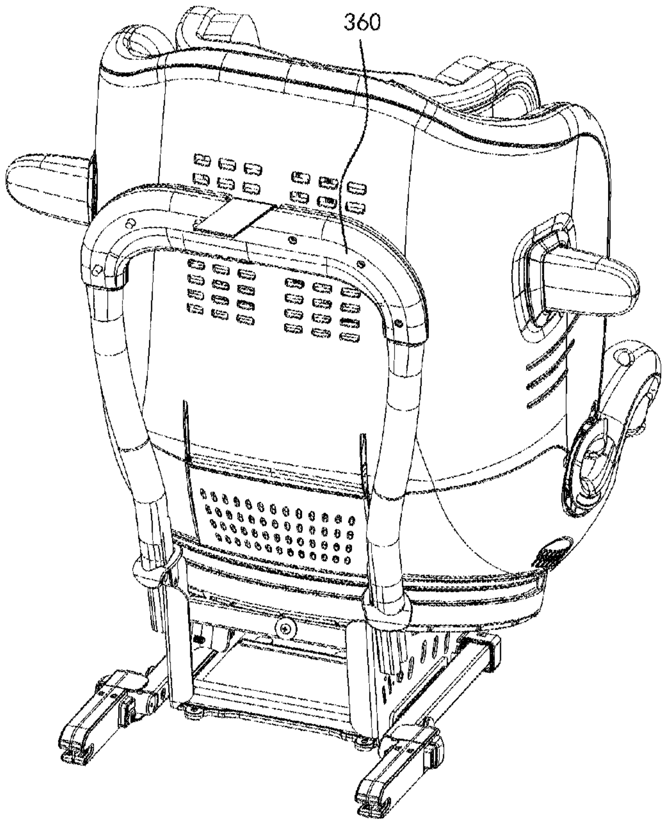
FIG. 12 is a schematic perspective view of a child safety seat according to the fourth embodiment of the present disclosure.
Figure 13A:
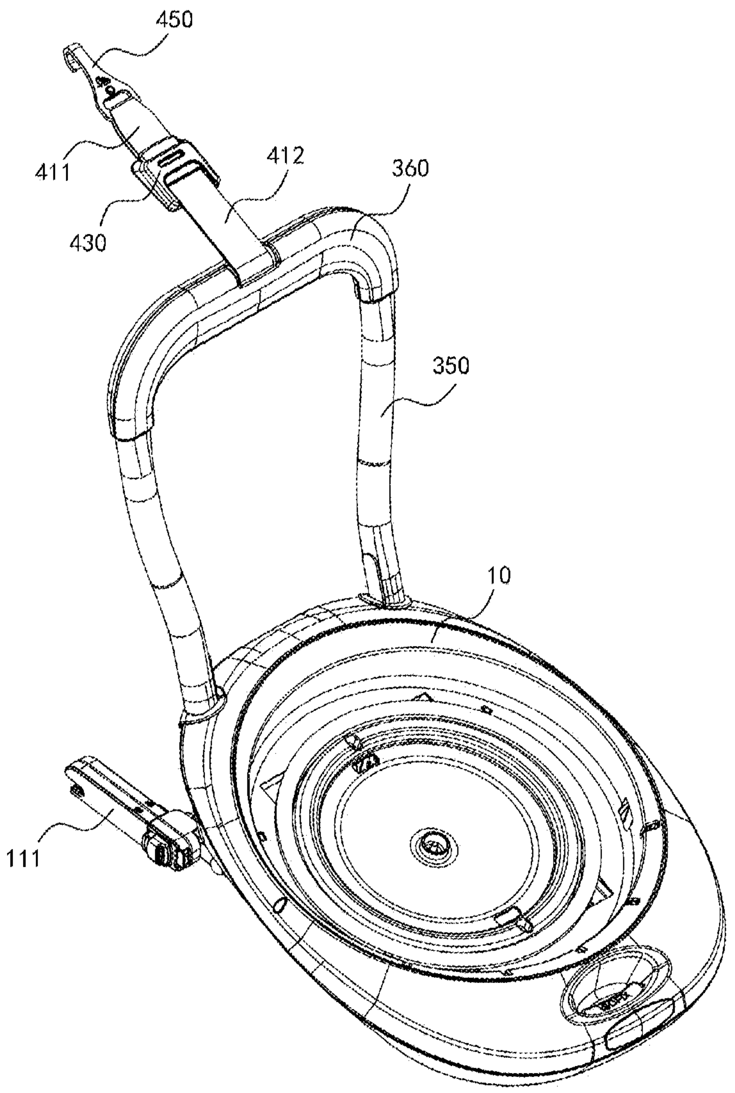
FIG. 13A is a schematic partial perspective view of a child safety seat according to the fourth embodiment of the present disclosure.
Figure 13B:
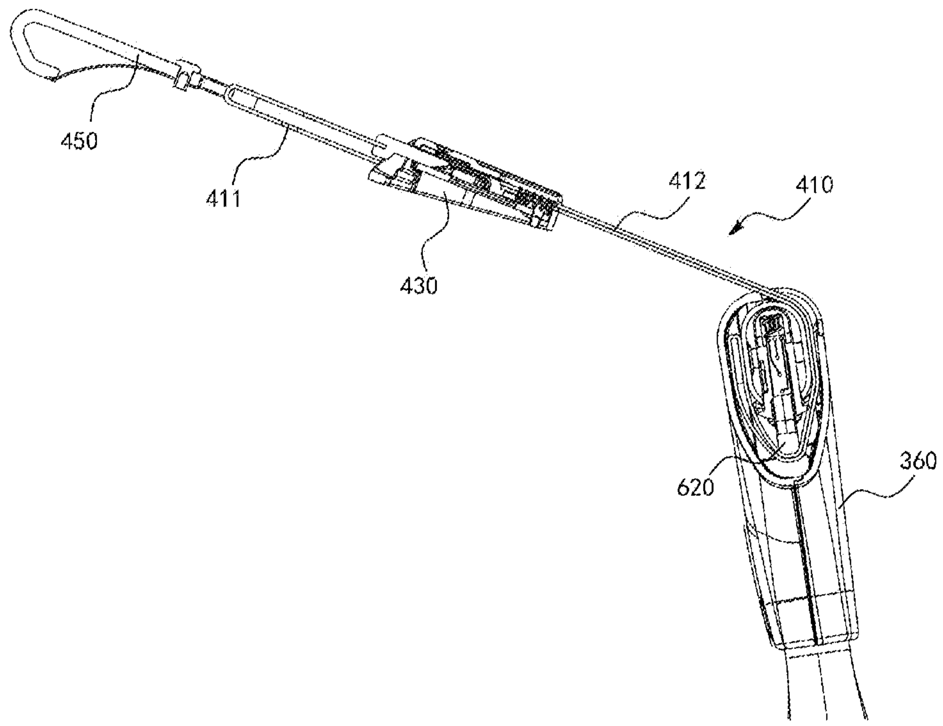
FIG. 13B is a partial sectional view of a child safety seat according to the fourth embodiment of the present disclosure.
Figure 14:
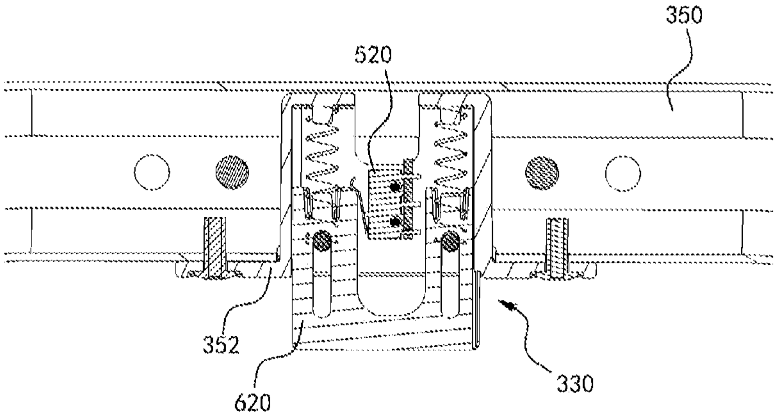
FIG. 14 is a schematic partial sectional view of the child safety seat according to the fourth embodiment of the present disclosure, in which the trigger part is not triggered.
Figure 15:
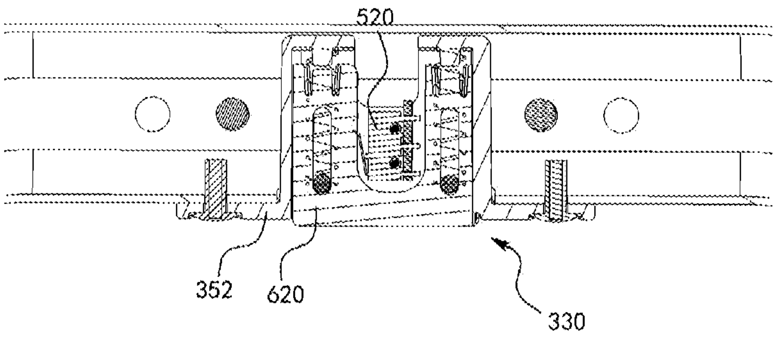
FIG. 15 is a schematic partial sectional view of the child safety seat according to the fourth embodiment of the present disclosure, in which the trigger part is triggered.

FIG. 9 is a perspective view of some parts of a child safety seat according to a fourth embodiment of the present disclosure; FIG. 10 is a partial sectional view of some parts of the child safety seat according to the fourth embodiment of the present disclosure, in which the trigger part is not triggered; FIG. 11 is a partial sectional view of some parts of the child safety seat according to the fourth embodiment of the present disclosure, in which the trigger part is triggered; FIG. 12 is a schematic perspective view of a child safety seat according to the fourth embodiment of the present disclosure; FIG. 13A is a schematic partial perspective view of a child safety seat according to the fourth embodiment of the present disclosure; FIG. 13B is a partial sectional view of a child safety seat according to the fourth embodiment of the present disclosure; FIG. 14 is a schematic partial sectional view of the child safety seat according to the fourth embodiment of the present disclosure, in which the trigger part is not triggered; and FIG. 15 is a schematic partial sectional view of the child safety seat according to the fourth embodiment of the present disclosure, in which the trigger part is triggered.

In this embodiment, the child safety seat 1 may include a base 10 provided with two anchor arms 111 protruding backwardly; a seat 20 coupled to the base 10; a top rod 30 including a rod 350 disposed at the rear of the base; a tether assembly 40 including a top tether 410, an end of which is fixed to a rear side (the left side in FIG. 9) of a top of the rod 350, and extends through a lower side, a front side and an upper side of the rod 350 (in other words, wounding about nearly three quarters of a turn), and then extends away from the top; an alarm device 50 having three switches 520, the alarm device 50 giving an alarm when any of the three switches 520 is not triggered; and three trigger parts 620 for respectively triggering the three switches 520, the trigger parts 620 being capable to be disposed in the top rod 30. The trigger part 620 may protrude downward from a lower side of the top of the rod 350 to contact the top tether 410. When the top tether 410 is tightened, the top tether 410 pushes one trigger part 620 upward to trigger one switch 520, and when the two anchor arms 111 are fixed in place, the other two trigger parts 620 respectively trigger the other two switches 520. The rod 350 may be formed in a U-shape.

In this embodiment, the switch 520 and the trigger part 620 are disposed at the two anchor arms 111, which are consistent with the previous embodiments. The rod 350 is formed with an opening 330. The opening 330 may be centrally formed on the top of the rod 350. The opening 330 may be formed to face downward. The trigger part 620 extends out of the opening 330, and an elastic restoring member such as a spring may be disposed between the trigger part 620 and the rod 350 to tend to make the trigger part 620 extend out of the opening 330. An installation groove 352 may be formed in the opening 330. The installation groove 352 may be fastened to the rod 350 at both sides by fasteners. An upper end of a reset member may abut against an inner surface of the installation groove 352, and the upper end of the reset member may abut against the trigger part 620. The trigger part 620 may be formed with a vertical groove or a through hole. Optionally, two vertical grooves or through holes are symmetrically formed on both sides of the trigger part 620. A stopper may extend into the groove or through hole to vertically limit a moving range of the trigger part 620. When the trigger part 620 extends out of the opening 330, the elastic sheet of the switch 520 is not driven, such that the switch 520 is not triggered. When the trigger part 620 is actuated to basically retract into the opening 330, the elastic sheet of the switch 520 is driven, such that the switch 520 is triggered.

The top tether 410 may contact the trigger part 620 by winding, so as to apply a pressure to the trigger part 620 when the top tether 410 is tightened. Therefore, the winding mode of the top tether 410 is not limited thereto. For example, the top tether 410 may be surround to the upper part of the rod 350, then to the front and lower parts of the rod 350 and then to the upper part of the rod 350.

The top rod 30 may further include a cover plate 360, which is sleeved on the top of the rod 350 and has an opening for the top tether 410 to extend out. The cover plate 360 may be formed by two halves and fixed on the top rod 30 by fasteners. The cover plate 360 may make the upper part of the top rod 30 more artistic, and limit the top tether 410 to contact the trigger part 620. A gap between the cover plate 360 and the rod 350 may be formed to allow the top tether 410 to move out and in along the opening of the cover plate 360, but prevent the top tether 410 from sliding inside the cover plate 360.

As shown in FIGS. 13A and 13B, the top tether 410 may include an adjusting belt 411 and a connecting belt 412, wherein the connecting tether 412 is used to connect the rod 350 and the adjuster 430, and the adjusting tether 411 is used to connect the tether fixing portion 450 and the adjuster 430. An end of the adjusting belt 411 may extend into the adjuster 430 and extend out of the adjuster 430 to form a free end (not shown). The adjuster 430 may lock and release the adjusting belt 411 passing therethrough (for example, by pressing a button). When the adjuster 430 releases the adjusting belt 411, pulling the adjusting belt 411 may lengthen a length of the adjusting belt 411, and pulling the free end may shorten the length of the adjusting belt 411.

Figure 16:
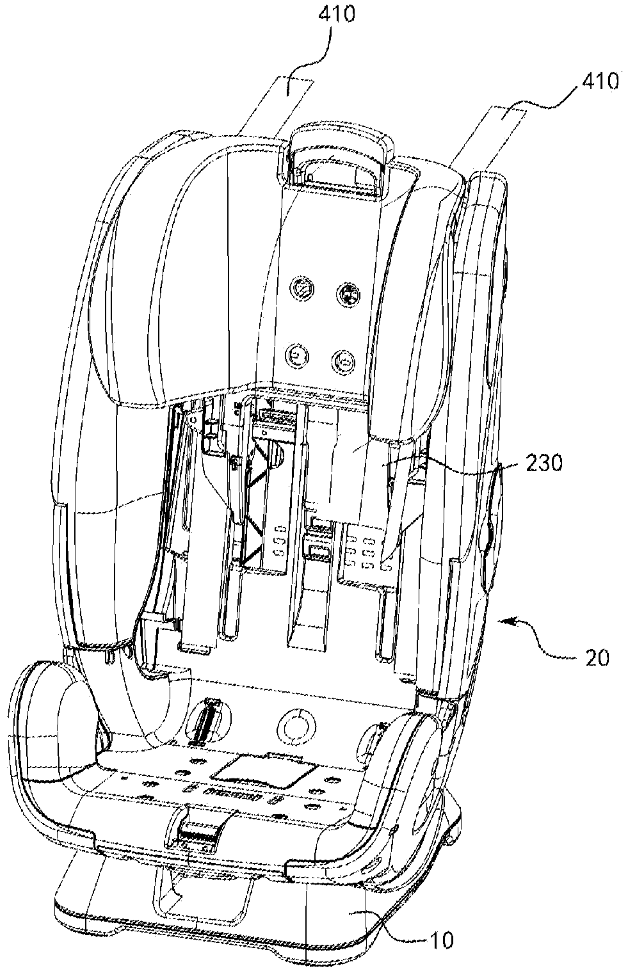
FIG. 16 is a perspective view of a child safety seat according to a fifth embodiment of the present disclosure, in which some parts are removed to show the interior of the child safety seat.
Figure 17:
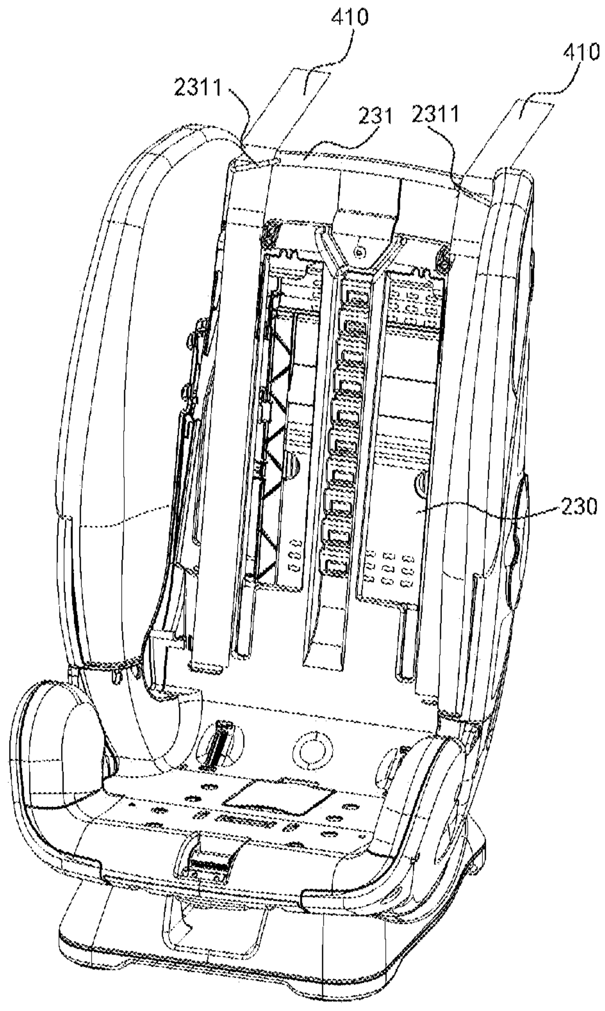
FIG. 17 is another perspective view of the child safety seat of the fifth embodiment of the present disclosure, in which parts are removed to show the interior of the child safety seat.

FIG. 16 is a perspective view of a child safety seat according to a fifth embodiment of the present disclosure, in which some parts are removed to show the interior of the child safety seat; and FIG. 17 is another perspective view of the child safety seat of the fifth embodiment of the present disclosure, in which parts are removed to show the interior of the child safety seat.

The child safety seat of this embodiment may include a base 10; a seat 20 coupled to the base 10 and including a backrest 230, a top end of which is formed with a reinforcing tube 231 having the two sides respectively formed with a limit ring 2311; and a tether assembly 40 including a top tether 410 and a tether fixing portion (not shown). The top tether 410 is connected to both sides of a lower end of the backrest 230 and extends upward along the backrest 230 through the limit ring 2311.

The top tether 410 may be connected to a flexible member (not shown) of the backrest 230. The top tether 410 is disposed at an inner side of the backrest 230 (a side facing a child sitting in the child safety seat), and extends away from the backrest 230 via the limit ring 2311. Since the end of the top tether 410 is connected to the flexible member, a plastic deforms when stressed, thereby having a buffering effect and reducing the stress of the tether fixing portion. At the same time, the top tether 410 extends upward from the lower end of the backrest, and the length of the top tether 410 is longer. When stressed, a certain elongation of the woven belt itself may also have a buffering effect.

Figure 18:
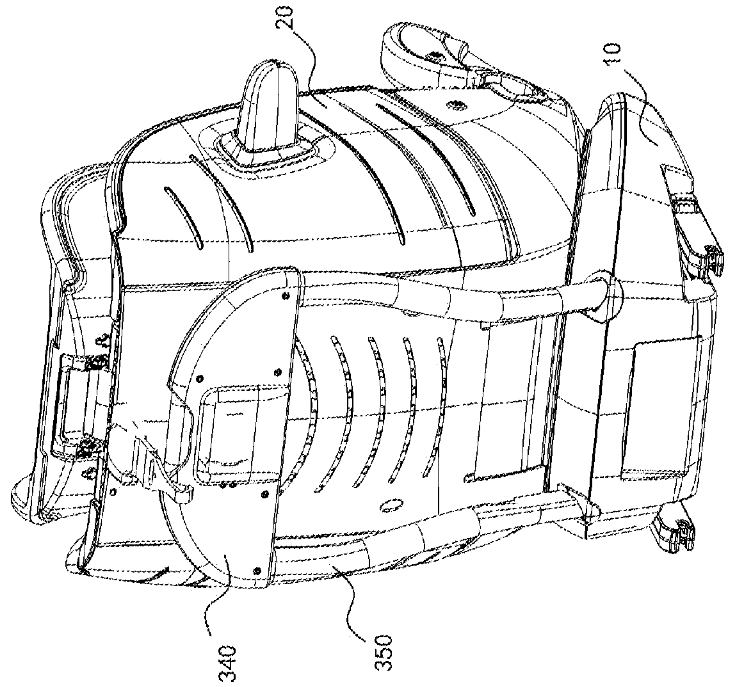
FIG. 18 is a perspective view of a child safety seat according to a sixth embodiment of the present disclosure.
Figure 19:
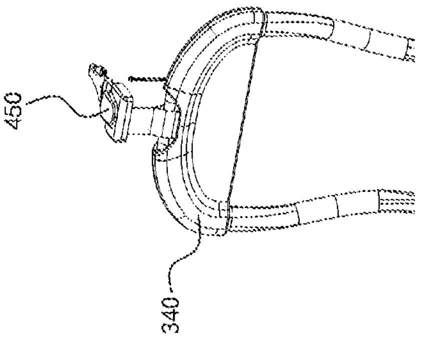
FIG. 19 is a perspective view of some parts of the child safety seat according to the sixth embodiment of the present disclosure.
Figure 20:
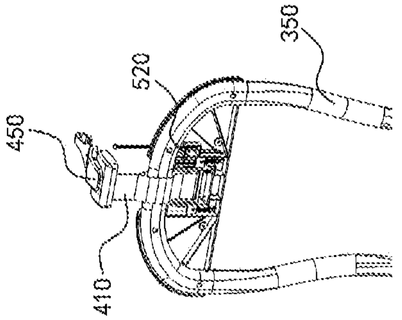
FIG. 20 is a perspective view of some parts of the child safety seat according to a sixth embodiment of the present disclosure, in which some parts are removed to show the interior of the child safety seat.
Figure 21:
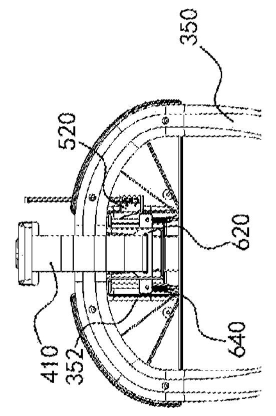
FIG. 21 is a plan view of the child safety seat of the sixth embodiment of the present disclosure when the top tether is not tightened.
Figure 22:
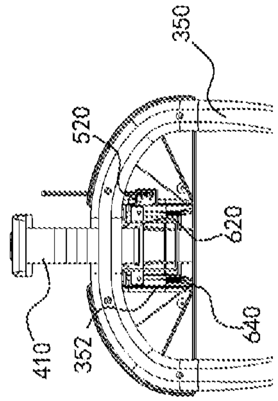
FIG. 22 is a plan view of the child safety seat of the sixth embodiment of the present disclosure when the top tether is tightened.
Figure 23:
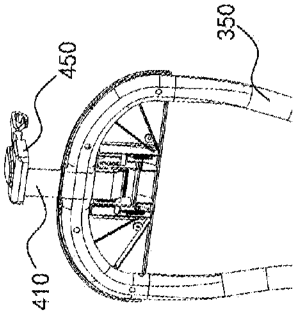
FIG. 23 is another perspective view of some parts of the child safety seat according to the sixth embodiment of the present disclosure.

FIG. 18 is a perspective view of a child safety seat according to a sixth embodiment of the present disclosure; FIG. 19 is a perspective view of some parts of the child safety seat according to the sixth embodiment of the present disclosure; FIG. 20 is a perspective view of some parts of the child safety seat according to a sixth embodiment of the present disclosure, in which some parts removed to show the interior of the child safety seat; FIG. 21 is a plan view of the child safety seat of the sixth embodiment of the present disclosure when the top tether is not tightened; FIG. 22 is a plan view of the child safety seat of the sixth embodiment of the present disclosure when the top tether is tightened; and FIG. 23 is another perspective view of some parts of the child safety seat according to the sixth embodiment of the present disclosure.

In this embodiment, the child safety seat may include a base 10 provided with an anchor part 110 protruding backwardly; a seat 20 coupled to the base 10; a top rod 30 including a rod 350 and an accommodating portion 340, wherein the rod 350 is disposed at the rear of the base, and the accommodating portion 340 is disposed at an upper part of the rod; a tether assembly 40 including a top tether 410 and a tether fixing portion 450, wherein the top tether is sleeved on the top of the rod; and an alarm device 50 capable of giving an alarm based on whether the top tether is tightened and whether the anchor part is fixed in place. The rod 350 may be formed as a U-shaped rod.

The alarm device 50 may include a body part 510 capable of determining whether to give an alarm; a plurality of switches 520 electrically connected to the body part to provide signals to the body part; and an alarm part 530 capable of giving the alarm when the body part determines to give the alarm.

Figure 24:
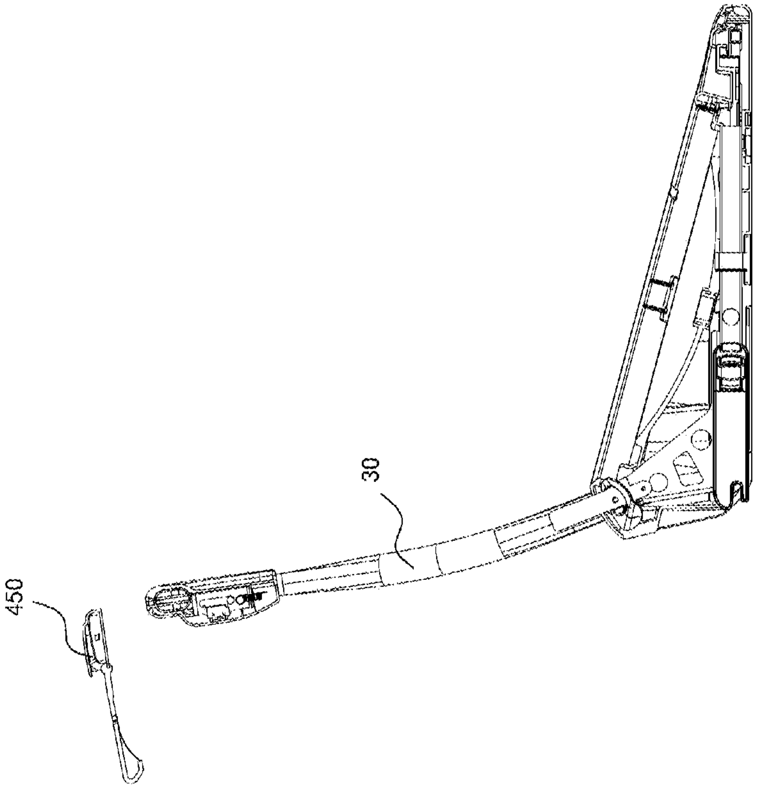
FIG. 24 is a side view of some parts of the child safety seat according to the sixth embodiment of the present disclosure, in which the tether fixing portion is separated from the top tether.
Figure 25:
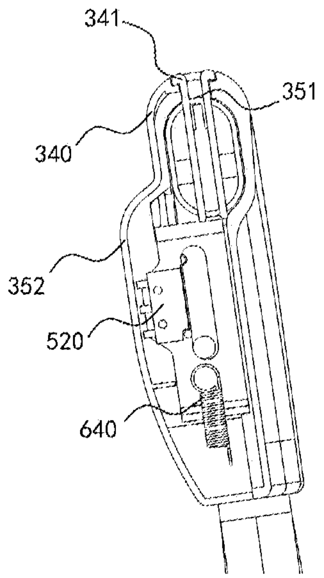
FIG. 25 is a schematic sectional view of some parts of a child safety seat according to a seventh embodiment of the present disclosure.

Optionally, the top tether 410 may be sleeved on the top of the rod 350, and the accommodating portion 340 defines a moving range of the top tether 410 on the rod 350. As shown in FIG. 20, the top tether 410 is divided into two belts at the top of the rod 350 to form a loop, thereby bypassing the rod 350 and merging into one belt at the lower part of the rod 350. An end of the top tether 410 may be disposed in the inner space (the installation groove 352) of the accommodating portion 340 and provided with a trigger part 620. The trigger part 620 may vertically move a certain distance in the installation groove 352. An elongated hole is formed in the middle of the trigger part 620, and an end of the top tether 410 may be fixed to the elongated hole, such that the trigger part 620 may move in response to the movement of the top tether 410. An elastic restoring member 640 (e.g., a spring) may be disposed in the accommodating portion 340, and has two ends connected to a side of the accommodating portion 340 and the trigger part 620, respectively. In this embodiment, both left and right sides of the trigger part 620 are respectively connected with an elastic restoring member 640. It should be understood that other number of elastic restoring members 640 may be provided. A switch 520 is further provided in the inner space of the accommodating portion 340. The switch 520 is disposed at a side of a vertical movement path of the trigger part 620, and a sheet on the switch 520 may be partially located in the movement path. When the top tether 410 is tightened (i.e., the top tether 410 is pulled outward), the trigger part 620 presses the sheet on the switch 520, thereby triggering the switch 520 (see FIGS. 21 and 22), such that the switch 520 provides a signal to the body part. This signal indicates that the tether assembly 40 is in a state that it is fixed in place. The arrangement of other switches in the plurality of switches 520 may refer to the above embodiments. FIG. 24 is a side view of some parts of the child safety seat according to the sixth embodiment of the present disclosure, in which the tether fixing portion is separated from the top tether; and FIG. 25 is a schematic sectional view of some parts of a child safety seat according to a seventh embodiment of the present disclosure.

In this embodiment, a through hole 351 may be formed at the top of the rod 350 (i.e., an opening is formed on each of the upper and lower surfaces of the rod 350). An end of the top tether 410 (not shown) may pass through the through hole 351 and be disposed in the inner space (installation groove 352) of the accommodating portion 340, and provided with a trigger part 620. The inner space of the accommodating portion 340 is further provided with a switch 520, and an end of the top tether 410 is connected to the trigger part 620 (the connection mode thereof refers to a sixth embodiment). The tightening of the top tether 410 (that is, the top tether 410 is pulled out from the installation groove 352 through the through hole 351) will drive the trigger part 620 to move upward. The switch 520 is disposed at a position close to the rear side (the left side in FIG. 25) in the installation groove 352, and the sheet on the switch 520 is at least partially located on an upward movement path of the trigger part 620. When the trigger part 620 moves upward, the sheet of the switch 520 may be pressed to trigger the switch 520, such that the switch 520 provides a signal to the body part 510. The signal indicates that the tether assembly 40 is fixed in place. A flexible member 341 may be provided in the accommodating portion 340, and disposed at the inner side of the through hole, and an upper end of the flexible member 341 is engaged to prevent the top tether from directly contacting the inner side of the through hole. That is, when the top tether 410 moves in the through hole 351, the top tether 410 contacts with the flexible member 341 without directly contacting the rod 350 (which is usually formed of metal). The arrangements of other switches in the plurality of switches 520 can refer to the above embodiments.

An elastic restoring member (e.g., a spring) 640 is provided in the accommodating portion, and the elastic restoring member 640 is disposed between the accommodating portion 340 and the trigger part 620, so as to exert a force on the trigger part, wherein the force tends to make the trigger part 620 not trigger the switch 520 (i.e., make the trigger part 620 return to an initial state located below).

Other contents of this embodiment are basically the same as those of the sixth embodiment.

Figure 26:
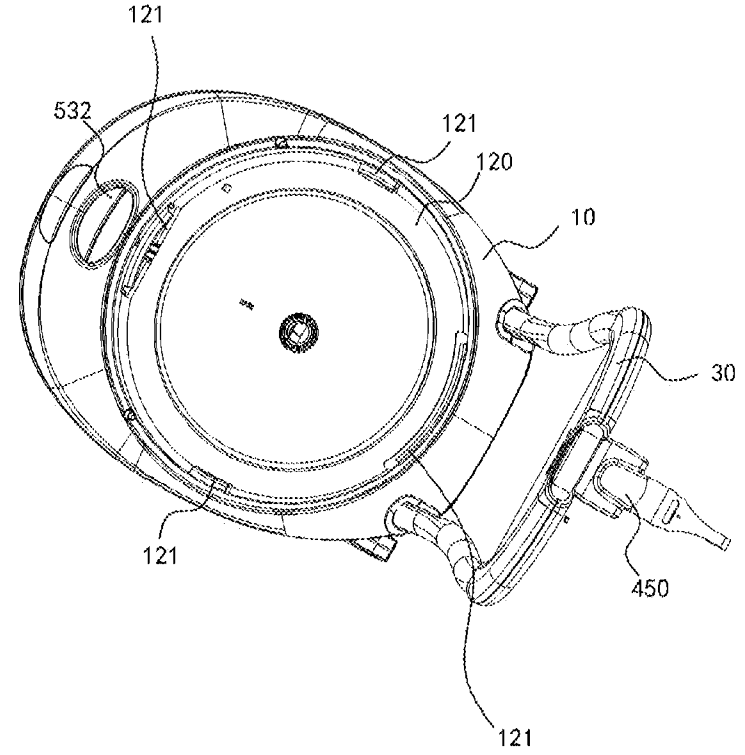
FIG. 26 is a top perspective view of the base and top rod of the child safety seat of the present disclosure.
Figure 27:
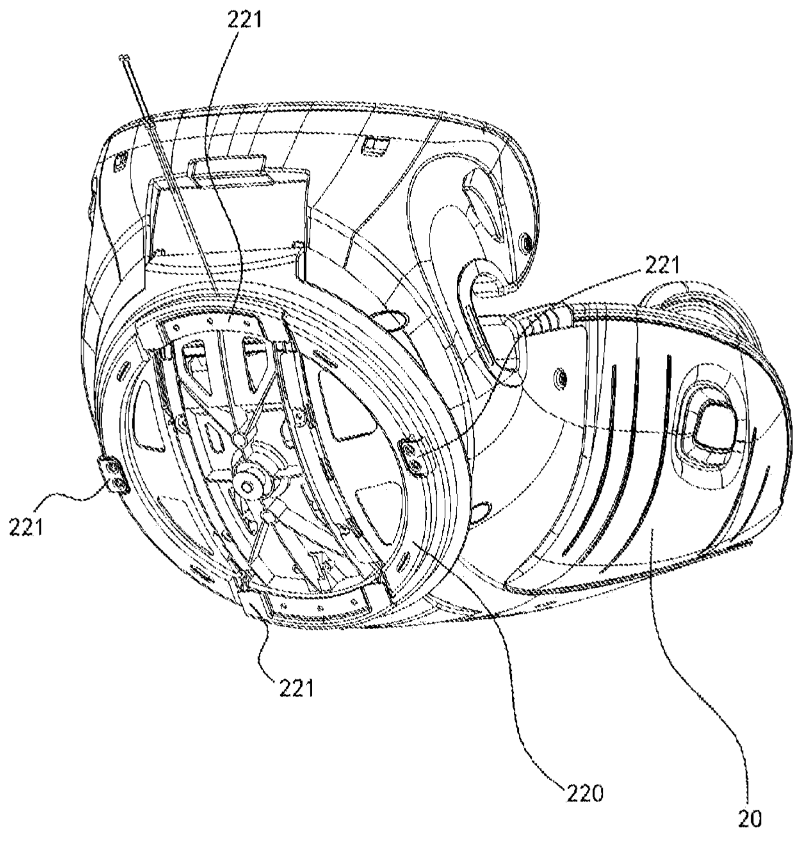
FIG. 27 is a bottom perspective view of the seat of the child safety seat of the present disclosure.

FIG. 26 is a top perspective view of the base and top rod of the child safety seat of the present disclosure, and FIG. 27 is a bottom perspective view of the seat of the child safety seat of the present disclosure.

The base 10 may include an annular part 120. The seat 20 may include an annular part 220. The annular parts 120, 220 may correspond to each other. The base 10 and the seat 20 are coupled to each other via a connecting shaft at the center of the annular parts 120, 220, and the seat 20 may rotate with respect to the base 10. The annular parts 120, 220 of the base 10 and the seat 20 are respectively provided with a base reinforcement 121 and a seat reinforcement 221 which can be locked with each other to strengthen a coupling force between the base 10 and the seat 20. When the seat 20 rotates to a specific use angle with respect to the base 10, for example, 0 or 180 degrees (corresponding to a forward use position and a rearward use position of the seat 20), the base reinforcement 121 and the seat reinforcement 221 may be just engaged with each other, thus providing a reinforcing effect.

The annular part 120 of the base 10 and the annular part 220 of the seat 20 may be respectively provided with four base reinforcements 121 and four seat reinforcements 221, respectively. The four base reinforcements 121 are circumferentially uniformly disposed at a circumference of the annular part 120 of the base 10. The four seat reinforcements 221 may be provided at positions corresponding to the four base reinforcements 121, respectively. That is, the four seat reinforcements 221 are circumferentially uniformly disposed at a circumference of the annular part 220 of the seat 20. One base reinforcement 121 and one seat reinforcement 221 are respectively disposed on a side (rear side) of the annular parts 120, 220 close to the top rod 30, and a length extending on the circumference of each of the annular parts 120, 220 is greater than that of the other three base reinforcements 121 and seat reinforcements 221. Another base reinforcement 121 and another seat reinforcement 221 are disposed on the front side of the annular parts 120, 220, and a length extending on the circumference of each of the annular parts 120, 220 thereof is smaller than those of the base reinforcement 121 and the seat reinforcement 221 at the rear side, respectively, but greater than those of the base reinforcements 121 and the seat reinforcement 221 at left and right sides. The base reinforcement 121 and the seat reinforcement 221 may be made of iron sheets, for example, the present disclosure is not limited thereto. The base reinforcement 121 and the seat reinforcement 221 may be provided in different numbers, for example, 5, 6 and 8, and the present disclosure is not limited thereto. The base reinforcement 121 and the seat reinforcement 221 may be uniformly or unevenly distributed along the annular parts 120, 220.

When the child safety seat 1 is impacted, an overturning force of the child safety seat 1 in the forward or backward direction is the largest, and thus the longest base reinforcement 121 and seat reinforcement 221 are disposed at the rear side to increase a capability to bear a force of forward overturning, and the relatively long base reinforcement 121 and seat reinforcement 221 are disposed at the front side to increase a capability to bear a force of backward overturning.

Figure 28:
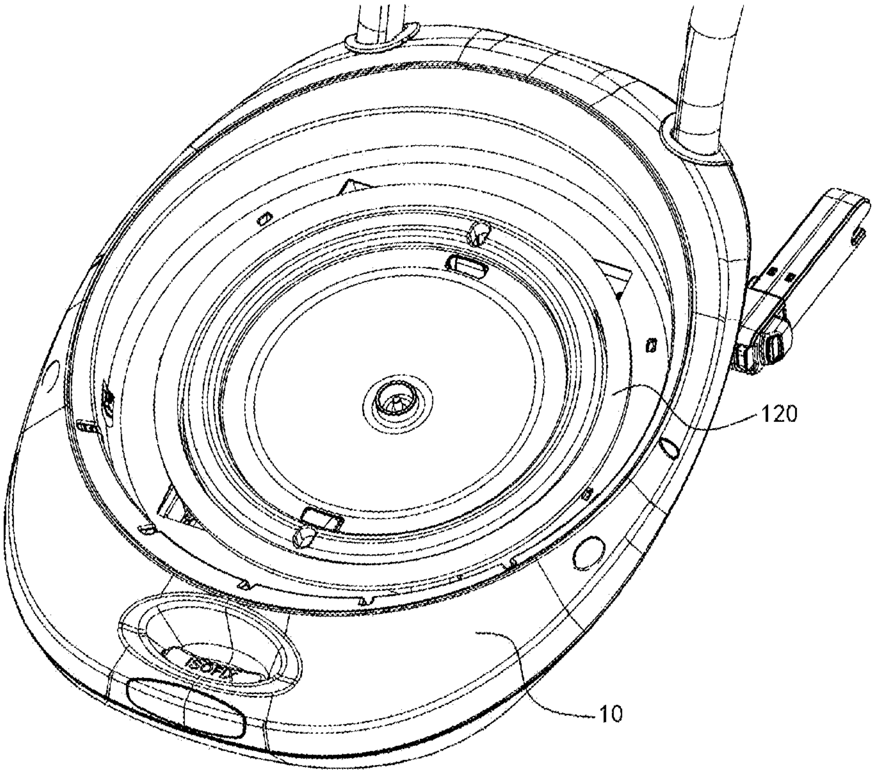
FIG. 28 is a top perspective view of another embodiment of the base of the child safety seat of the present disclosure.
Figure 29:
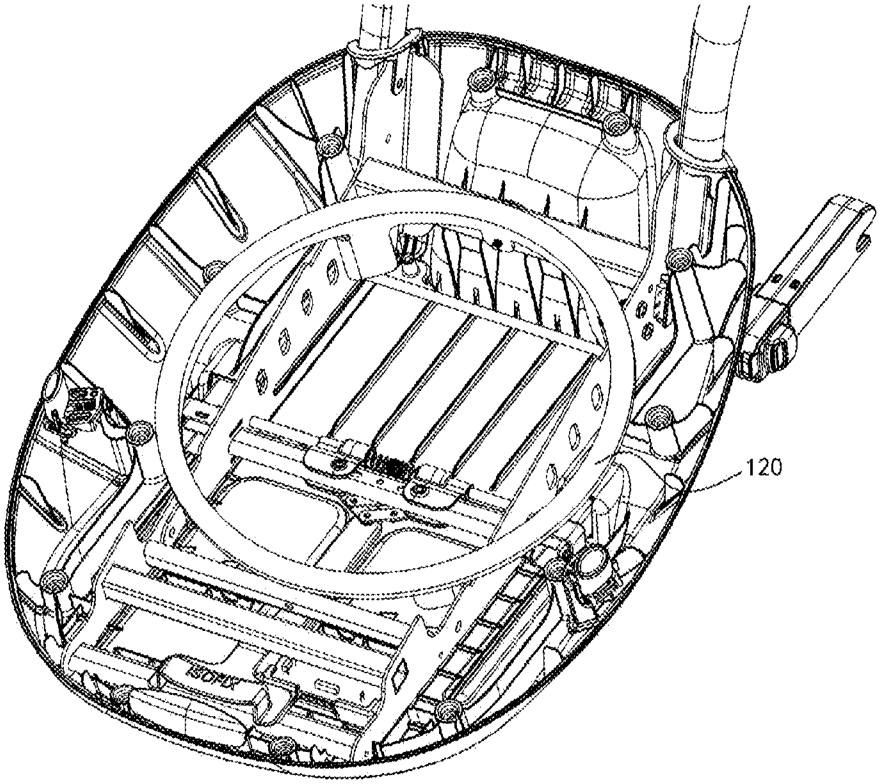
FIG. 29 is a top perspective view of another embodiment of the base of the child safety seat of the present disclosure, in which some parts are removed.
Figure 30:
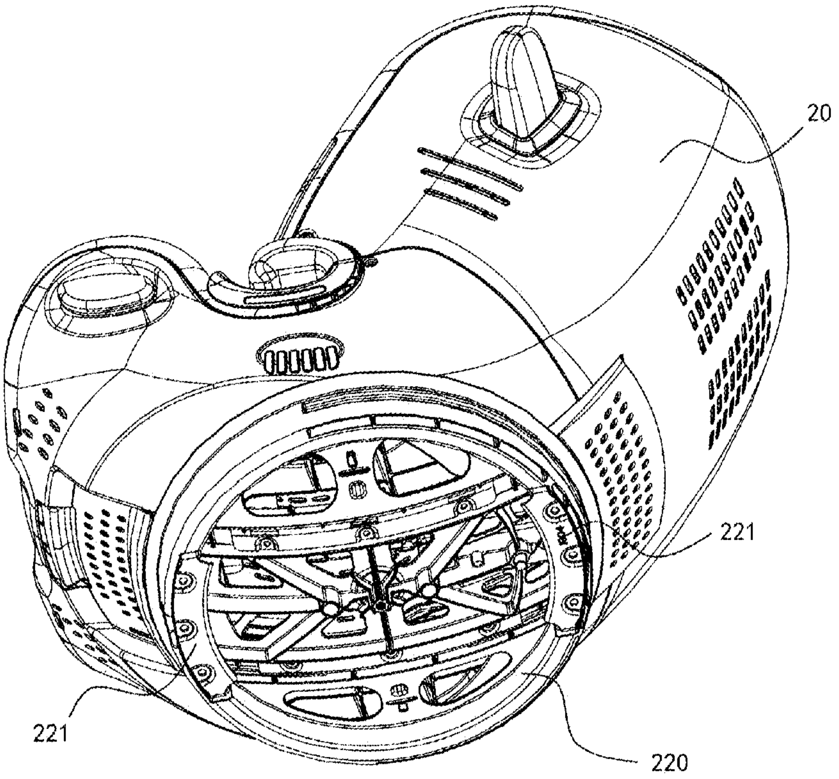
FIG. 30 is a bottom perspective view of another embodiment of the seat of the child safety seat of the present disclosure.

FIG. 28 is a top perspective view of another embodiment of the base of the child safety seat of the present disclosure; FIG. 29 is a top perspective view of another embodiment of the base of the child safety seat of the present disclosure, in which some parts are removed; and FIG. 30 is a bottom perspective view of another embodiment of the seat of the child safety seat of the present disclosure.

The base 10 may include an annular part 120. The seat 20 may include an annular part 220. The base 10 and the seat 20 are coupled to each other via a connecting shaft at the center of the annular parts 120, 220, and the seat 20 may rotate with respect to the base 10. The annular part 220 of the seat 20 is provided with a reinforcing member 221 which can be locked with the annular part 120 of the base 10. In this embodiment, the reinforcing member 221 can engage the annular part 120 of the base 10 at any angle between the seat 20 and the base 10. In other words, when the seat 20 rotates with respect to the base 10, the reinforcement 221 circumferentially slides along the annular part 120. In this way, even when the use angle of the seat 20 is adjusted, the engagement between the seat 20 and the base 10 can be enhanced.

Various numbers of reinforcing members 221 may be provided, such as 2, 3, 4, 5, 6, 8, and the like. A plurality of reinforcing members 221 may be provided at different positions of the annular part 220. As shown in FIG. 30, two reinforcing members 221 may be provided at the front and rear of the annular part 220, respectively. This is based on the consideration of the force to which the child safety seat is subjected when the child safety seat is impacted. Optionally, the plurality of reinforcing members 221 may have the same length and thickness, thereby providing the same degree of reinforcement in different directions, or may have different lengths and thicknesses, thereby providing different degrees of reinforcement in different directions.

Figure 31:
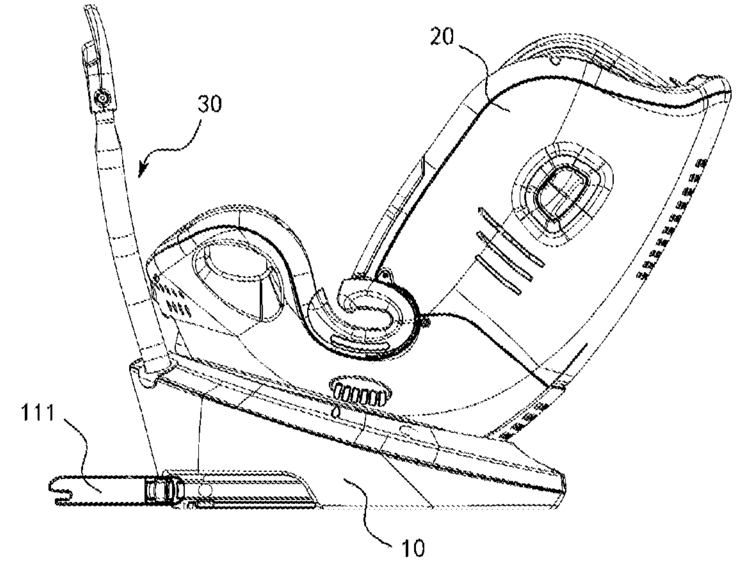
FIG. 31 is a side view of an embodiment of the child safety seat of the present disclosure.
Figure 32:
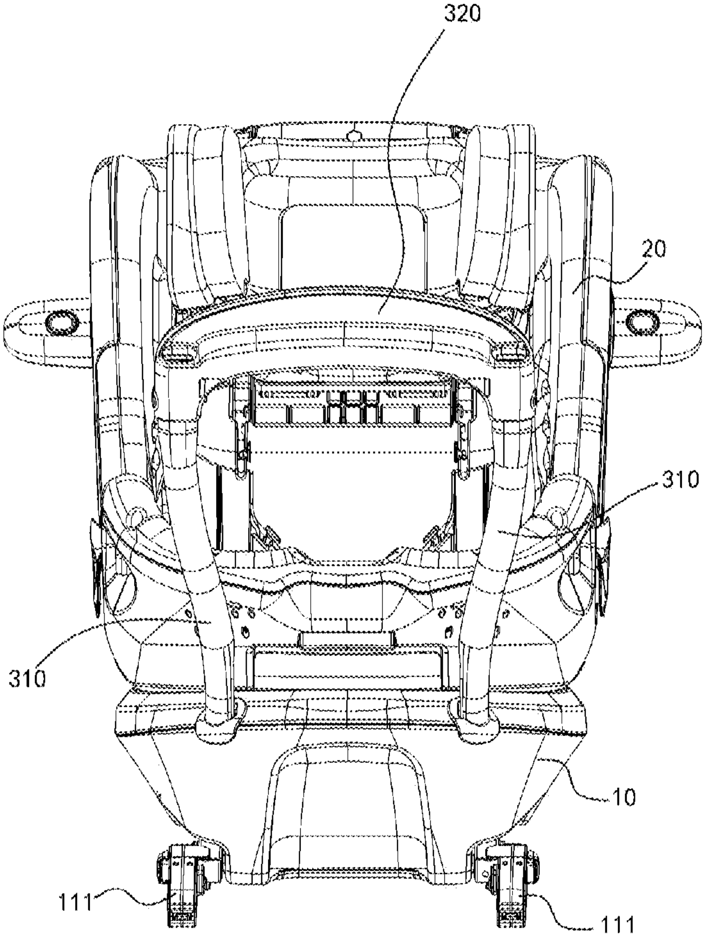
FIG. 32 is a front view of the child safety seat of the embodiment of the disclosure.
Figure 33:
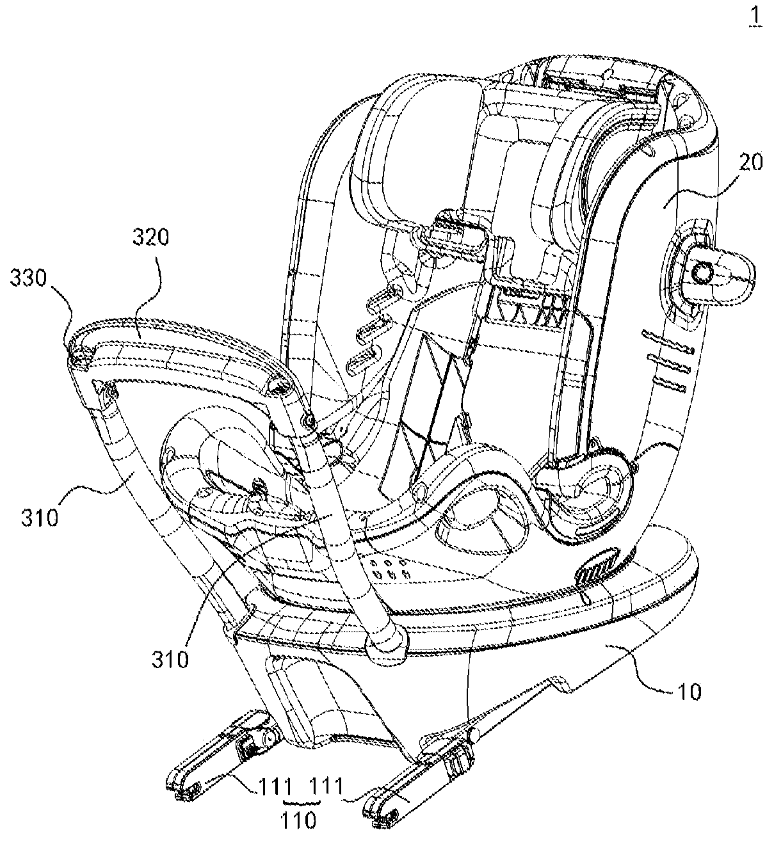
FIG. 33 is a perspective view of the child safety seat of the embodiment of the disclosure.

FIG. 31 is a side view of an embodiment of the child safety seat of the present disclosure, and FIG. 32 is a plan view of the child safety seat of an embodiment of the disclosure.

The child safety seat 1 may comprise a base 10, a seat 20 disposed above the base 10, and a top rod 30 erected at the rear of the base 10.

The base 10 may be provided with an anchor part 110 protruding backwardly. The anchor part 110 may be an ISOFIX connector (a connector which can be fixed to an ISOFIX interface), and includes two anchoring arms 111.

The child safety seat 1 may comprises a tether assembly 40. Optionally, the tether assembly 40 may also be a separate assembly other than the child safety seat 1. The tether assembly 40 may be a Top Tether connector (a connector which can be fixed to a Top Tether interface).

The top rod 30 may be fixed to the rear of the base 10. Specifically, the top rod 30 may be substantially vertically erected at the rear of the base 10. An upper portion of the top rod 30 may be provided with an opening 330. In different embodiments, the top rod 30 may be provided with one or two openings 330. A top tether 410 (will be described in detail below) of the tether assembly 40 is fixed to the child safety seat 1 through the opening 330. For example, the top tether 410 extends into the top rod 30 through the opening 330 and is fixed therein.

In an embodiment, the top rod 30 may include two vertical rods 310 and one fixing portion 320, and tops of the two vertical rods 310 are each provided with an the opening 330.

One ends of two belts (e.g., a connecting belt 412 and an adjusting belt 411) of the top tether 410 may respectively be fixed to the top rod 30 via the two vertical rods 310. One connecting belt 412 and two adjusting belts 411 of the top tether 410 are connected to each other via two adjusters 430, and a tether fixing portion 450 is fixedly or movably connected to one of the adjusting belts 411, such that the tether assembly 40 formed as a whole into a Y shape or a V shape. Moreover, one ends of the belts may move a certain distance within the top rod 30.

One ends of two belts (e.g., two connecting belts 412) of the top tether 410 may be respectively fixed to the top rod 30 through the two vertical rods 310. Moreover, two adjusters 430 are fixed to the other ends of the two belts. Both ends of one adjusting belt 411 respectively pass through the two adjusters 430 to form two free ends 4111, and the tether fixing portion 450 is fixedly or movably connected to the adjusting belts 411, such that the tether assembly 40 is formed as a whole into a Y shape or a V shape.

One ends of two belts (e.g., two connecting belts 412) in the top tether 410 may be respectively fixed to the top rod 30 through two vertical rods 310. A connecting member 460 is fixed to the other ends of the two belts. One end of one of the adjusting belts 411 is fixed to the connecting member 460. The other end of this adjusting belt 411 may pass through one adjuster 430, and another adjusting belt 411 may pass through another adjuster 430 to form two free ends 4111, such that the tether assembly 40 is formed as a whole into a Y shape or a V shape. The above two adjusters 430 may be connected to each other (e.g., via the connecting belts 412).

In an embodiment, both ends of one belt in the top tether 410 (e.g., the connecting belt 412) are fixed to the top rod 30 respectively through the two vertical rods 310. The adjusting belts 411 are fixedly or slidably connected to the belt (optionally, connected to other adjusting belt 411, the connecting belt 412 and the adjuster 430), such that the tether assembly 40 is formed as a whole into a T shape.

Figure 36:
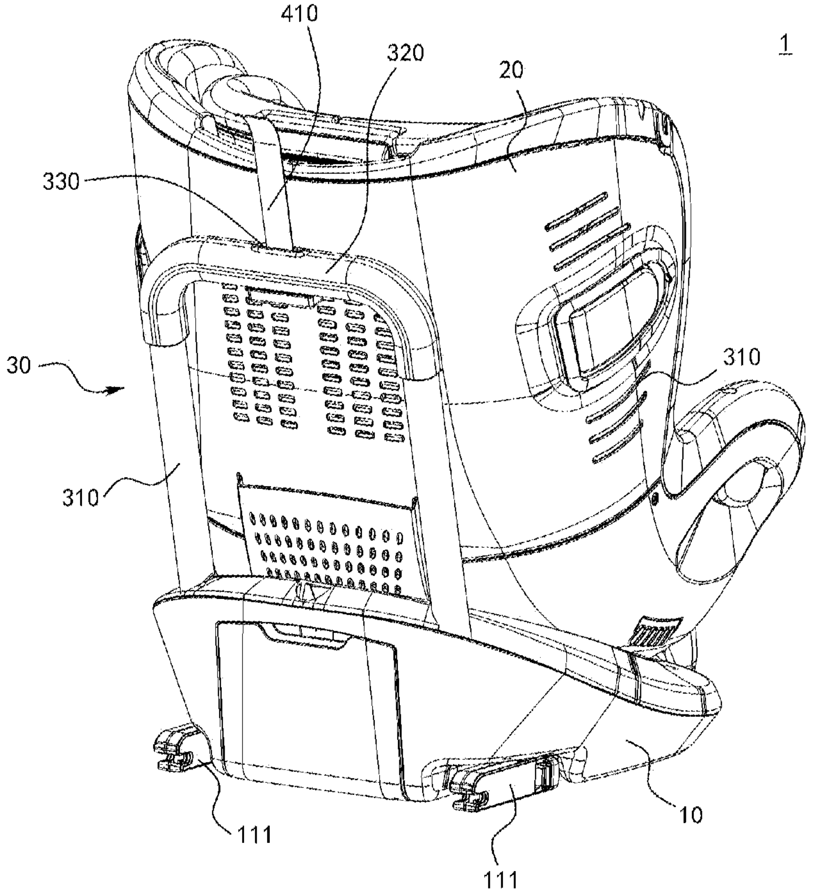
FIG. 36 is a perspective view of another embodiment of the child safety seat of the disclosure.

In an embodiment, as shown in FIG. 36, the top rod 30 may include two vertical rods 310 and one fixing portion 320.

Specifically, the top rod 30 includes: two vertical rods 310, symmetrically erected at the rear of the base 10; a fixing portion 320, coupled to top ends of the two vertical rods 310, and an accommodating portion 340, disposed centrally on a lower surface of the fixing portion 320.

One end of one belt (e.g., a connecting belt 412) in the top tether 410 may be fixed to the top rod 30. The end of the belt may move a limited distance within the top rod 30.

Figure 37:
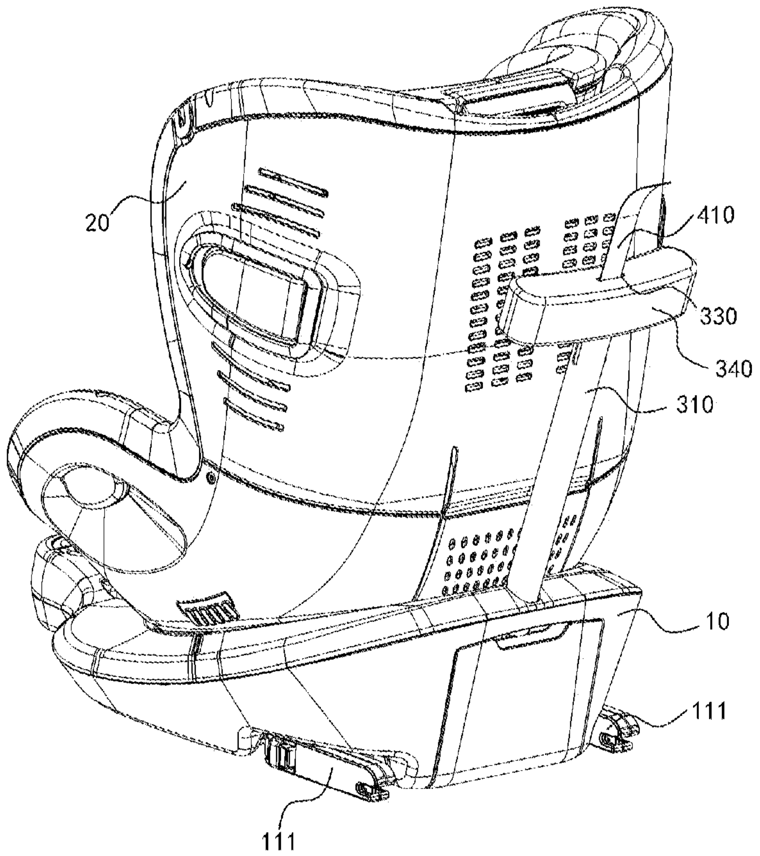
FIG. 37 is a perspective view of a further embodiment of the child safety seat of the disclosure.

In an embodiment, as shown in FIG. 37, the top rod 30 may include one vertical rod 310 and one accommodating portion 340.

One end of one belt (e.g., a connecting belts 412) in the top tether 410 may be fixed to the top rod 30. The end of the belt may move a certain distance within the accommodating portion 340. In this application, two adjusters 430 may be replaced by one two-way adjuster 440 (will be explained hereinbelow). One adjuster 430 may also be replaced by one two-way adjuster 440.

The vertical rod 310 and the fixing portion 320 may be made of different materials, for example, the vertical rod 310 is made of a metal, and the fixing portion 320 is made of a plastic.

The seat 20 is rotatably disposed on the base 10, and may rotate relative to the base 10 along an axis substantially perpendicular to an upper surface of the base 10 by an angle range. A lower surface and the upper surface of the base 10 may form an angle, such that the seat 20 is tilted forward.

Figure 38:
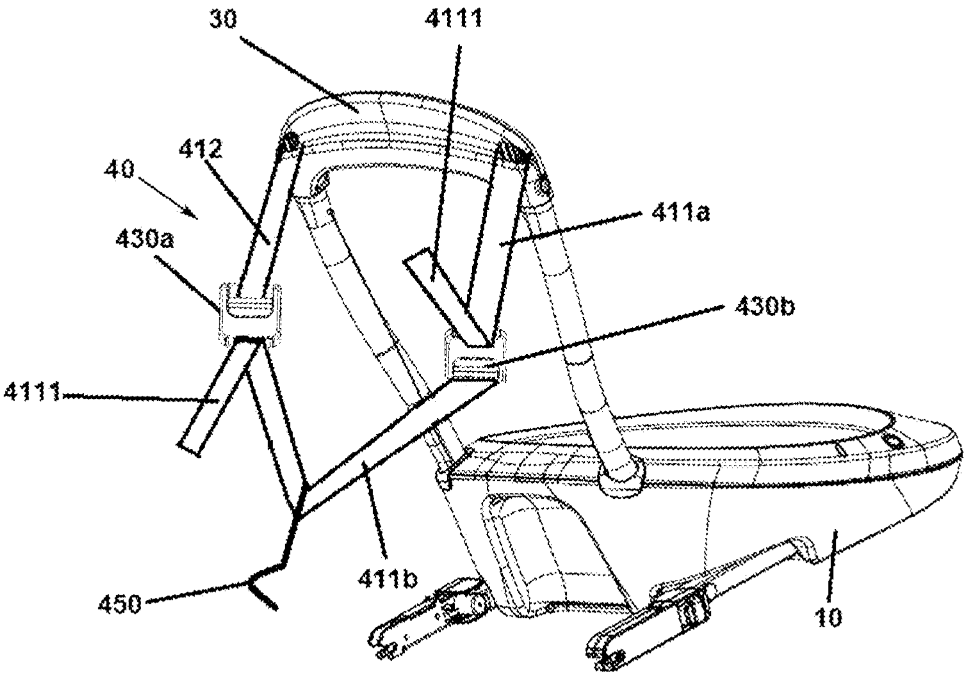
FIG. 38 is a schematic view of an embodiment of the tether assembly of the disclosure.

FIG. 38 is a schematic view of an embodiment of the tether assembly of the disclosure.

The tether assembly 40 may comprise: at least two adjusters 430; a top tether 410, fixed to the child safety seat 1, and passing through at least two adjusters 430 to form a same number of free end 4111 as that of the at least two adjusters; a tether fixing portion 450, coupled to the top tether 410 and may be fixed to a vehicle. The at least two adjusters 430 each may lock and release the top tether 410 passing therethrough.

In an embodiment, the tether assembly 40 has two adjusters 430. However, the tether assembly 40 may have more than two adjusters 430.

Figure 42:
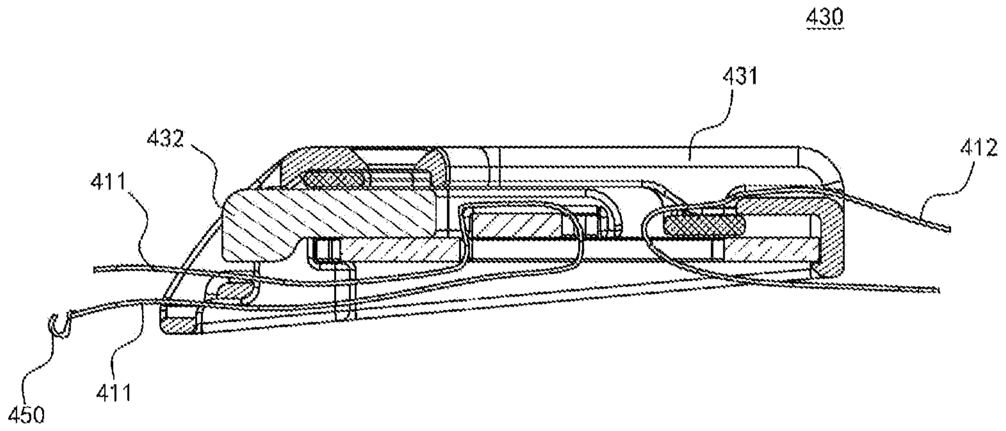
FIG. 42 is a section view of the adjuster of the tether assembly of the disclosure.

As shown in FIG. 42, the connecting belt 412 may extend into the adjuster 430 from a side, and bypass a fixing portion on the adjuster 430, and then extend out of the adjuster 430 from a lower side. In this way, the connecting belt 412 may be fixed to the adjuster 430. The adjusting belt 411 (e.g., connected to the tether fixing portion 450) may enter the adjuster 430 from an opening on the lower side of the adjuster 430, bypass a portion of the button 432, downwardly pass a gap formed between the button 432 and the adjuster housing 431, and finally extends from a left side of the adjuster 430 to form a free end 4111. When the button 432 is pressed rightward, the gap formed between the button 432 and the adjuster housing 431 becomes larger, such that the adjusting belt 411 may move freely relative to the adjuster 430. When the button 432 is released, the gap formed between the button 432 and the adjuster housing 431 becomes smaller (e.g., by an elastic force of a return spring), such that the adjusting belt 411 is clamped (stuck) by the button 432 and the adjuster housing 431 and cannot move freely relative to the adjuster 430.

Figure 34:
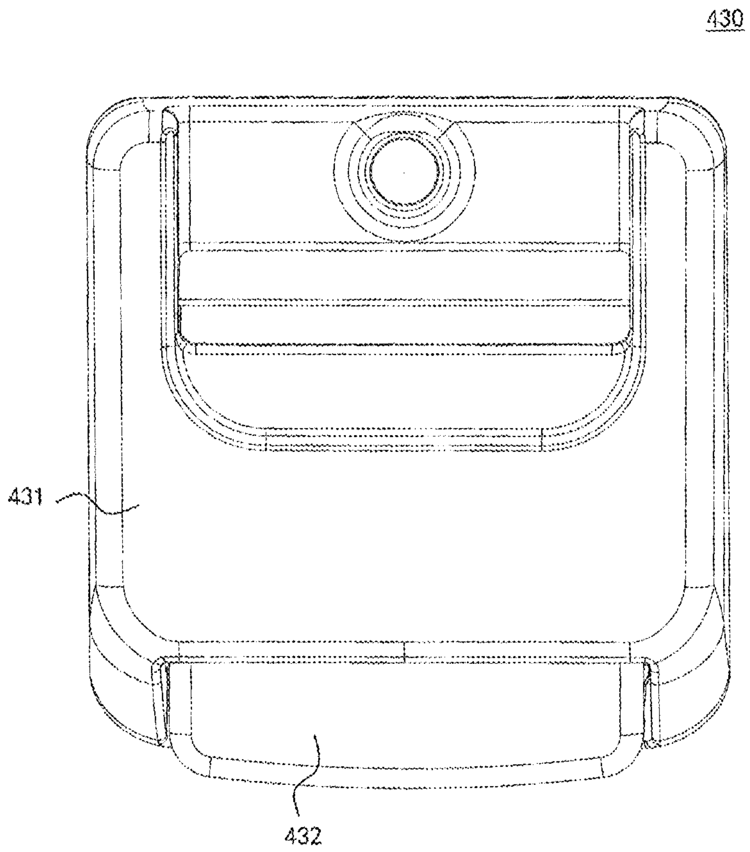
FIG. 34 is a plan view of an adjuster of a tether assembly of the disclosure.
Figure 35:
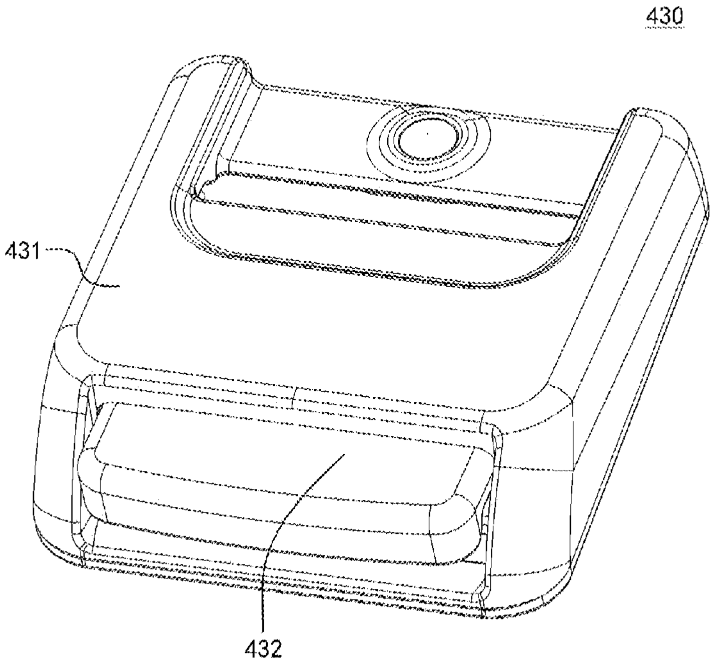
FIG. 35 is a perspective view of the adjuster of the tether assembly of the disclosure.

FIG. 34 is a plan view of the adjuster of the tether assembly of the disclosure, and FIG. 35 is a perspective view of the adjuster of the tether assembly of the disclosure.

In an embodiment, one end of the adjuster 430 may be designed as an adjusting end, and the adjusting end may be designed as a button, for example.

In an additional embodiment, the adjuster 430 may include the adjuster housing 431 and the button 432. The button 432 may have an opening on one side, and for example, the opening is located above or below the button 432. A weaved tether (e.g., the adjusting belt 411 which will be explained hereinbelow) may enter the button 432 from the opening and pass through a variable-width slit defined by the button 432 and the housing 431, and then extend out from the opening.

The adjuster 430 may be provided with a reset mechanism such as a spring and the like, such that when the button 432 is not pressed, the slit tend to shrink, such that the weaved tether passing through the adjuster 430 is stuck and cannot move relative to the adjuster 430. Moreover, when the button 432 is pressed, the slit tends to increase, such that the weaved tether passing through the adjuster 430 may move relative to the adjuster 430.

The adjuster 430 may also have some other structures. For example, the weaved tether may enter the adjuster 430 from one side and extend out from the other side. The specific structure of the adjuster 430 is not limited here, as long as it can make the adjuster have a function of adjusting the length of the weaved tether passing through it, and can lock the weaved tether when no adjustment is needed.

The adjuster 430 may be provided with a fixing portion on the other side, such that another weaved tether may be fixedly connected to the adjuster 430.

The adjuster 430 may be formed with an opening to expose a mark indicating that the adjuster 430 is locked or released. For example, the mark is a symbol of different colors.

The tether fixing portion 450 may be a hook (or a hook-shaped anchor), which can be fixedly or slidably disposed at a distal end of the top tether 410.

The two adjusters 430 of the tether assembly 40 may be arranged in opposite directions, such that two free ends 4111 formed by the top tether 410 passing through the two adjusters 430 extend out in opposite directions. It would be understood, since the top tether 410 is flexible, the directions of the adjusters 430 arranged on the top tether 410 may change. Therefore, the two adjusters 430 are arranged in opposite directions means that after the tether assembly 40 fixes the child safety seat 1 to a vehicle, in a state that the tether assembly 40 is tightened, the two adjusters 430 are arranged in a manner of having substantially reversed directions. The two free ends 4111 in opposite directions means that after the tether assembly 40 fixes the child safety seat 1 to a vehicle, the two free ends 4111 are in basically reversed directions when they just extend out from the two adjusters 430. Due to action of gravity, the two free ends 4111 will be in a dropping posture, for example. Optionally, the tether assembly 40 may have only one adjuster 430.

The two adjusters 430 of the tether assembly 40 may be arranged in a same direction, such that the two free ends 4111 formed by the top tether 410 passing through the two adjusters 430 extend out in the same direction.

As shown in FIG. 38, in an embodiment, the top tether 410 may include a first adjusting belt 411*a*, a second adjusting belt 411*b*, a first adjuster 430*a*, a second adjuster 430*b*, and a connecting belt (or first connecting belt) 412. The first adjusting belt 411*a*, the second adjusting belt 411*b* and the connecting belt 412 may be related to each other (e.g., directly connected or indirectly connected to each other via the first adjuster 430*a* and the second adjuster 430*b*) so as to constitute the top tether 410.

One end of the connecting belt 412 is fixed to one side of the top rod 30 (e.g., the inside of one vertical rod 310), and the other end of the connecting belt 412 is fixed to the first adjuster 430*a*.

One end of the first adjusting belt 411*a* is fixed to the other side of the top rod 30 (e.g., the inside of the other vertical rod 310), and the other end of the first adjusting belt 411*a* passes through the second adjuster 430*b* to form one free end 4111 extending toward the child safety seat 1.

One end of the second adjusting belt 411*b* is fixed to the second adjuster 430*b*, and the other end of the second adjusting belt 411*b* passes through the first adjuster 430*a* to form one free end 4111 extending away from the child safety seat 1.

One end of the tether fixing portion 450 may be slidably or fixedly connected to the second adjusting belt 411*b*, and the other end of the tether fixing portion is formed as a hook.

In this way, the tether assembly 40 can be tightened in two opposite directions, such that the tether assembly 40 may be mounted more easily, moreover, because the tightening force may be applied more easily, the tether assembly 40 may also be assuredly tightened, thereby improving safety of the tether assembly. In addition, the length of the tether assembly 40 can be adjusted in a larger range.

Optionally, in this embodiment, the top tether 410 may have only one adjuster 430.

Optionally, in this embodiment, the top tether 410 may have three adjusters 430. Optionally, the adjusters 430 may be two-way adjusters (as will be explained hereinbelow).

Figure 39:
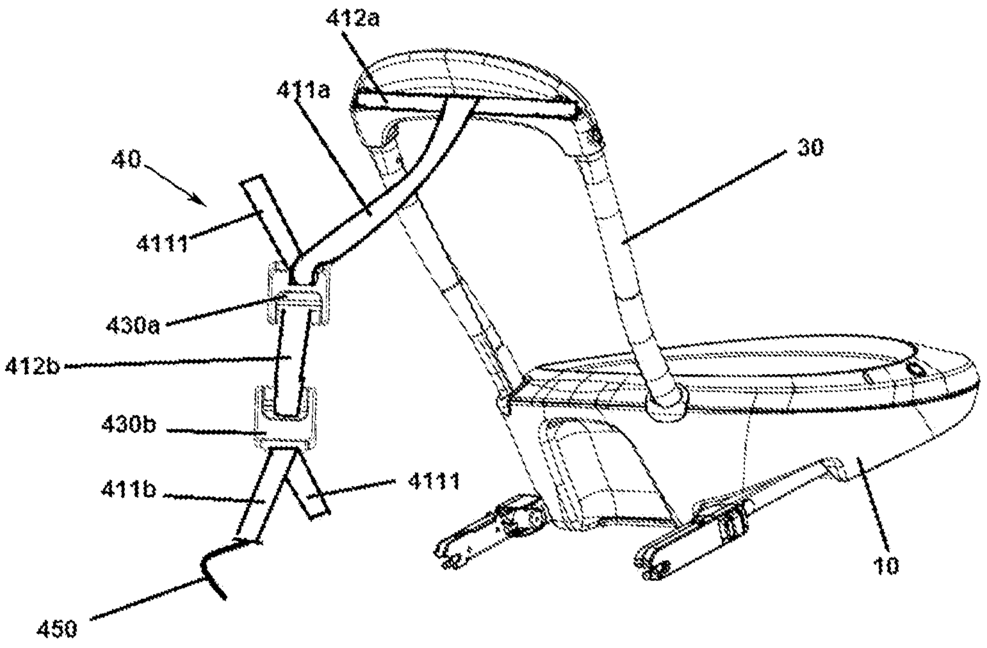
FIG. 39 is a schematic view of another embodiment of the tether assembly of the disclosure.

As shown in FIG. 39, in an embodiment, the top tether 410 may have a first adjusting belt 411*a*, a second adjusting belt 411*b*, a first adjuster 430*a*, a second adjuster 430*b*, a first connecting belt 412*a*, and a second connecting belt 412*b*.

Both ends of the first connecting belt 412*a* are respectively fixed to both sides of the top rod 30, for example, fixed on the two vertical rods 310 or fixed to the inner side of the two vertical rods 310.

One end of the first adjusting belt 411*a* is slidably or fixedly connected to the first connecting belt 412*a*, and the other end of the first adjusting belt 411*a* passes through the first adjuster 430*a* to form one free end 4111 extending toward the child safety seat 1.

Both ends of the second connecting belt 412*b* are respectively fixed to the first adjuster 430*a* and the second adjuster 430*b*.

One end of the second adjusting belt 411*b* passes through the second adjuster 430*b* to form one free end 4111 extending out of the child safety seat 1, and the tether fixing portion 450 is fixed to the other end of the second connecting belt 412*b*.

In this way, the tether assembly 40 occupies a relative small space, and can be mounted in the relatively narrow compartment of the vehicle.

Optionally, in this embodiment, the top tether 410 may have only one adjuster 430.

Optionally, in this embodiment, the top tether 410 may have three adjusters 430. Optionally, one adjuster 430 may be a two-way adjuster (as will be explained hereinbelow).

Figure 40:
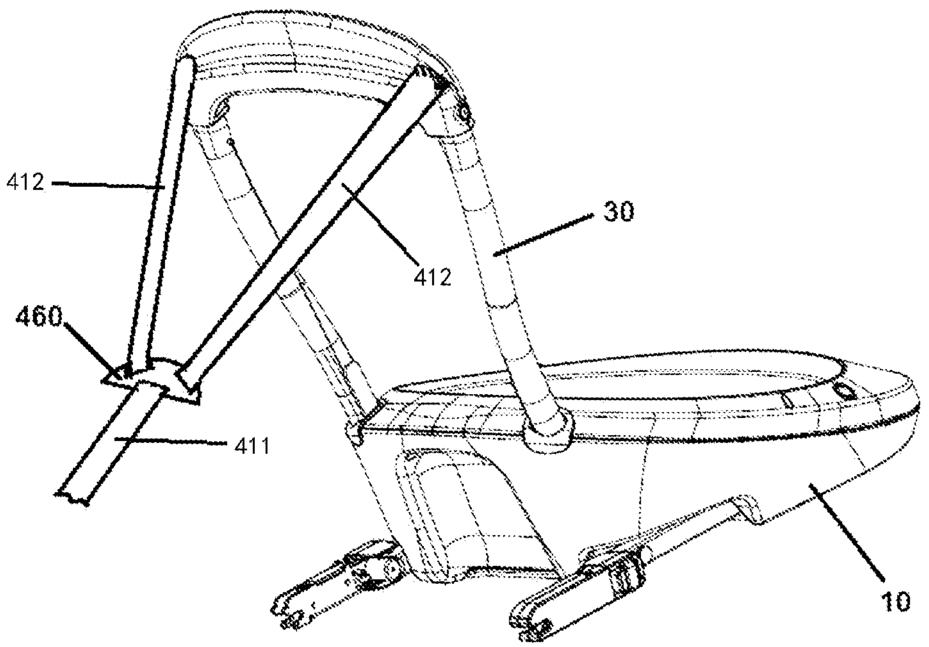
FIG. 40 is a schematic view of a further embodiment of the tether assembly of the disclosure.

As shown in FIG. 40, the tether assembly may further comprise a connecting member 460 for connecting two connecting belts 412 and one adjusting belt 411 together. The two connecting belts 412 may be fixed to a side of the connecting member 460, and one adjusting belt 411 may be fixed to the other side of the connecting member 460. The connecting member 460 may be an iron sheet with three elongated holes formed therein.

Optionally, in this embodiment, the top tether 410 may have only one adjuster 430.

Optionally, in this embodiment, the top tether 410 may have three adjusters 430. Optionally, one adjuster 430 may be a two-way adjuster (as will be explained hereinbelow).

Figure 41:
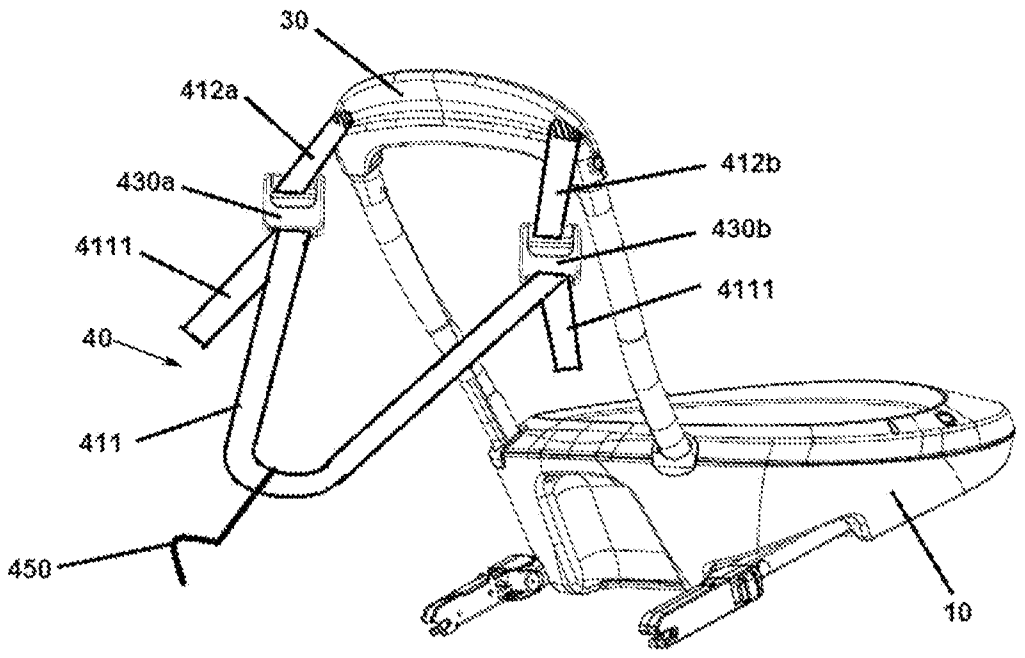
FIG. 41 is a schematic view of an additional embodiment of the tether assembly of the disclosure.

FIG. 41 is a schematic view of an additional embodiment of the tether assembly of the disclosure.

The tether assembly 40 may comprises a first adjuster 430*a*, a second adjuster 430*b*, and one adjusting belt 411. The first adjuster 430*a* and the second adjuster 430*b* are arranged in a same direction. Both ends of the adjusting belt 411 respectively pass through the first adjuster 430*a* and the second adjuster 430*b* to form two free ends 4111 extending in a same direction (the direction away from the child safety seat). The first adjuster 430*a* and the second adjuster 430*b* may be fixed to both sides of the top rod 30 via a connecting belt 412. The tether fixing portion 450 is slidably connected to the adjusting belt 411.

In this way, when the child safety seat 1 is placed on the right side seat and the left side of the vehicle, the tether assembly 40 can be adjusted by the adjuster on the closer side, so it is more convenient to apply force. Adjustments performed by two adjusters have similar effects. In addition, two adjusters may make the adjustable range of the length of the tether assembly 40 wider.

Optionally, in this embodiment, the top tether 410 may have only one adjuster 430.

Optionally, in this embodiment, the top tether 410 may have three adjusters 430. Optionally, one adjuster 430 may be a two-way adjuster (as will be explained hereinbelow).

Figure 43:
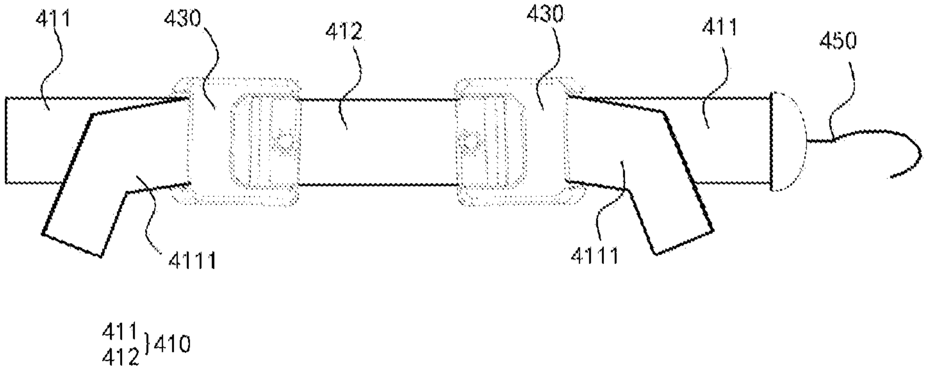
FIG. 43 is a schematic view of another embodiment of the tether assembly of a child safety seat of the disclosure.

FIG. 43 is a schematic view of an embodiment of the tether assembly 40 of the child safety seat of the disclosure. The tether assembly 40 may comprise a top tether 410, an adjuster 430, and a tether fixing portion 450. The top tether 410 may include an adjusting belt 411 and a connecting belt 412. The adjusting belt 411 may pass through the adjuster 430 to extend for forming a free end 4111. The adjuster 430 may have a button. When the button is not pressed, the adjuster 430 locks the adjusting belt 411, and when the button is pressed, the adjuster 430 releases the adjusting belt 411. At this time, pulling the free end 4111 may shorten a length of the adjusting belt 411, and pulling the adjusting belt 411 may increase the length of the adjusting belt 411.

Figure 44:
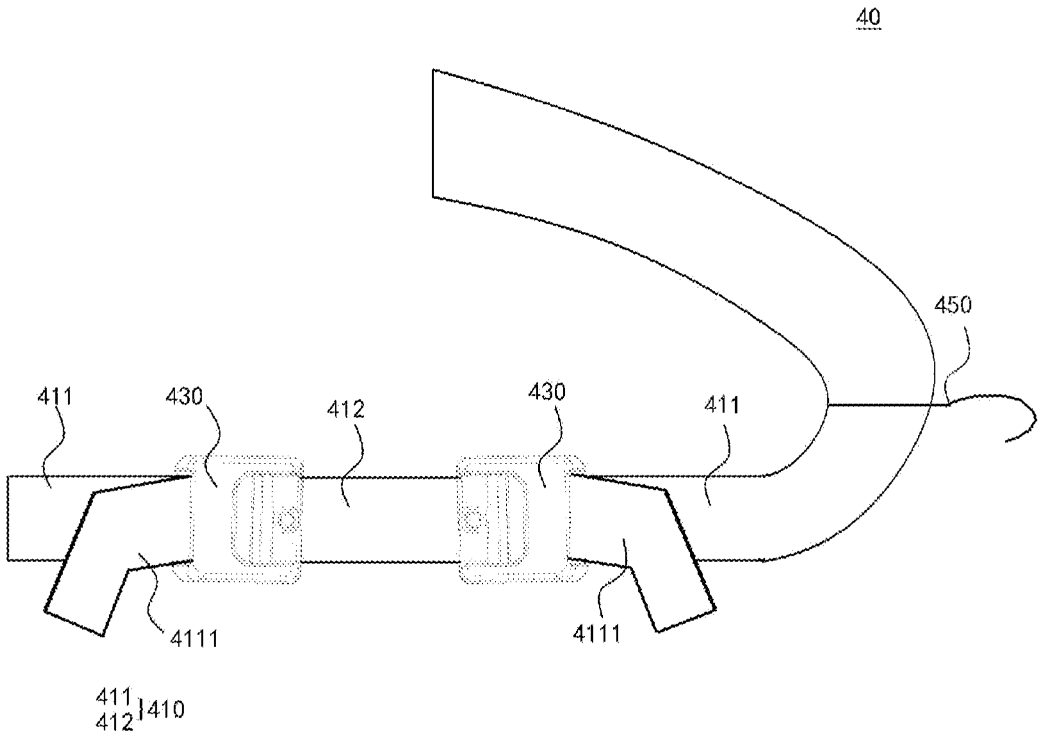
FIG. 44 is a schematic view of another embodiment of the tether assembly of the child safety seat of the disclosure.

FIG. 44 is a schematic view of another embodiment of the tether assembly 40 of the child safety seat of the disclosure. The tether assembly 40 may have two adjusters 430. The two adjusters 430 may be arranged in opposite directions. The top tether 410 may include two adjusting belts 411 and one connecting belt 412. The connecting belt 412 is connected between the two adjusters 430. The two adjusting belts 411 respectively pass through the two adjusters 430 to form two free ends 4111 toward opposite directions, such that the length of the tether assembly 40 may adjusted in two opposite directions by pulling the two free ends 4111.

In an embodiment, the tether fixing portion 450 is fixed to an end of one of the two adjusting belts 411, and the other one of the two adjusting belts 411 is fixed on the top rod 30.

In another embodiment, the tether fixing portion 450 is slidably connected to one of the two adjusting belts 411, and the other one of the two adjusting belts 411 is fixed on the top rod 30.

In a further embodiment, the tether assembly 40 further comprises a two-way adjuster 441. The two-way adjuster 441 may adjust the length of the tether assembly 40 in two opposite directions. In other words, the two adjusting belts 411 may respectively pass through the two-way adjuster 441 from both ends to form two free ends 4111 toward opposite directions, such that the length of the tether assembly 40 may adjusted in two opposite directions by pulling the two free ends 4111.

Figure 45:
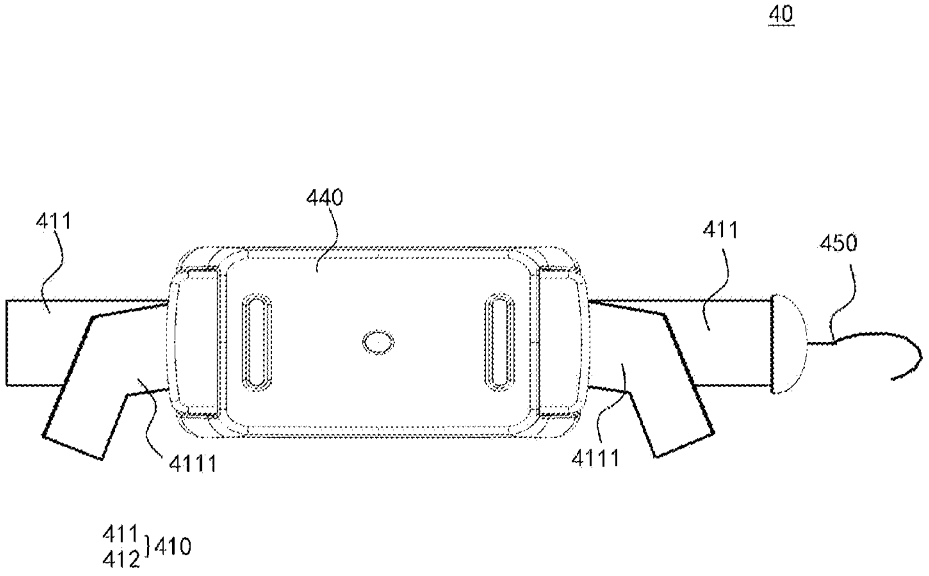
FIG. 45 is a schematic view of another embodiment of the tether assembly of the child safety seat of the disclosure.
Figure 46:
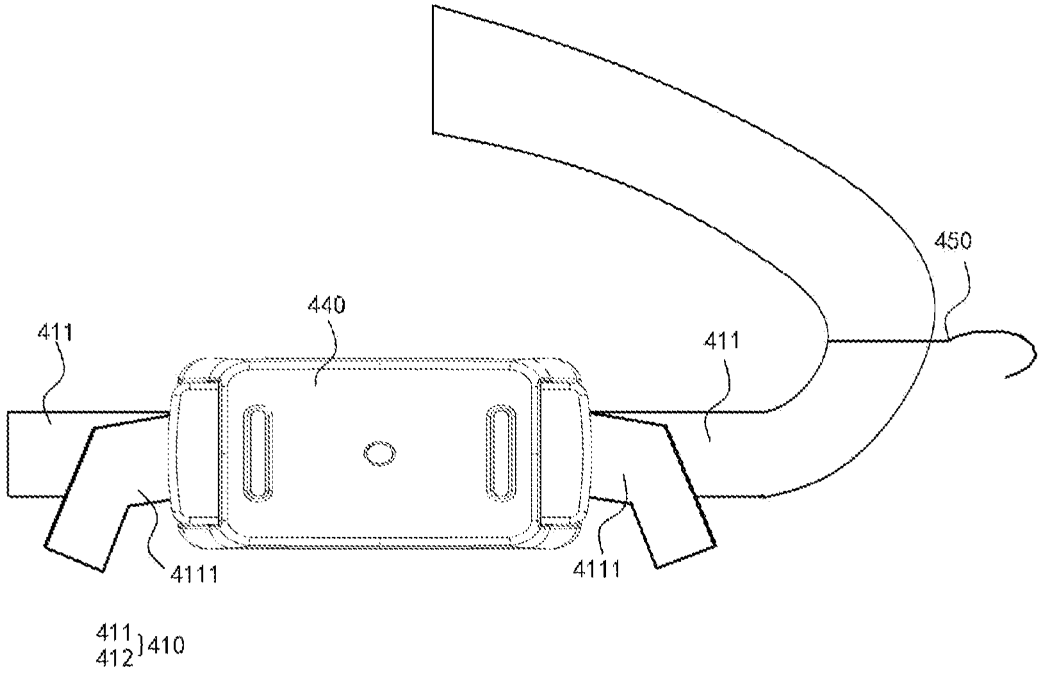
FIG. 46 is a schematic view of another embodiment of the tether assembly of the child safety seat of the disclosure.

FIG. 45 is a schematic view of another embodiment of the tether assembly of the child safety seat of the disclosure, and FIG. 46 is a schematic view of another embodiment of the tether assembly of the child safety seat of the disclosure. The embodiments shown in FIG. 45 and FIG. 46 are respectively similar to the embodiments shown in FIG. 43 and FIG. 44 except that a two-way adjuster 440 is used to replace the two adjusters 430 and the connecting belt 412.

Figure 47:
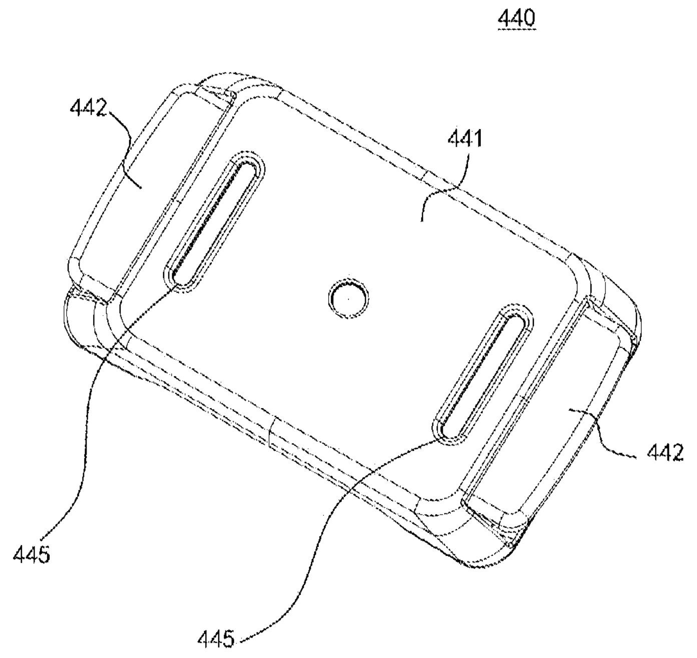
FIG. 47 is a perspective view of a two-way adjuster of the child safety seat of the disclosure.
Figure 48:
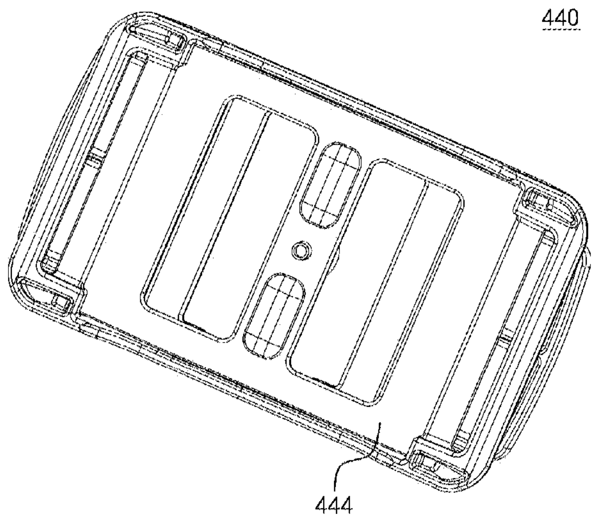
FIG. 48 is another perspective view of the two-way adjuster of the child safety seat of the disclosure.
Figure 49:
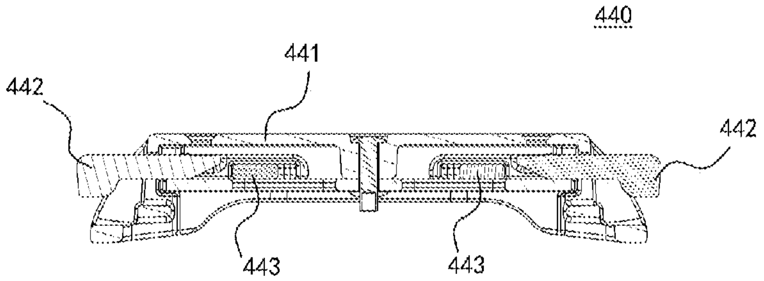
FIG. 49 is a section view of the two-way adjuster of the child safety seat of the disclosure, in which a button is not pressed.
Figure 50:
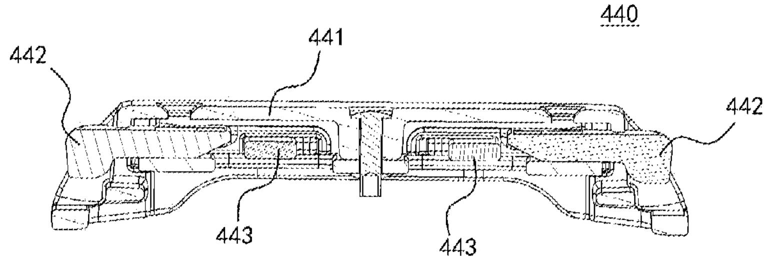
FIG. 50 is a section view of the two-way adjuster of the child safety seat of the disclosure, in which a button is pressed.
Figure 51:
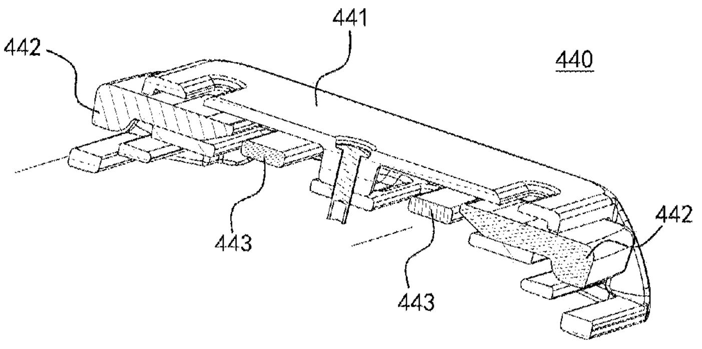
FIG. 51 is a perspective section view of the two-way adjuster of the child safety seat of the disclosure.
Figure 52:
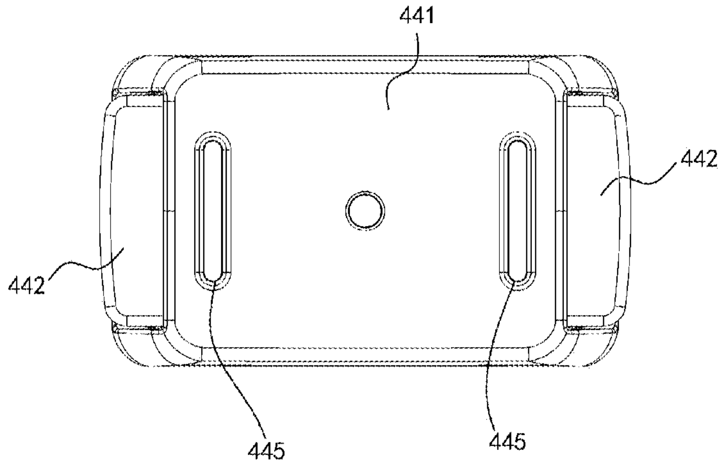
FIG. 52 is a top view of the two-way adjuster of the child safety seat of the disclosure, in which a button is not pressed.
Figure 53:
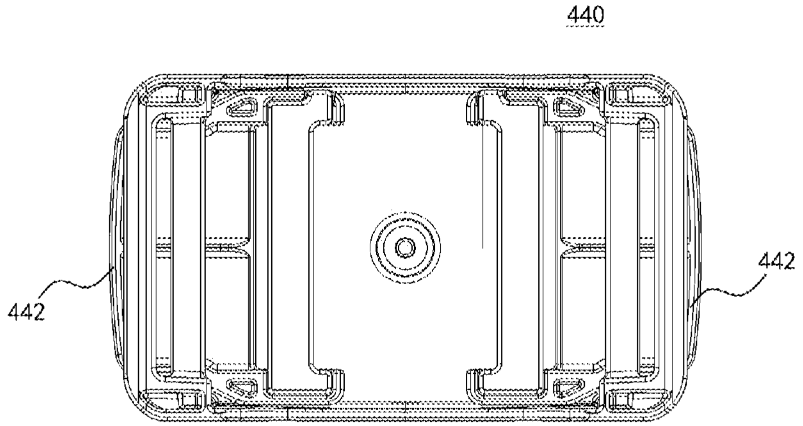
FIG. 53 is a bottom view of the two-way adjuster of the child safety seat of the disclosure, in which a button is not pressed.
Figure 54:
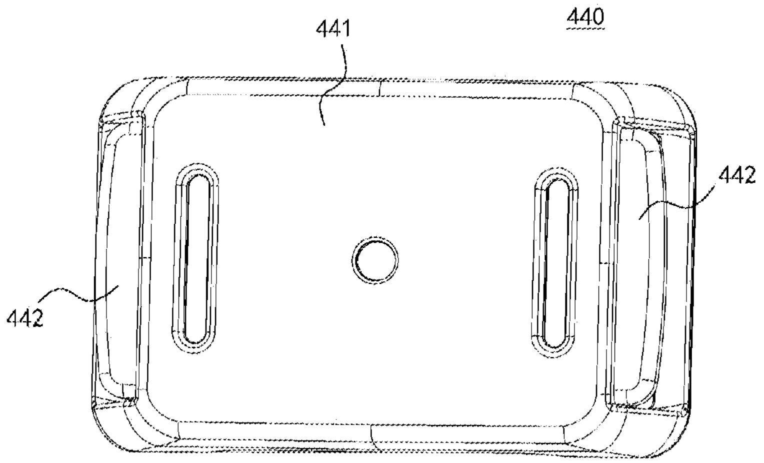
FIG. 54 is a top view of the two-way adjuster of the child safety seat of the disclosure, in which a button is pressed.
Figure 55:
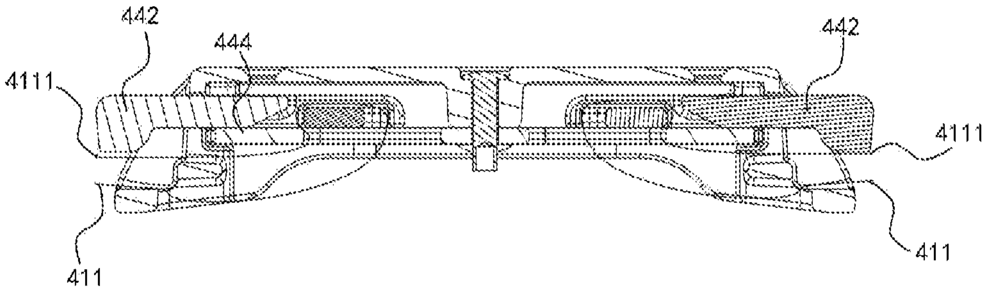
FIG. 55 is a schematic section view of the two-way adjuster of the child safety seat of the disclosure.
Figure 56:
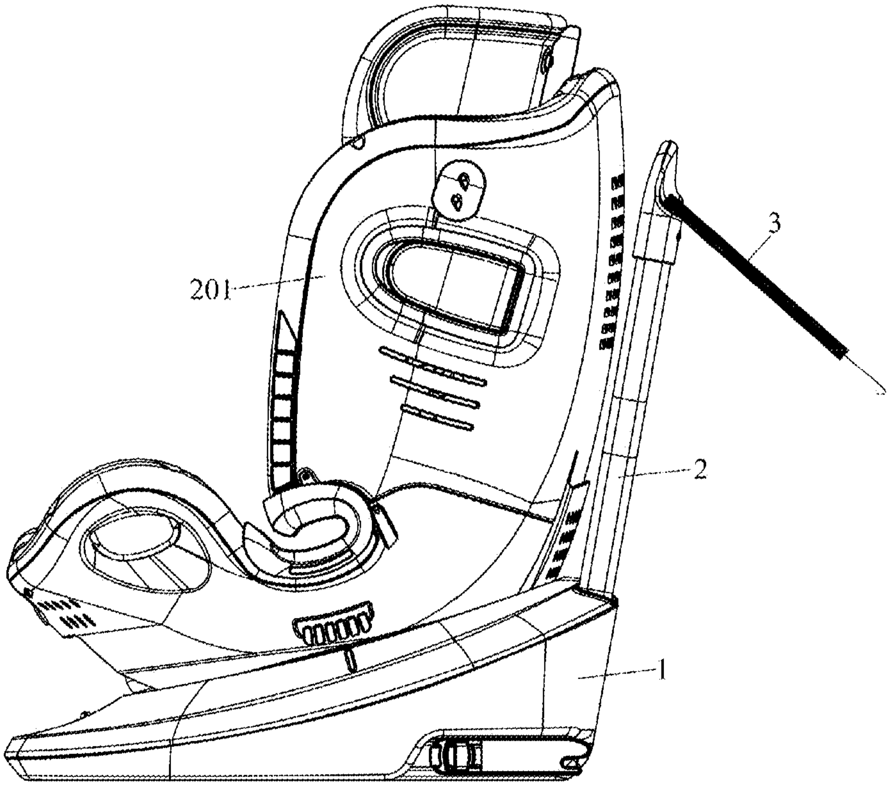
FIG. 56 is a structural schematic view of the child safety seat of the present disclosure.

FIG. 47 is a perspective view of a two-way adjuster of the child safety seat of the disclosure; FIG. 48 is another perspective view of the two-way adjuster of the child safety seat of the disclosure; FIG. 49 is a section view of the two-way adjuster of the child safety seat of the disclosure, in which a button is not pressed; FIG. 50 is a section view of the two-way adjuster of the child safety seat of the disclosure, in which a button is pressed; FIG. 51 is a perspective section view of the two-way adjuster of the child safety seat of the disclosure; FIG. 52 is a top view of the two-way adjuster of the child safety seat of the disclosure, in which a button is not pressed; FIG. 53 is a bottom view of the two-way adjuster of the child safety seat of the disclosure, in which a button is not pressed; FIG. 54 is a top view of the two-way adjuster of the child safety seat of the disclosure, in which a button is pressed; FIG. 55 is a schematic section view of the two-way adjuster of the child safety seat of the disclosure.

The two-way adjuster 440 may include: an adjuster housing 441 having two first openings facing opposite directions; two buttons 442 respectively disposed at the two first openings and capable of moving in directions into and away from the adjuster housing 441; fixed sheets 443 fixed at a bottom of the adjuster housing 441 and formed with two second openings; two locking members 444 disposed inside the adjuster housing 441 and respectively move along with the two buttons 442 to a locked position and a released position, wherein two belts (e.g., top belts 410) may respectively enter the adjuster housing 441 via the two second openings, pass through a gap between the two locking members 444 and the fixed sheet 443, and extend out of the adjuster housing 441 to form two free ends extending in opposite directions, and wherein in the locked position, the two locking members 444 and the fixed sheet 443 respectively clamp the two belts, and in the released position, the two locking members 444 and the fixed sheet 443 allow the two belts to move.

A spring may be disposed between the two buttons 442, so as to respectively apply force to the two buttons 442 for restoring the adjuster housing 441.

An upper surface of the adjuster housing 441 may be formed with two tightening indicating windows 445 to respectively indicate whether the two belts are tightened. Different positions on the upper surfaces of the two buttons 442 may be marked with different colors, such that when the buttons 442 are in the locked position, the tightening indicating windows 445 show one color (e.g., green) on the upper surface of the buttons 442, and when the buttons 442 are in the released position, the tightening indicating windows 445 show the other one color (e.g., red) on the upper surface of the buttons 442. Alternatively, the tightening indicating windows 445 may also be disposed at other positions of the adjuster housing 441, such as a side surface, a bottom surface and both ends, and the application is not limited thereto. The tightening indicating windows 445 may also be used to provide information in other ways, such as lines, graphic marks, and the present application is not limited thereto. The tightening indicating windows 445 may also be formed of a transparent material such that the inside of the adjuster housing 441 can be seen.

The two-way adjuster 440 may adjust the length of the top tether 410 in different directions.

As shown in FIG. 55, when the top tether 410 passes through the two-way adjuster 440, it firstly enters the adjuster housing 441 upward from the openings of the locking members 444, then passes upward through an inner side of the fixed sheet 443 and the buttons 442 (the middle in FIG. 55), then bypasses the fixed sheet 443, and extends downward again on outside of the fixed sheet 443 (left and right sides in FIG. 55) to pass through the gap between the fixed sheet 443 and the locking members 444, and finally extends out of the adjuster housing 441 downward below the locking members 444.

In this way, when the top tether 410 is tightened, the top tether 410 may be clamped between the locking members 444 and the fixed sheet 443 (because when the adjusting belts 111 is tensioned, the top tether 410 pulls the fixed sheet 443 outward, such that the fixed sheet 443 and the locking members 444 tend to be closer to each other), so as to realize positioning of the top tether 410. Moreover, when the length of the top tether 410 needs to be adjusted, the buttons 442 may be pressed, so as to bring the fixed sheet 443 away from the locking members 444, and the top tether 410 is released, accordingly a length adjustment may be performed.

When the two-way adjuster 440 is used, the two top belts 410 passing through the two-way adjuster 440 respectively extend into the top rod 30 and are connected to the tether fixing portion 450, such that the length of the tether assembly 40 can be adjusted in different directions.

Referring to FIGS. 55 to 58, the child safety seat 200 of the present disclosure includes a seat 201 and a support structure 100. The support structure 100 includes a base 1*a*, a top rod 2 and a top tether 3. The base 1*a* is provided with an installation position for installing the seat 201, the top rod 2 is fixed on the base 1*a* and located at a side of the installation position, and an end of the top tether 3 is fixed on the top rod 2. The seat 201 is installed on the installation position. When the seat 201 is installed forward, the top rod 2 is located behind the seat 201. After the child safety seat 200 is installed in the car seat, that is, after the base 1*a* and the top tether 3 are connected to the corresponding positions of the car seat, the top rod 2 leans against the car seat, and a distance between the top rod 2 and the car seat is shorter than a distance between the seat 201 and the car seat. Therefore, a length required for the top tether 3 fixed on the top rod 2 to be connected to the corresponding position of the car seat is smaller than a length required by the existing top tether 3 fixed on the seat 201, thereby reducing the service length of the top tether 3 and further saving the material cost of the top tether 3. When the seat 201 is reversely installed in the installation position, the installation position of the base 1*a* remains unchanged, and only the seat 201 is reversely installed. At this time, the top rod 2 and the top tether 3 are located in front of the seat 201, and an installation path of the top tether 3 connected to the corresponding position of the car seat is the same as an installation path thereof when the seat 201 is installed forward in the installation position. Compared with the existing top tether 3 fixed on the seat 201, the installation path of the top tether 3 of the present disclosure connected to the corresponding position of the car seat will not interfere with the passenger in the seat 201.

Figure 58:
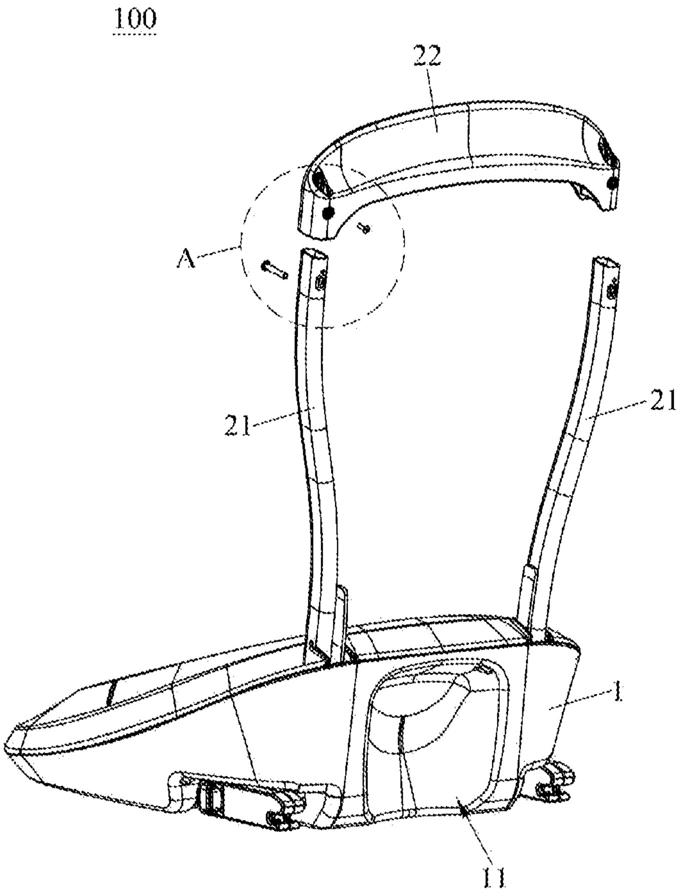
FIG. 58 is a schematic structural perspective view of a support structure of the child safety seat of the present disclosure.
Figure 59:
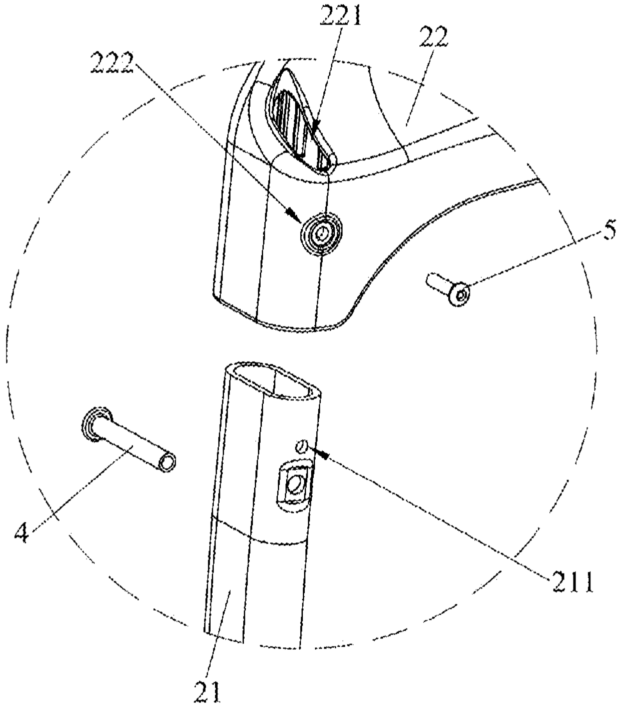
FIG. 59 is an enlarged view of part A in FIG. 58.

Referring to FIGS. 58 and 59, in this embodiment, the top rod 2 includes a supporting pipe 21 and a transverse rod part 22. The supporting pipe 21 has a hollow structure, and is fixed on the base 1*a*. The transverse rod part 22 is installed on the supporting pipe 21 and provided with a penetration 221*a*, which communicates with inside of the supporting pipe 21. An end of the top tether 3 passes through the penetration 221*a* and is fixed to an inner wall of the supporting pipe 21. However, the present disclosure is not limited thereto. For example, the top tether 3 may be directly disposed on a surface of the transverse rod part 22, or the top tether 3 is connected inside the supporting pipe 21. Specifically, two supporting pipes 21 are provided, and fixed on the base 1*a* at intervals. The transverse rod part 22 is fixed on the two supporting pipes 21. The transverse rod part 22 is provided with two penetrations 221*a*, which respectively communicate with inside of the two supporting pipes 21. The top tether 3 includes a fixing portion 31 and a mounting portion 32 formed by intersection of two fixing portions 31. The two fixing portions 31 respectively pass through the two penetrations 221*a*, and respectively fixed inside the two supporting pipes 21. The mounting portion 32 is used to connect with a car seat. The number of the supporting pipes 21 of the top rod 2 or the fixing portions 31 of the top tether 3 is not limited thereto. One or three supporting pipe(s) 21 and one or three fixing portion(s) 31 of the top tether 3 may be provided.

Referring to FIG. 59, the child safety seat 200 further includes a first connecting member 4, which penetrates through the supporting pipe 21, and an end of the top tether 3 is provided with a woven ring 311 sleeved on the first connecting member 4, wherein the first connecting member 4 may be a screw, a bolt, or the like. However, the way in which the top tether 3 is fixed to the supporting pipe 21 is not limited thereto. For example, the top tether 3 may be directly fixed to the supporting pipe 21 by rivets, or an end of the top tether 3 may be clamped in the supporting pipe 21. In this embodiment, the child safety seat 200 further includes a second connecting member 5, the transverse rod part 22 is provided with a first connecting hole 222, and the supporting pipe 21 is provided with a second connecting hole 211. The second connecting member 5 passes through the first connecting hole 222 and the second connecting hole 211 to fix the transverse rod part 22 on the supporting pipe 21. By providing the second connecting member 5, it is convenient to produce and install the top rod 2, and detach and replace the supporting pipe 21 and the transverse rod part 22. A screw, a bolt, or the like may also be used for the second connecting member 5.

Figure 57:
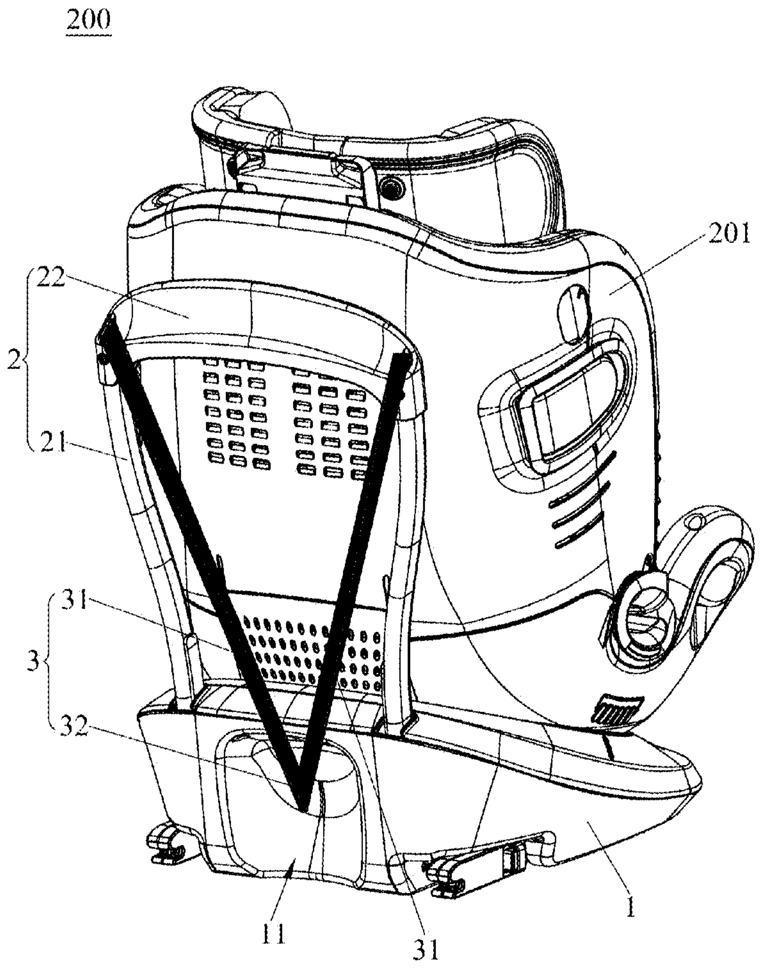
FIG. 57 is a schematic structural perspective view of the child safety seat of the present disclosure.

Referring to FIG. 57, in order to store the top tether 3 conveniently, the other end of the top tether 3 is provided with a first fixing member (not shown), and the base 1*a* is provided with a storage position 11 for storing the top tether 3, and the first fixing member is detachably connected to the storage position 11. Specifically, the storage position 11 is in a concave structure, forming an accommodating groove for accommodating the top tether 3. The base 1*a* is provided with a second fixing member (not shown) in the storage position 11, and the first fixing member is detachably connected with the second fixing member. One of the first fixing member and the second fixing member has a male buckle structure, and the other of the first fixing member and the second fixing member has a female buckle structure. In this embodiment, the first fixing member has a male buckle structure and the second fixing member has a female buckle structure, but it is not limited thereto. The connection mode of the first fixing member and the second fixing member may also use the existing hook & loop fastener or button, or the like.

Figure 60:
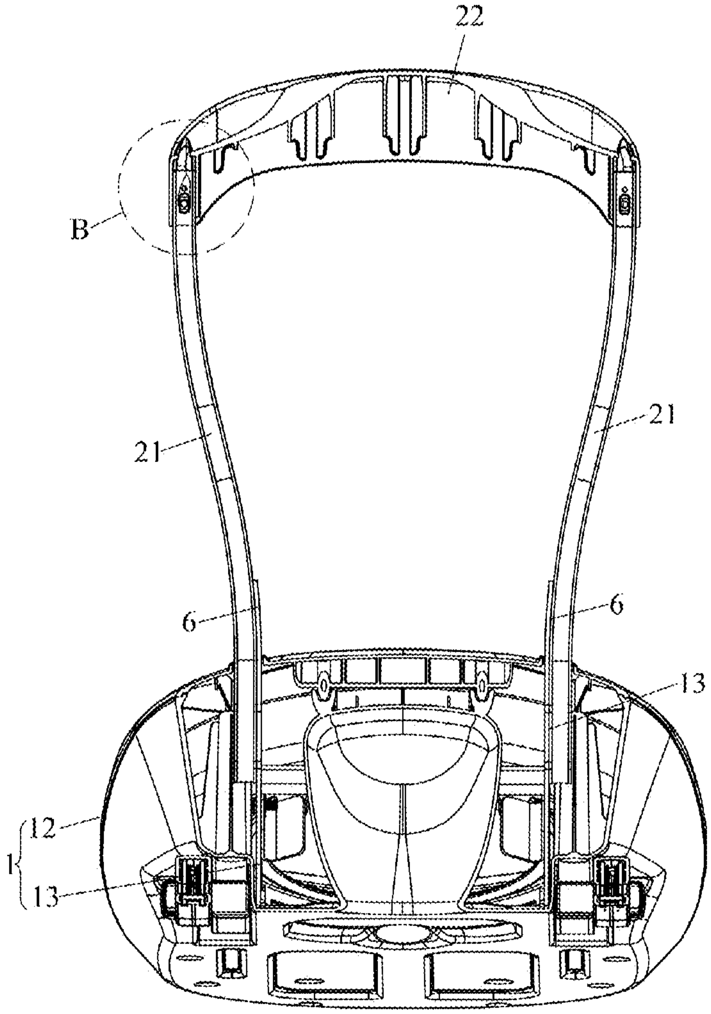
FIG. 60 is a sectional view of the child safety seat of the present disclosure.
Figure 61:
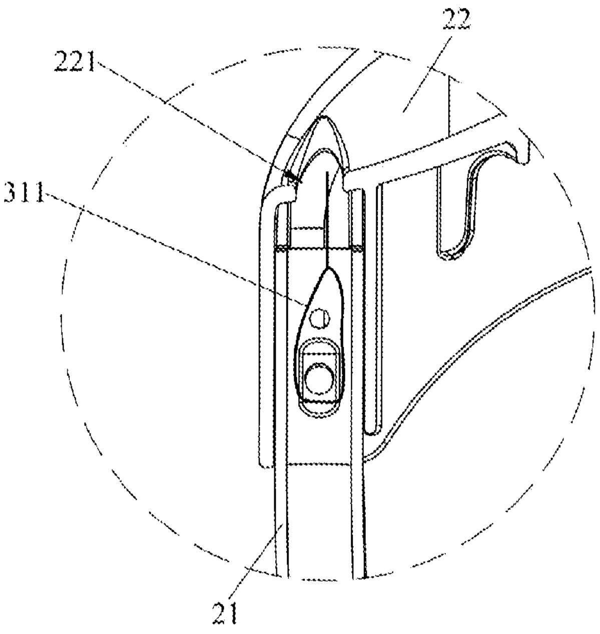
FIG. 61 is an enlarged view of part B in FIG. 60.
Figure 62:
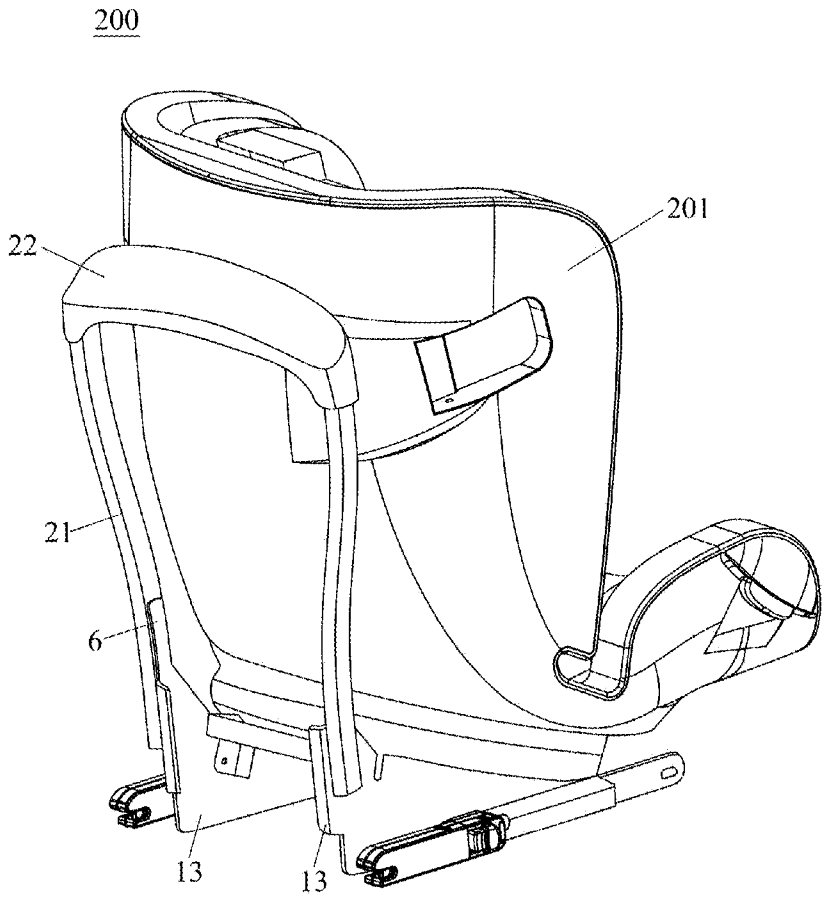
FIG. 62 is a schematic structural perspective view of the child safety seat of the present disclosure after the casing of the base is removed.

Referring to FIGS. 60 and 62, in this embodiment, the base 1*a* includes a casing 12 and a bracket 13. The bracket 13 is disposed inside the casing 12, and the top rod 2 passes through the casing 12 and is fixedly connected with the bracket 13. The child safety seat 200 also includes a reinforcing sheet 6 for improving the strength of the top rod 2, and the reinforcing sheet 6 is fixedly connected with the base 1*a* and the top rod 2, respectively. The reinforcing sheet 6 may be a reinforcing sheet 6 formed by extending upward from the bracket 13 of the base 1*a*, and the reinforcing sheet 6 protrudes out of the causing 12 and is connected with the supporting pipe 21 of the top rod 2. However, the structure of the reinforcing sheet 6 is not limited thereto, and the reinforcing sheet 6 may also be an independent part, and the reinforcing sheet 6 is fixedly connected with the base 1*a* and the top rod 2 respectively. By arranging the reinforcing sheet 6, the strength of the top rod 2 is improved, and the phenomenon that the top rod 2 is broken due to an excessive force is avoided. In this embodiment, the reinforcing sheet 6 is disposed in a length direction of the supporting pipe 21 of the top rod 2, the bottom of the reinforcing sheet 6 is fixed on the base 1*a*, and a side wall of the reinforcing sheet 6 is fixedly connected with the top rod 2. In other embodiments, the lower part of the top rod 2 may be thicker than the upper part of the top rod 2, that is, the supporting pipe 21 of the top rod 2 may be provided to be weaker in the upper part and stronger in the lower part, so as to strengthen the strength of the top rod 2. The supporting pipe 21 of the top rod 2 may also be provided with a certain arc along a stress direction to strengthen the strength of the top rod 2.

To sum up, the child safety seat 200 of the present disclosure has a support structure 100, a top rod 2 is fixed on the base 1*a* and disposed at a side of an installation position for installing the seat 201, and an end of the top tether 3 is fixed on the top rod 2. When the seat 201 is installed in the installation position forward, the top rod 2 is located behind the seat 201; and after the child safety seat 200 is installed in the car seat, a distance between the top rod 2 and the car seat is shorter than a distance between the seat 201 and the car seat. Therefore, a length required for the top tether 3 fixed on the top rod 2 to be connected to the corresponding position of the car seat is smaller than a length required by the existing top tether 3 fixed on the seat 201, thereby reducing the service length of the top tether 3 and further saving the material cost of the top tether 3. When the seat 201 is reversely installed in the installation position, the installation position of the base 1*a* remains unchanged, and only the seat 201 is reversely installed. At this time, the top rod 2 and the top tether 3 are located in front of the seat 201, and an installation path of the top tether 3 connected to the corresponding position of the car seat is the same as an installation path thereof when the seat 201 is installed forward in the installation position. Compared with the existing top tether 3 fixed on the seat 201, the installation path of the top tether 3 of the present disclosure connected to the corresponding position of the car seat will not interfere with the passenger in the seat 201, thus improving the riding comfort of the passenger in the seat 201 and thus avoiding the passenger in the child safety seat 200 from crying.

Other embodiments of the disclosure will be apparent to those skilled in the art from consideration of the specification and practice of the disclosure disclosed herein. This application is intended to cover any variations, uses, or adaptations of the disclosure following, in general, the principles of the disclosure and including such departures from the present disclosure as come within known or customary practice in the art to which the disclosure pertains. It is intended that the specification and examples be considered as exemplary only, with a true scope and spirit of the disclosure being indicated by the following claims.

Although the disclosure has been provided by with reference to typical embodiments, the terms used are illustrative and exemplary rather than restrictive. Since the disclosure can be implemented in various forms without departing from the spirit and essence of the disclosure, it should be understood, the above-mentioned embodiments are not limited to any of the foregoing details, but shall be interpreted in the broadest sense within the scope defined by the claims. Therefore, any variation falling within the scope of the claims or their equivalents shall be covered by the claims.

REFERENCE NUMERAL LIST

- Child Safety Seat 1, 200
  - Base 10, 1*a*
    - Anchor Part 110
      - Anchor Arm 111
    - Annular Part 120
      - Base Reinforcement 121
    - Storage Position 11
    - Casing 12
    - Bracket 13
  - Seat 20, 201
    - Annular Part 220
      - Seat Reinforcement 221
    - Backrest 230
      - Reinforcing Tube 231
        - Limit Ring 2311
  - Top Rod 30, 2
    - Vertical Rod 310
    - Transverse Rod 320
    - Fixing Portion 320*a*
    - Opening 330
    - Accommodating Portion 340
      - Flexible Member 341
    - Rod 350
      - Through Hole 351
      - Installing Groove 352
    - Cover plate 360
    - Supporting Pipe 21
      - Second Connecting Hole 211
    - Transverse Rod Part 22
      - Perforation 221
      - First Connecting Hole 222
  - Tether Assembly 40
    - Top Tether 410
      - Adjusting Belt 411
      - First Adjusting Belt 411*a*
      - Second Adjusting Belt 411*b*
        - Free End 4111
      - Connecting Belt 412
      - First Connecting Belt 412*a*
      - Second Connecting Belt 412*b*
    - Adjuster 430
    - First Adjuster 430*a*
    - Second Adjuster 430*b*
      - Housing 431
      - Button (Adjusting End) 432
    - Two-Way Adjuster 440
      - Adjuster Housing 441
      - Button 442
      - Fixed Sheet 443
      - Locking Member 444
      - Tightening Indicating Window 445
    - Tether Fixing Portion 450
    - Connecting Member 460
  - Alarm Device 50
    - Body Part 510
    - Switch 520
    - Alarm Part 530
  - Driver 60
    - Connecting Part 610
    - Trigger part 620, 620*a*
    - Linkage 630
    - Elastic Restoring Member 640
  - Support structure of Child Seat 100
  - Top Tether 3
    - Fixing Portion 31
      - Woven Ring 311
    - Installing Portion 32
  - First Connecting Member 4
  - Second Connecting Member 5
  - Reinforcing Sheet 6

What is claimed is:

1. A child safety seat for installing on a vehicle seat, the child safety seat comprising:

a base;

a seat coupled to the base;

a top rod fixed to a rear of the base;

a first trigger part provided on the top rod and movable relative to the top rod;

a tether assembly comprising a top tether and a tether fixing portion that are connected with each other, the top tether being connected with the top rod and driving the first trigger part to move with respect to the top rod, the tether fixing portion being connected to the vehicle seat; and an alarm device comprising a first switch, wherein when the top tether is tightened the top tether drives the first trigger part to move relative to the top rod, causing the first trigger part to trigger the first switch.

2. The child safety seat according to claim 1, wherein the top rod comprises a rod, the first trigger part protrudes from the rod and is movable relative to the rod, the top tether winds the rod and the first trigger part, the first switch is located on an inside of the rod, and when the top tether is tightened, the top tether applies pressure to the first trigger part, and further drives the first trigger part to move into the inside of the rod, thereby triggering the first switch.

3. The child safety seat according to claim 2, wherein one end of the top tether is fixed to a rear side of the rod and extends through a lower side, a front side and an upper side of the rod in sequence.

4. The child safety seat according to claim 3, wherein the first trigger part protrudes from the lower side of the rod.

5. The child safety seat according to claim 2, wherein the top tether surrounds an upper part of the rod, then to a front part and a lower part of the rod, and then to the upper part of the rod.

6. The child safety seat according to claim 2, wherein the rod is in an inverted U shape, and the top tether winds a horizontal lever at a top of the rod and the first trigger part protruding from the horizontal lever.

7. The child safety seat according to claim 2, wherein the top rod includes a cover plate, wherein the cover plate is sleeved on an outside of the rod and covers the first trigger part and a part of the top tether that winds the top rod, wherein the cover plate has an opening for the top tether to extend out of the cover plate, and a gap between the cover plate and the rod allows the top tether to move out and in along the opening of the cover plate (360).

8. The child safety seat according to claim 2, wherein the first trigger part moves into the inside of the rod along a first direction and triggers the first switch along a second direction intersecting the first direction.

9. The child safety seat according to claim 8, wherein the first trigger part is provided with a body and two extension portions protruding from the body along the first direction, the rod is provided with two stoppers that insert into the two extension portions one by one, and when the first trigger part triggers the first switch, the first switch is located between the two extension portions, and one of the extension portions triggers the first switch along the second direction.

10. The child safety seat according to claim 1, wherein the top rod includes a rod, wherein the first trigger part is movable relative to the rod, a reset member is provided between the first trigger part and the rod, and the reset member causes the first trigger part to protrude from the rod for being driven by the top tether.

11. The child safety seat according to claim 1, wherein the top rod includes a rod, wherein the first trigger part is movable relative to the rod, a stopper is provided on the rod, a groove or a through hole is provided in the first trigger part, and the stopper extends into the groove or the through hole the groove or the through hole, when the first trigger part is movable relative to the rod, the stopper moves within the groove or the through hole and limits moving range of the first trigger part.

12. The child safety seat according to claim 1, further comprising at least one second trigger part and at least one second switch; and the base has an anchor part connected to the vehicle seat, wherein the anchor part includes two anchor arms, the at least one second trigger part and the at least one second switch are both provided on the same anchor arm, the second trigger part is movable relative to the base, and when the anchor arm on which the second trigger part and the second switch are provided is fixed in place, the second trigger part is driven to move relative to the base so that the second trigger part triggers the second switch.

13. The child safety seat according to claim 1, wherein the base has an anchor part connected to the vehicle seat, the alarm device is configured to:

give an alarm when the top tether is tightened and the anchor part is not fixed in place, or when the top tether is not tightened and the anchor part is fixed in a place; and give no alarm when the top tether is tightened and the anchor part is fixed in place, or when the top tether is not tightened and the anchor part is not fixed in place.

14. The child safety seat according to claim 1, wherein the alarm device comprises:

a body part that decides whether to give an alarm based on whether the first switch is triggered, the first switch being electrically connected with to the body part to provide a signal to the body part, and the body part is capable of deciding whether to give an alarm based on the signal, and an alarm for giving the alarm when the body part decides to give the alarm.

15. The child safety seat according to claim 1, further comprising an adjuster, the top rod comprising a rod, the top tether comprising an adjusting belt and a connecting belt, the connecting belt being connected to the rod and the adjuster, the adjusting belt being connected to a tether fixing portion and the adjuster, the adjuster locking or releasing the adjusting belt passing through the adjuster, and a length of the adjusting belt is adjustable when the adjuster releases the adjusting belt.

* * * * *